(12) United States Patent
Takato

(10) Patent No.: US 7,511,892 B2
(45) Date of Patent: Mar. 31, 2009

(54) IMAGE-ACQUISITION OPTICAL SYSTEM

(75) Inventor: Hideyasu Takato, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 88 days.

(21) Appl. No.: 11/728,877

(22) Filed: Mar. 26, 2007

(65) Prior Publication Data
US 2007/0258150 A1 Nov. 8, 2007

(30) Foreign Application Priority Data
Mar. 29, 2006 (JP) ............... 2006-092465

(51) Int. Cl.
G02B 15/14 (2006.01)
G02B 21/00 (2006.01)
(52) U.S. Cl. ................ 359/676; 359/368; 359/686
(58) Field of Classification Search ......... 359/676–706, 359/368–398
See application file for complete search history.

(56) References Cited

U.S. PATENT DOCUMENTS 4,312,572 A 1/1982 Yamashita et al.

2006/0114554 A1 * 6/2006 Suzuki et al. ............ 359/380

FOREIGN PATENT DOCUMENTS

| JP | 61-44283 | 10/1986 |
| JP | 06-317744 | 11/1994 |
| JP | 11-316339 | 11/1999 |
| JP | 2000-267002 | 9/2000 |
| JP | 2004-313769 | 11/2004 |
| JP | 2004-313772 | 11/2004 |

* cited by examiner

Primary Examiner—Darryl J Collins
(74) Attorney, Agent, or Firm—Kenyon & Kenyon LLP

(57) ABSTRACT

There is provided a compact image-acquisition optical system which is capable of observing from normal observation to microscopic observation with a single image-acquisition optical system, whose overall length is short, and whose lens outer diameter is small. The invention provides an image-acquisition optical system comprising a plurality of lens groups, wherein, by moving at least one of the plurality of lens groups on the optical axis, it is possible to change a state from a normal observation state (wide-angle end) to a close-up magnified-observation state (telephoto end), and wherein the magnification of the image-acquisition optical system at the telephoto end satisfies $\beta_{TELE} < -2.0$.

7 Claims, 36 Drawing Sheets

FIG. 12
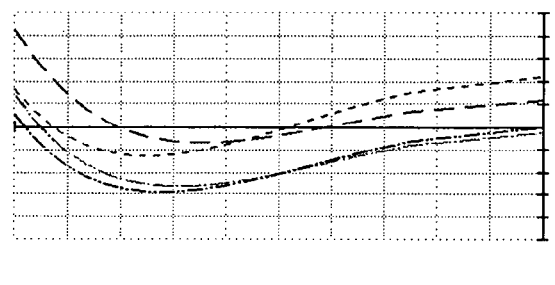
SPHERICAL ABERRATION FNO 7.8
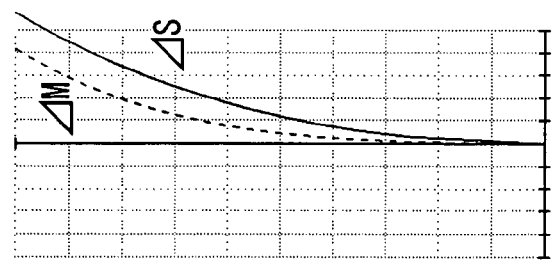
ASTIGMATISM ω 18.9°
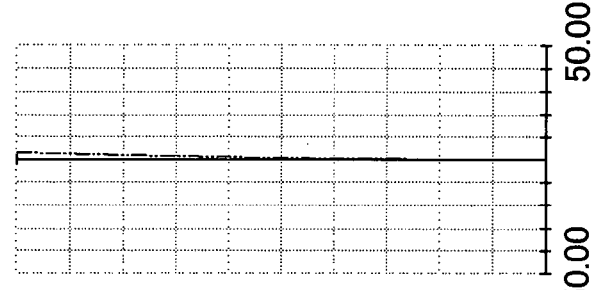
DISTORTION ω 18.9°
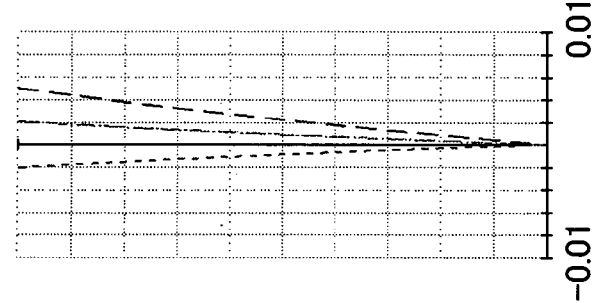
LATERAL CHROMATIC ABERRATION ω 18.9°
e-line ———
F-line — — —
g-line — - —
C-line ·······

FIG. 22
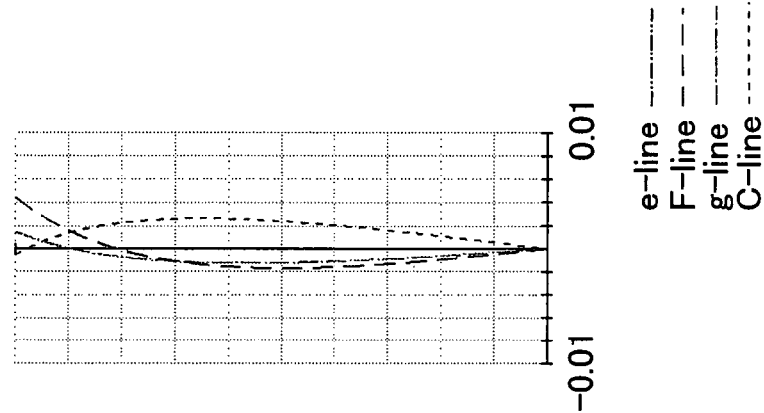
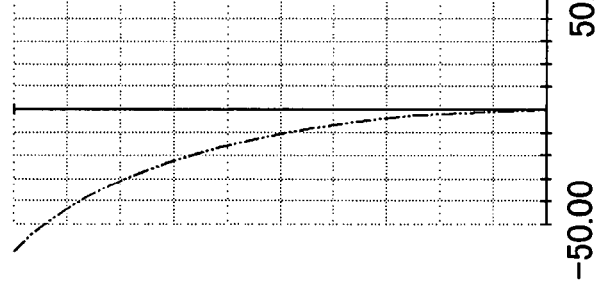
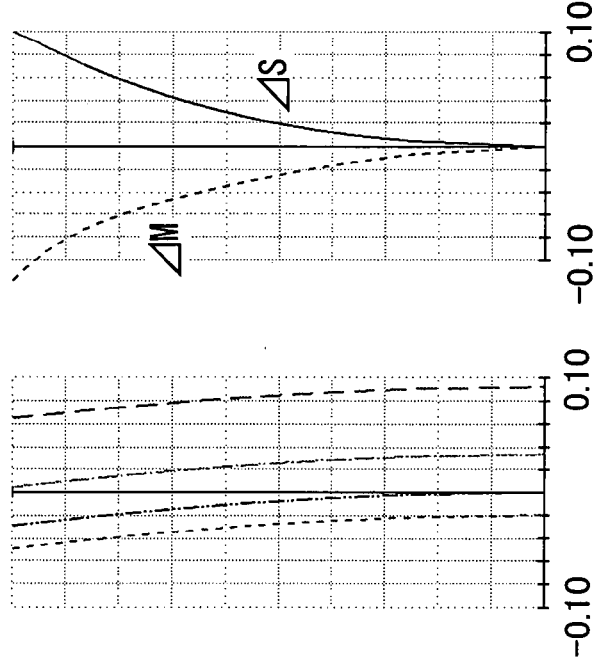

IMAGE-ACQUISITION OPTICAL SYSTEM

BACKGROUND OF THE INVENTION

1. Field of the Invention

The present invention relates to an image-acquisition optical system having a power varying function, and more particularly, relates to an image-acquisition optical system used in an endoscope objective lens that is capable of magnified observation or a photographic lens that is capable of macro photography, such as the lens of a digital camera, video camera, mobile-phone camera, or the like.

This application is based on Japanese Patent Application No. 2006-092465, the content of which is incorporated herein by reference.

2. Description of Related Art

In recent years there has been an increasing demand in the field of medical endoscopes for image-acquisition optical systems that are capable of magnified observation for precise diagnosis of lesions. Conventional examples of such image-acquisition optical systems for magnifying endoscopes are disclosed in Japanese Examined Patent Application, Publication No. SHO-61-044283, Japanese Unexamined Patent Application, Publication No. HEI-06-317744, Japanese Unexamined Patent Application, Publication No. HEI-11-316339, and Japanese Unexamined Patent Application, Publication No. 2000-267002.

Furthermore, in the field of medical endoscopes, in order to improve the diagnosis precision, there are demands to increase the definition of endoscope images. To obtain such endoscope images, image-acquisition devices having more pixels than conventional devices have begun to be used. Therefore, high-performance image-acquisition optical systems that are compatible with such image-acquisition devices having more pixels are essential.

On the other hand, there are also increasing demands for ultra-high-magnification observation optical systems which can perform magnified observation of biological tissue in lesions etc. under an endoscope to a level equivalent to that achievable under a microscope (hereinafter referred to as "microscopic observation" for short).

Examples of image-acquisition optical systems for endoscopes which are capable of such microscopic observation are disclosed, for example, in Japanese Unexamined Patent Application, Publication No. 2004-313769 and Japanese Unexamined Patent Application, Publication No. 2004-313772.

Conventionally, in order to perform microscopic observation of biological tissue, after identifying a lesion with an endoscope, some cells are excised and a biopsy is performed by microscope examination. However, the approaches in the above-described Japanese Unexamined Patent Application, No. 2004-313769 and Japanese Unexamined Patent Application, No. 2004-313772 have the merit that it is possible to both carry out endoscope examination while at the same time examining cells inside the body.

High magnification, for example, for macro photography, and compactness are also desirable in optical systems for consumer devices, such as digital cameras and video cameras.

However, in the endoscope image-acquisition optical systems described in Japanese Examined Patent Application, Publication No. SHO-61-044283, Japanese Unexamined Patent Application, Publication No. HEI-06-317744, Japanese Unexamined Patent Application, Publication No. HEI-11-316339, and Japanese Unexamined Patent Application, Publication No. 2000-267002, the observation magnification during close-up magnification (at the telephoto end) is not high enough to allow microscopic observation.

Furthermore, the endoscope image-acquisition optical systems for microscopic observation described in the above-mentioned Japanese Unexamined Patent Application, Publication No. 2004-313769 and Japanese Unexamined Patent Application, Publication No. 2004-313772 are only capable of close-up magnified observation at a fixed magnification. Therefore, an image-acquisition optical system having normal observation magnification and an image-acquisition optical system for performing microscopic observation must be separately provided. Accordingly, when using the endoscope image-acquisition optical systems for microscopic observation described in the above-mentioned Japanese Unexamined Patent Application, Publication No. 2004-313769 and Japanese Unexamined Patent Application, Publication No. 2004-313772 to perform microscopic observation, a probe provided in the image-acquisition optical system for microscopic observation must be guided through an instrument-inserting channel of the endoscope to the subject to be acquired.

As a result, with the endoscope image-acquisition optical systems for microscopic observation described in the above-mentioned Japanese Unexamined Patent Application, Publication No. 2004-313769 and Japanese Unexamined Patent Application, Publication No. 2004-313772, some parallax occurs between the viewing field of the endoscope and the viewing field of the microscope, which makes it difficult to identify the region of the subject to be microscopically observed. The region observed during microscopic observation with the endoscope image-acquisition optical system for microscopic observation, however, is only an extremely narrow region on the order of several tens of square micrometers to several hundred square micrometers. Also, it is difficult to completely immobilize the tip of the endoscope at the site to be observed due to the effect of pulsing and so forth in the subject body. Therefore, it is difficult to identify an examination site with such an optical system having parallax.

The probe provided in the image-acquisition optical system for microscopic observation is used while being pressed against the examination site. However, because this probe has a diameter small enough to pass through the instrument-inserting channel, the area pressing against the examination site is small, which makes it difficult to secure to the examination site. Thus, the image-acquisition optical system for microscopic observation is used while being inserted inside the body through the instrument-passing channel, and therefore, it has the drawback that it is difficult to securely fix the optical system for microscopic observation during observation.

In order to stabilize the endoscope during microscopic observation, it is also possible to dispose the image-acquisition optical system having a normal observation magnification and an image-acquisition optical system for microscopic observation in a tip-inserting portion. In this case, however, the problem of parallax between the viewing field during normal observation and the viewing field during microscopic observation cannot be overcome. Furthermore, in this case, the tip-inserting portion of the endoscope is equivalent to a device in which two scopes of the same size are combined, resulting in a large endoscope. In particular, because the outer diameter of the tip-inserting portion of the endoscope is large, the burden placed on the patient receiving the endoscopic examination is significant, which is undesirable.

BRIEF SUMMARY OF THE INVENTION

In view of the problems described above, the present invention provides a compact image-acquisition optical system with a short overall length and small lens outer diameter which is capable of carrying out observation ranging from normal observation to microscopic observation using a single image-acquisition optical system.

A first aspect of the present invention for solving the problems described above is an image-acquisition optical system formed of a plurality of lens groups, wherein by moving at least one of the plurality of lens groups on the optical axis, it is possible to change a state from a normal-observation state (wide-angle end) to a close-up magnified-observation state (telephoto end), and wherein the following conditional expression (1) is satisfied:

$$\beta_{TELE} < -2.0 \qquad (1)$$

where $\beta_{TELE}$ is the magnification of the image-acquisition optical system at the telephoto end.

In order to allow observation ranging from normal endoscope observation to microscopic observation with a single image-acquisition optical system, it is necessary to form the image-acquisition optical system of a plurality of lens groups; to provide a construction which changes the state from the normal observation state (wide-angle end) to the close-up magnified-observation state (telephoto end) by moving at least one of the plurality of lens groups on the optical axis; and to provide a configuration in which the maximum magnification $\beta_{TELE}$ during close-up magnification (telephoto end) satisfies conditional expression (1).

For example, to enable observation of a lesion occurring in biological tissue at the cellular level to observe a phenomenon specifically appearing when a normal cell becomes cancerous, such as disrupted cell arrangement, abnormal enlargement of the cell nucleus, or abnormal growth of fine blood vessels, it is essential that the image-acquisition optical system satisfy at least conditional expression (1) during close-up magnification (at the telephoto end), and that the required resolution be ensured during microscopic observation in an observation area of several tens of square micrometers to several hundred square micrometers.

If the magnification $\beta_{TELE}$ of the image-acquisition optical system at the telephoto end does not satisfy conditional expression (1), one possible approach is to compensate for the deficient magnification in the optical system by using an electrical correction device such as an electronic zoom. In such a case, however, the quality of the image acquired by the image-acquisition optical system is degraded, which is not desirable for an image to be used for diagnosing a lesion.

An image-acquisition optical system according to a second aspect of the present invention is configured to enable observation at least three magnifications, that is, an observation magnification $\beta_{WIDE}$ during normal observation (wide-angle end), an observation magnification $\beta_{TELE}$ during close-up magnified observation (telephoto end), and an observation magnification $\beta$ between $B_{WIDE}$ and $B_{TELE}$; wherein power varying and focusing from $\beta_{WIDE}$ to $\beta$ are carried out by moving one lens group of the plurality of lens groups; and in power varying and focusing from $\beta$ to $\beta_{TELE}$, at least one lens group other than the lens group that moves when performing power varying and focusing from $\beta_{WIDE}$ to $\beta$ moves.

In order to obtain a magnification high enough to allow microscopic observation during close-up magnification (telephoto end) in the image-acquisition optical system, it is extremely difficult to perform power varying and focusing by moving only one lens group of the lens groups constituting the image-acquisition optical system. To focus on a close-up point with the image-acquisition optical system, it is advantageous to move all lens groups constituting the image-acquisition optical system, or to move a plurality of lens groups, including the lens group at the extreme object side. However, when performing such an operation in the image-acquisition optical system, the amount of movement of the lenses becomes large, which is undesirable because the overall optical system increases in size.

In the present invention, power varying and focusing are performed by fixing the first lens group, which is the first, in order from the object side, of the lens groups constituting the image-acquisition optical system in the present invention, and moving a plurality of lens groups from the second lens group onwards. More specifically, the image-acquisition optical system is formed of four groups, including lens groups whose lens characteristics are, in the stated order, positive, negative, negative, positive; positive, positive, negative, positive; or negative, positive, negative, positive, wherein the second lens group and the third lens group can be moved on the optical axis. By disposing an aperture stop in the vicinity of the second lens group or the third lens group in the image-acquisition optical system, the outer diameter of the lenses constituting these lens groups can be reduced. By constructing the system in this way, a space is ensured around the movable lenses in the image-acquisition optical system, and a lens driving device such as an actuator can thus be provided. Also, in the present invention, by reducing the size of the lenses constituting the movable lens groups in this way, when moving the movable lens groups, the load placed on the lens driving device is reduced.

In order to achieve a compact construction without complicating the lens driving device, it is preferable to control, in two separate stages, the operation of the lenses from the observation magnification $\beta_{WIDE}$ in normal observation (wide-angle end) to the observation magnification $\beta_{TELE}$ in close-up magnified observation (telephoto end). More concretely, in the image-acquisition optical system, a suitable observation magnification $\beta$ should be set between $\beta_{WIDE}$ and $\beta_{TELE}$; then, from $\beta_{WIDE}$ to $\beta$, power varying and focusing should be performed by moving only one lens group, and from $\beta$ to $\beta_{TELE}$, power varying and focusing should be performed by moving an additional lens group in an interlocked manner.

In the image-acquisition optical system, when two lens groups are always moved from the observation magnification WIDE in normal observation (wide-angle end) to the observation magnification $\beta_{TELE}$ in close-up magnified observation (telephoto end), changes in the magnification and changes in the field angle are kept constant to a certain degree when moving the lens groups, and in order not to cause a sudden change, it is necessary to intricately control the amount of translation of the lens groups using a cam mechanism or the like. In contrast, by controlling the operation of the lens groups in two separates stages, as in the image-acquisition optical system according to the second aspect of the present invention, it is possible move the lens groups steadily and substantially linearly along the optical axis, which allows smooth field angle changes and magnification changes. As the lens driving device used in the second aspect of the present invention, it is possible to use an electrically controllable device using a linear actuator or a device that is manually controlled by means of wires or the like. Therefore, according to the second aspect of the present invention, it is possible to construct a much simpler lens driving device compared to the case where two lens groups are always moved from the observation magnification $\beta_{WIDE}$ in normal observation (wide-angle end) to the observation magnification $\beta_{TELE}$ in close-up magnified observation (telephoto end).

In the image-acquisition optical system according to the present invention, when the observation magnification $\beta$ between $\beta_{WIDE}$ and $\beta_{TELE}$ satisfies conditional expression (2) below, it is preferable to perform power varying by moving two lens groups:

$$\beta < -1.0 \qquad (2)$$

In the image-acquisition optical system, if the observation magnification $\beta$ between $\beta_{WIDE}$ and $\beta_{TELE}$ satisfies conditional expression (2) above, when power varying and focusing are performed with only one lens group, the aberration performance becomes worse, which is undesirable. Thus, when power varying and focusing are performed in the image-acquisition optical system using only one lens group, variations in the image plane and variations in chromatic aberrations become particularly large; for example, it is not possible to obtain an image with sufficient quality to perform diagnosis of lesions occurring in biological tissue under endoscope examination.

The lens configuration of the above-described image-acquisition optical system according to the present invention is preferably formed of at least four groups. It is preferable to construct the system so that power varying and focusing from $\beta_{WIDE}$ to $\beta$ are performed by moving the third lens group of those groups such that power varying and focusing from $\beta$ to $\beta_{TELE}$ are performed by moving the second lens group and the third lens group.

By constructing the image-acquisition optical system according to the present invention in the above-described way, there are no sudden changes in field angle or magnification even though each lens group is moved steadily and substantially linearly along the optical axis; instead, smooth changes in field angle and magnification are achieved. Accordingly, in this image-acquisition optical system, it is possible to perform magnified observation at a desired magnification with the tip of the insertion portion of the endoscope close to the target subject without losing sight of it.

An image-acquisition device combined with the image-acquisition optical system according to the present invention preferably satisfies conditional expression (3) below:

$$0.2 < IH/P \times 1000 < 0.7 \qquad (3)$$

In conditional expression (3) above, IH is the maximum image height (mm) at the image-acquisition plane of the image-acquisition device, and P is the pixel pitch (mm) of the image-acquisition device. If the value of IH/P×1000 falls below the lower limit in the range defined by conditional expression (3) above, the pixel pitch of the image-acquisition device becomes large, and thus, a high-definition microscopic-observation image cannot be obtained. If the value of IH/P×1000 exceeds the upper limit in the range defined by conditional expression (3) above, the pixel pitch of the image-acquisition device becomes too small, and the F-number of the image-acquisition optical system must be increased to the diffraction limit. Thus, it is easily affected by optical diffraction, and it is not possible to obtain the desired image quality.

In order to obtain a microscopic-observation image with higher definition, the observation magnification of the image-acquisition optical system at the telephoto end preferably satisfies conditional expression (4) below:

$$\beta_{TELE} < -2.5 \qquad (4)$$

When it is better to perform sufficient aberration correction of the image-acquisition optical system in order to support high-definition microscope-observation images, even though the driving device becomes somewhat complicated, it is possible to construct the system so that power varying and focusing are performed from the normal observation state (wide-angle end) to the close-up magnified-observation state (telephoto end) by moving two lens groups.

In such an endoscope having an observation magnification at which microscopic observation is possible, it is necessary to ensure a wide field of view during normal observation in order to carry out operations such as screening of living organisms for detecting lesions, treating lesions, and so forth. Therefore, it is preferable that the image-acquisition optical system used in the endoscope satisfies conditional expression (5) below during normal observation, while ensuring a high magnification during magnified observation:

$$\omega > 50° \qquad (5)$$

where $\omega$ is the semi field angle of the image-acquisition optical system in the normal observation state (wide-angle end).

In the above-described image-acquisition optical system formed of four groups, the amount of movement of the movable lens groups from the observation magnification $\beta_{WIDE}$ in normal observation (wide-angle end) to the observation magnification $\beta_{TELE}$ in close-up magnified observation (telephoto end) is preferably in the range given in conditional expression (6) below:

$$1.5 < D3/fw < 3.3 \qquad (6)$$

where D3 is the amount of movement of the third lens group, and fw is the focal length of the image-acquisition optical system at the wide-angle end.

In the image-acquisition optical system, if the value of D3/fw exceeds the upper limit of the range defined by conditional expression (6) above, the amount of movement of the third lens group becomes large. As a result, the overall length of the image-acquisition optical system becomes large, leading to an increase in the size of the tip of the endoscope, which is undesirable.

When using an actuator as the lens driving device, if the amount of movement becomes large, the stroke of the actuator driving portion increases, thus causing the length of a rigid portion (a portion that does not bend) at the tip of the insertion portion of the endoscope to increase, which is undesirable.

In the image-acquisition optical system according to the present invention, when the observation magnification $\beta$ between $\beta_{WIDE}$ and $\beta_{TELE}$ satisfies conditional expression (2) above, conditional expression (6) above is satisfied by performing power varying and focusing by moving two lens groups. In the image-acquisition optical system, when the value of D3/fw drops below the lower limit of the range defined by conditional expression (6) above, the amount of movement of the third lens group is small, and it is thus not possible to obtain an observation magnification high enough to allow microscopic observation.

The focal length of the third lens group preferably satisfies conditional expression (7) below:

$$0.1 < |fw/f3| < 0.7 \qquad (7)$$

where f3 is the focal length of the third lens group.

In the above-described image-acquisition optical system formed of four groups, the third lens group plays the role of correcting shifts in the image position. When the power of the third lens group increases as the value of |fw/f3| in this image-acquisition optical system exceeds the upper limit of the range defined by conditional expression (7) above, the variations in aberrations increase when the third lens group moves, particularly variations in spherical aberration and image plane, which is undesirable. Also, when the power of the third lens group decreases as the value of $|fw/f3|$ in this image-acquisition optical system falls below the lower limit of the range defined by conditional expression (7) above, chromatic aberration of magnification in the normal observation state (wide-angle end) increases, causing color bleeding of the image, which is undesirable.

It is preferable that the above-described image-acquisition optical system formed of four groups also satisfy conditional expression (7') below:

$$0.2<|fw/f3|<0.6 \qquad (7')$$

In order to ensure good aberration performance in the close-up magnified observation state (telephoto end), the focal length of the fourth lens group preferably satisfies conditional expression (8) below:

$$0.2<ft/f4<0.5 \qquad (8)$$

where f4 is the focal length of the fourth lens group, and ft is the focal length of the image-acquisition optical system in the close-up magnified observation state (telephoto end). When the value of ft/f4 falls below the lower limit of the range defined by conditional expression (8) above, the power of the fourth lens group becomes small, and it is thus not possible to sufficiently correct chromatic aberrations. Also, when the value of ft/f4 exceeds the upper limit of the range defined by conditional expression (8) above, the power of the fourth lens group becomes high, and the back focus becomes short. Therefore, it is not possible to ensure sufficient space for inserting, for example, a cover glass for protecting the image-acquisition surface of the image-acquisition device or a filter for cutting unwanted light during observation, which is undesirable.

The image-acquisition optical system of the present invention has an aperture stop constructed so that the opening diameter thereof can be adjusted, and conditional expression (9) below is satisfied:

$$D_{TELE}>D_{WIDE} \qquad (9)$$

where $D_{TELE}$ is the opening diameter of the aperture stop at the telephoto end, and $D_{WIDE}$ is the opening diameter of the aperture stop at the wide-angle end. In an optical system that can change the observation state from a normal observation state (wide-angle end) to a microscopic observation state (telephoto end), such as the image-acquisition optical system according to the present invention, if the opening diameter of the aperture stop is kept constant, the variation in F-number when the magnification changes increases, and the F-number becomes larger in the microscopic observation state than in the normal observation state. Under these conditions, if the opening diameter of the aperture stop is set to be small in order to ensure sufficient depth of view in the normal observation state, image degradation occurs due to diffraction of light when changing to the microscopic observation state.

Thus, in the image-acquisition optical system of the present invention, in at least the normal observation state (wide-angle end) and the microscopic observation state (telephoto end), the opening diameter of the aperture stop is configured to be adjustable in order to satisfy conditional expression (9) above. Therefore, it is possible to ensure sufficient depth of view in the normal observation state and to obtain a clear image in the microscopic observation state.

It is preferable to change the diameter of the aperture stop so that the F-number in the microscopic observation state (telephoto end) satisfies conditional expression (10) below:

$$0.25<p/Fno \times 1000<0.8 \qquad (10)$$

where P is the pixel pitch (mm) of the image-acquisition device, and Fno is the F-number in the microscopic observation state (telephoto end). If the value of $p/Fno \times 1000$ falls below the lower limit of the range defined by conditional expression (10) above, image degradation occurs due to diffraction of light, which is undesirable. If the value of $p/Fno \times 1000$ exceeds the upper limit of the range defined by conditional expression (10) above, it is not possible to ensure the required depth of view in microscopic observation.

Furthermore, the image-acquisition optical system of the present invention can be used in devices other than endoscopes.

For example, in digital-camera photography or the like when performing macro photography, like photography beyond unity magnification, the amount of lens extension is sometimes large, and macro converter lenses are often mounted. However, by using the image-acquisition optical system of the present invention, it is possible to perform macro photography at a high magnification without mounting a macro converter lens, which has not been possible thus far.

In general, a macro lens extends a first group towards the object and performs focusing by floating a plurality of groups. However, when using the lens of the present invention, inner-focus macro photography is possible. This is beneficial when acquiring images after setting the working distance therefor.

If the present invention is applied to cameras of mobile telephones, macro photography is made easier.

The present invention realizes magnification high enough to allow microscopic observation under an endoscope and provides a high-performance image-acquisition optical system that is compatible with high-definition image-acquisition devices. Moreover, it can also be applied to macro lenses and so forth that are capable of high-magnification photography in digital cameras and cameras used in mobile telephones, which are compatible with miniature CCDs.

BRIEF DESCRIPTION OF THE SEVERAL VIEWS OF THE DRAWINGS

FIG. 12 is an aberration diagram of the image-acquisition optical system in FIG. 9.

FIG. 22 is an aberration diagram of the image-acquisition optical system in FIG. 21.

DETAILED DESCRIPTION OF THE INVENTION

An image-acquisition optical system according to an embodiment of the present invention will be described below with reference to the drawings.

The image-acquisition optical system according to this embodiment is formed of a plurality of lens groups, and by moving at least one of the plurality of lens groups on the optical axis, is capable of changing the observation state from a normal observation state (wide-angle end) to a close-up magnified observation state (telephoto end). The magnification of the image-acquisition optical system at the telephoto end, $\beta_{TELE}$, satisfies the following conditional expression:

$$\beta_{TELE} < -2.0 \qquad (1)$$

Table 1 shows the values of each conditional expression for the objective lens configurations in each Example described below.

TABLE 1

| CONDITIONAL EXPRESSION | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| Bt | −3.00 | −2.92 | −2.99 | −2.90 | −3.2 | −2.32 | −2.59 | −2.55 | −3.05 |
| β | −0.77 | −0.70 | −0.60 | −0.71 | −0.54 | −0.70 | −0.63 | −0.60 | −0.79 |
| ε | 65.32 | 65.75 | 54.50 | 65.93 | 28.79 | 65.52 | 62.39 | 63.64 | 54.51 |
| D3/fw | 2.63 | 2.47 | 2.12 | 1.89 | 2.01 | 0.49 | 1.07 | −1.49 | −3.14 |
| \|fw/f3\| | 0.25 | 0.41 | 0.56 | 0.35 | 0.12 | 0.32 | 0.40 | 0.32 | 0.33 |
| f4/ft | 0.30 | 0.34 | 0.40 | 0.44 | 0.23 | 0.03 | 0.34 | 0.40 | 0.04 |
| IH/(p × 1000) | 0.40 | 0.35 | 0.35 | 0.40 | 0.40 | 0.39 | 0.30 | 0.23 | 0.22 |
| p/Fno × 1000 | 0.37 | 0.42 | 0.41 | 0.36 | 0.37 | 0.47 | 0.43 | 1.08 | 0.44 |

EXAMPLE 1

Figure 1:
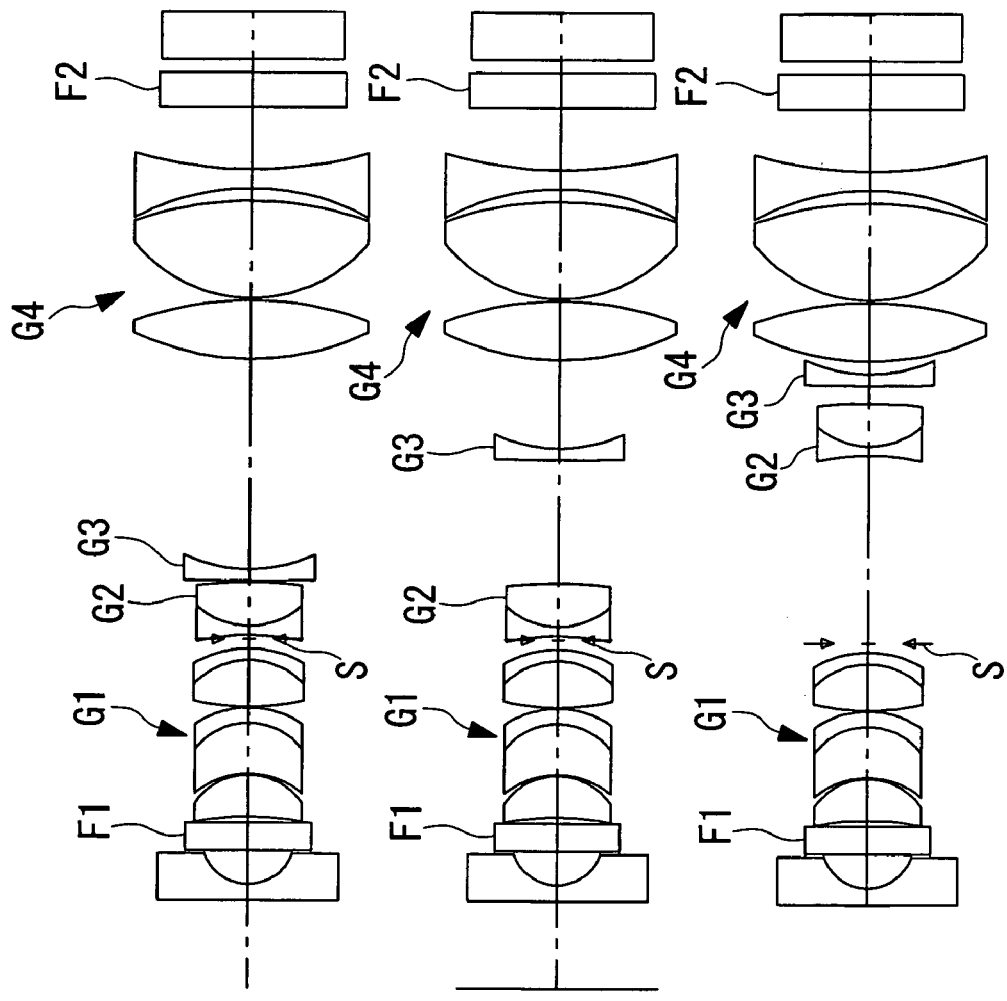
FIG. 1 is a sectional view showing Example 1 of an image-acquisition optical system according to an embodiment of the present invention.
Figure 2:
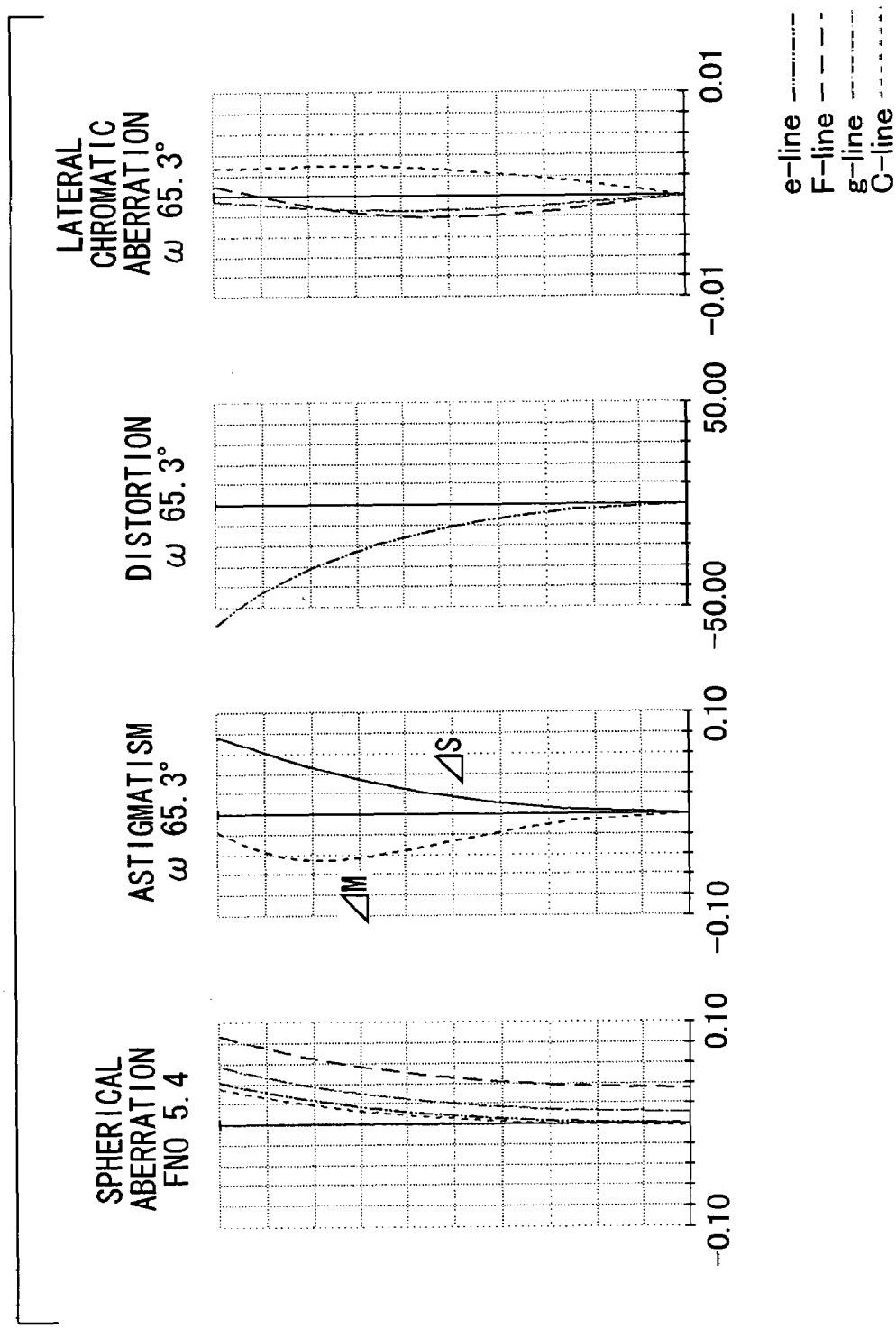
FIG. 2 is an aberration diagram of the image-acquisition optical system in FIG. 1.
Figure 3:
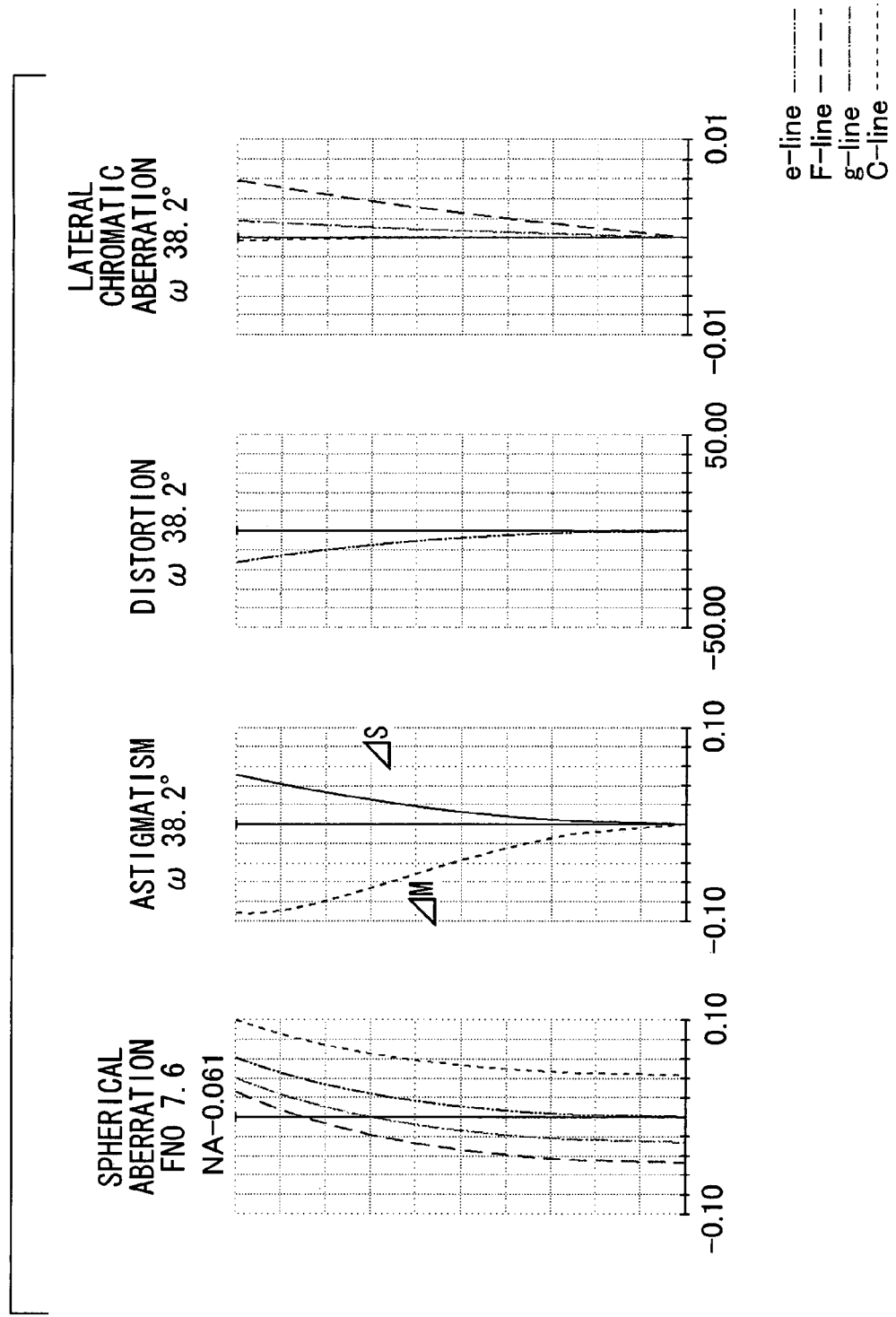
FIG. 3 is an aberration diagram of the image-acquisition optical system in FIG. 1.
Figure 4:
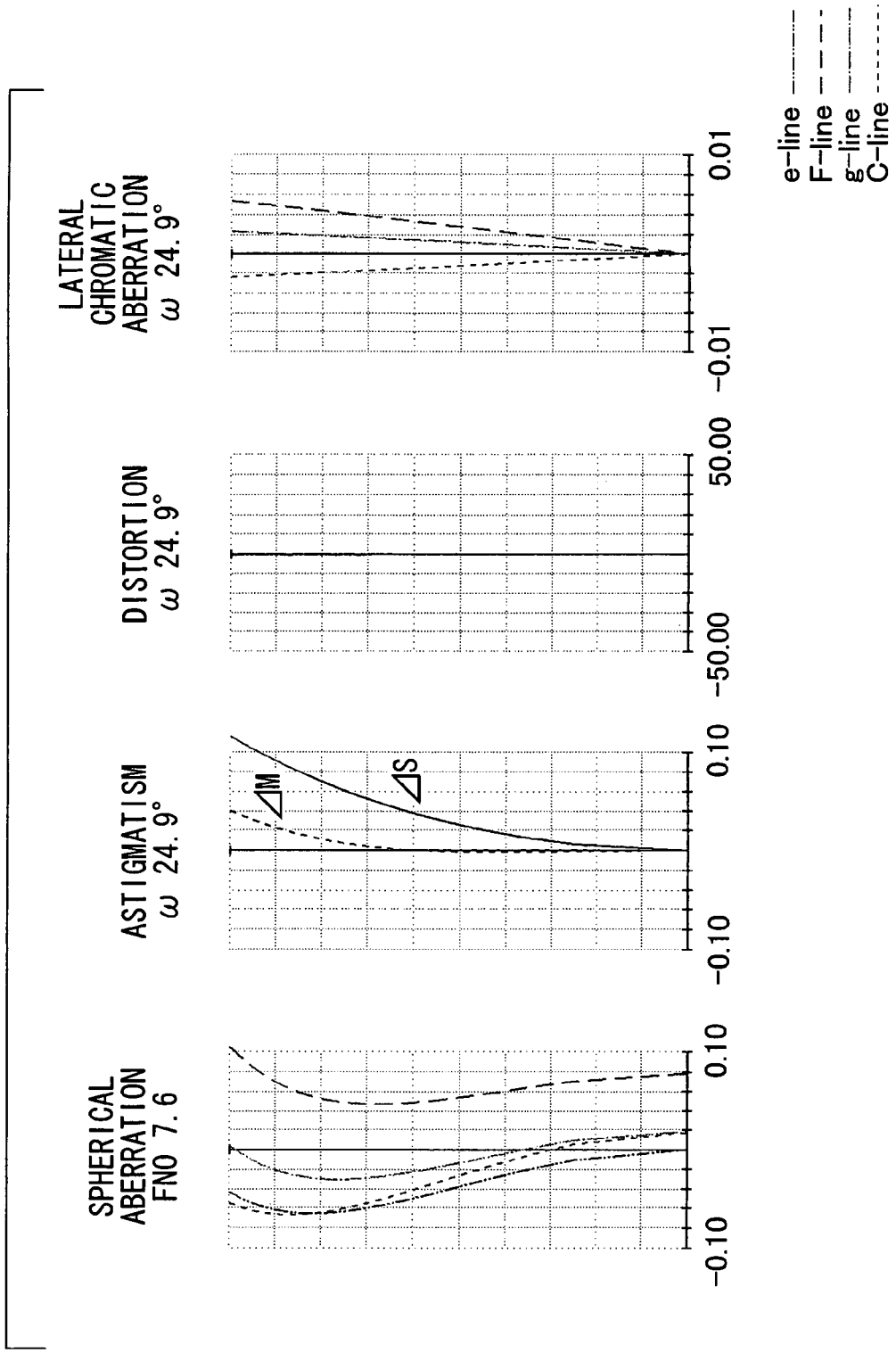
FIG. 4 is an aberration diagram of the image-acquisition optical system in FIG. 1.

The configuration of a magnifying endoscope objective lens according to this Example is shown in FIG. 1. The design data of the magnifying endoscope objective lens according to this Example is shown in Table 2, and the values of variable parameters of the magnifying endoscope objective lens according to this Example in each observation state, that is, a normal observation state (wide-angle end), an intermediate state, and a close-up magnified-observation state (telephoto end), are shown in Table 3. FIGS. 2, 3, and 4 respectively show aberration curves in the normal observation state (wide-angle end), the intermediate state, and the close-up magnified-observation state (telephoto end) of the magnifying endoscope objective lens according to this Example. FIG. 1 shows the configuration of the magnifying endoscope objective lens according to this Example in the normal observation state (wide-angle end), the intermediate state, and the close-up magnified-observation state (telephoto end), in this order from the top.

TABLE 2

| SURFACE NUMBER | RADIUS OF CURVATURE | SURFACE SEPARATION | INDEX OF REFRACTION Nd | ABBE CONSTANT Vd |
|---|---|---|---|---|
| 1 | ∞ | 0.280 | 1.88814 | 40.78 |
| 2 | 0.8023 | 0.568 | | |
| 3 | ∞ | 0.482 | 1.51564 | 75.00 |

TABLE 2-continued

| SURFACE NUMBER | RADIUS OF CURVATURE | SURFACE SEPARATION | INDEX OF REFRAC- TION Nd | ABBE CONSTANT Vd |
|---|---|---|---|---|
| 4 | ∞ | 0.097 | | |
| 5 | −4.8631 | 0.713 | 1.48915 | 70.23 |
| 6 | −1.1167 | 0.020 | | |
| 7 | −1.4293 | 0.880 | 1.48915 | 70.23 |
| 8 | −1.1493 | 0.269 | 1.85504 | 23.78 |
| 9 | −1.6087 | 0.016 | | |
| 10 | 4.1584 | 0.805 | 1.48915 | 70.23 |
| 11 | −1.2835 | 0.200 | 2.01169 | 28.27 |
| 12 | −1.8713 | 0.160 | | |
| 13 | APERTURE STOP | D13 | | |
| 14 | −4.2096 | 0.160 | 1.60520 | 65.44 |
| 15 | 1.3676 | 0.730 | 1.59667 | 35.31 |
| 16 | −8.0776 | D16 | | |
| 17 | 48.2526 | 0.200 | 1.56606 | 60.67 |
| 18 | 2.7107 | D18 | | |
| 19 | 4.6936 | 0.997 | 1.49846 | 81.54 |
| 20 | −5.7816 | 0.040 | | |
| 21 | 2.6061 | 1.658 | 1.48915 | 70.23 |
| 22 | −6.0493 | 0.220 | | |
| 23 | −4.2191 | 0.327 | 1.93429 | 18.90 |
| 24 | 7.3794 | 1.060 | | |
| 25 | ∞ | 0.600 | 1.51825 | 64.14 |
| 26 | ∞ | 0.231 | | |
| 27 | ∞ | 0.800 | 1.50801 | 60.00 |
| 28 | ∞ | D28 | | |

TABLE 3

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 15.55 | 1.50 | 0.02 |
| D13 | 0.07 | 0.07 | 3.18 |
| D16 | 0.02 | 2.10 | 0.30 |
| D18 | 3.58 | 1.51 | 0.22 |
| FOCAL LENGTH | 1.281 | 1.576 | 1.162 |
| Fno | 5.40 | 7.61 | 7.65 |
| MAGNIFICATION | −0.08 | −0.77 | −3.00 |

The image-acquisition optical system of this Example is formed of, in order from the object side, a first lens group G1 with positive refractive power, a second lens group G2 with negative refractive power, a third lens group G3 with negative refractive power, and a fourth lens group G4 with positive refractive power, as well as a lens driving device (not shown in the drawing) for moving the second lens group G2 and the third lens group G3 along the optical axis.

The first lens group G1 is formed of a negative lens, a positive lens, a compound lens formed of a positive lens and a negative lens, and a compound lens formed of a positive lens and a negative lens, arranged in this order from the object side. The second lens group G2 is formed of a compound lens formed of a negative lens and a positive lens. The third lens group G3 is formed of a negative lens. An aperture stop S is disposed between the first lens group G1 and the second lens group G2, and the aperture stop S is fixed behind the first lens group G1. The fourth lens group G4 is formed of a positive lens, a positive lens, and a negative lens, arranged in this order from the object side.

The image-acquisition optical system of this Example, when observing from the normal observation state (wide-angle end) to the intermediate state, carries out power varying and focusing by moving only the lens group G3 with the lens driving device, and when observing from the intermediate state to the close-up magnified observation state (telephoto end), carries out power varying and focusing by moving both the second lens group G2 and the third lens group G3 with the lens driving device. The aperture stop S, which is constructed so that the opening diameter thereof can be adjusted, is set to have a larger opening diameter in the close-up magnified-observation state (telephoto end) than in the other observation states.

A parallel flat plate F1 in the first lens group G1 and a parallel flat plate F2 between the fourth lens group G4 and an image-acquisition device are filters for cutting light of specific wavelengths, for example, 1060-nm light from a YAG laser or 810-nm light from a semiconductor laser, or a wavelength range of infrared light.

The image-acquisition optical system in this Example uses an image-acquisition element satisfying conditional expression (3) below as the image-acquisition element, to form an image-acquisition unit that can be installed in an endoscope. Therefore, it is possible to examine biological tissue at the cellular level to carry out diagnosis.

$$0.2 < IH/P \times 1000 < 0.7 \qquad (3)$$

In conditional expression (3), IH is the maximum image height (mm) at the image-acquisition plane of the image-acquisition device, and p is the pixel pitch (mm) of the image-acquisition device.

EXAMPLE 2

Figure 5:
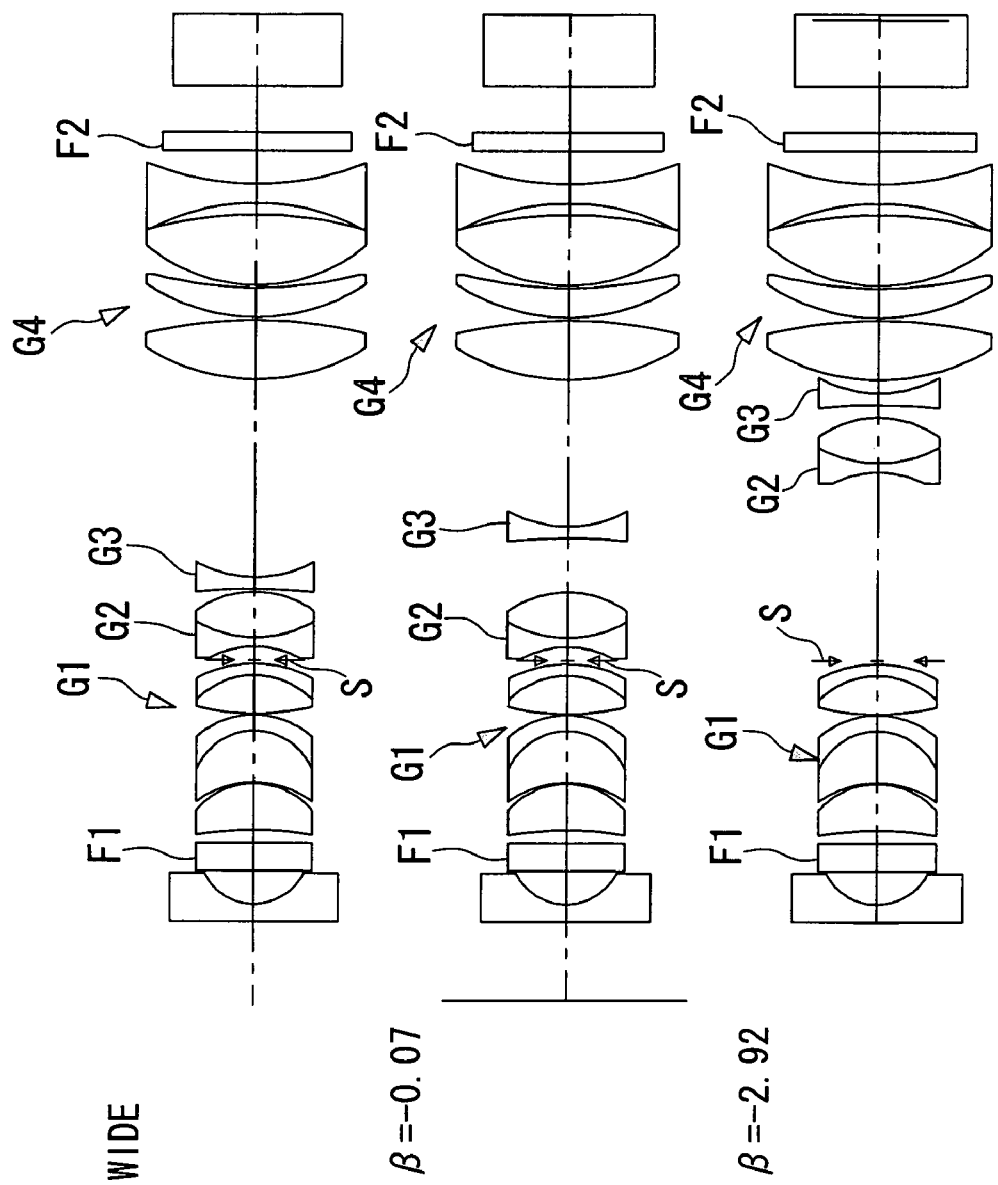
FIG. 5 is a sectional view showing Example 2 of the image-acquisition optical system according to an embodiment of the present invention.
Figure 6:
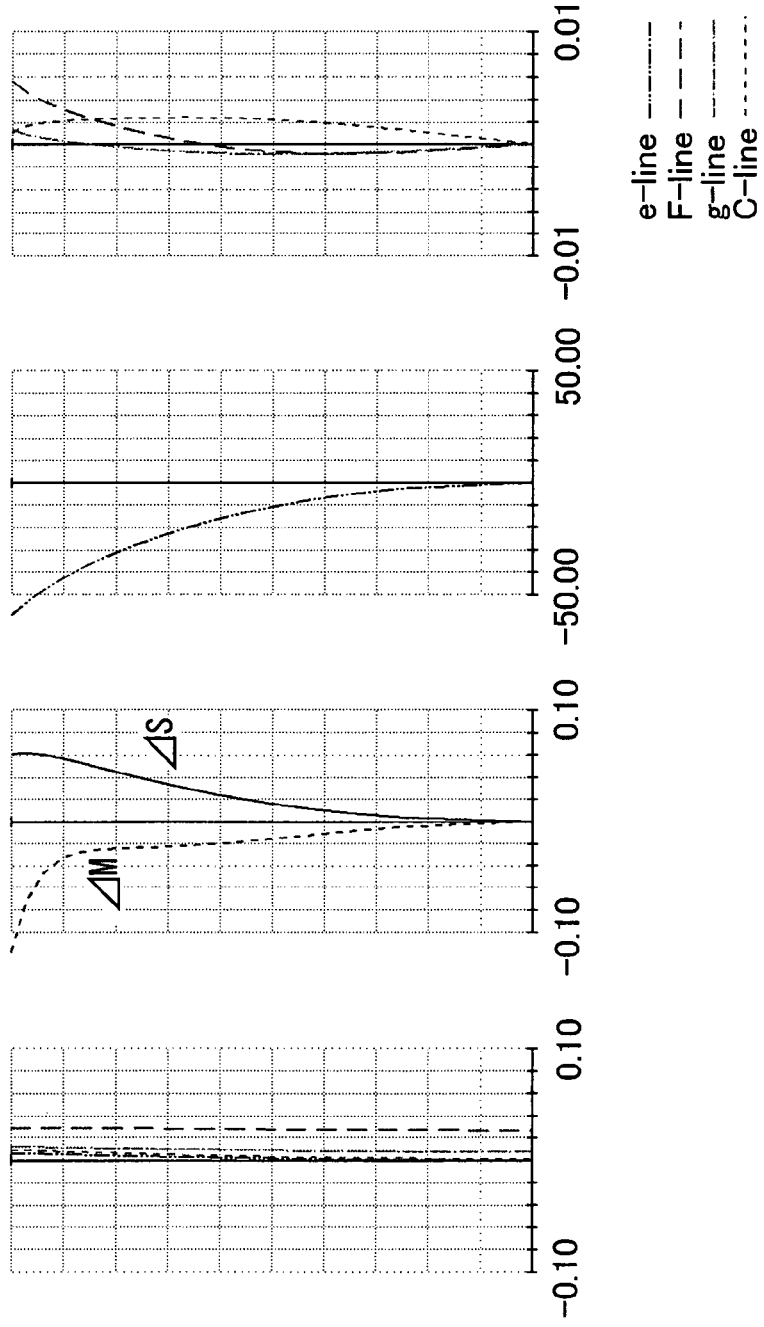
FIG. 6 is an aberration diagram of the image-acquisition optical system in FIG. 5.
Figure 7:
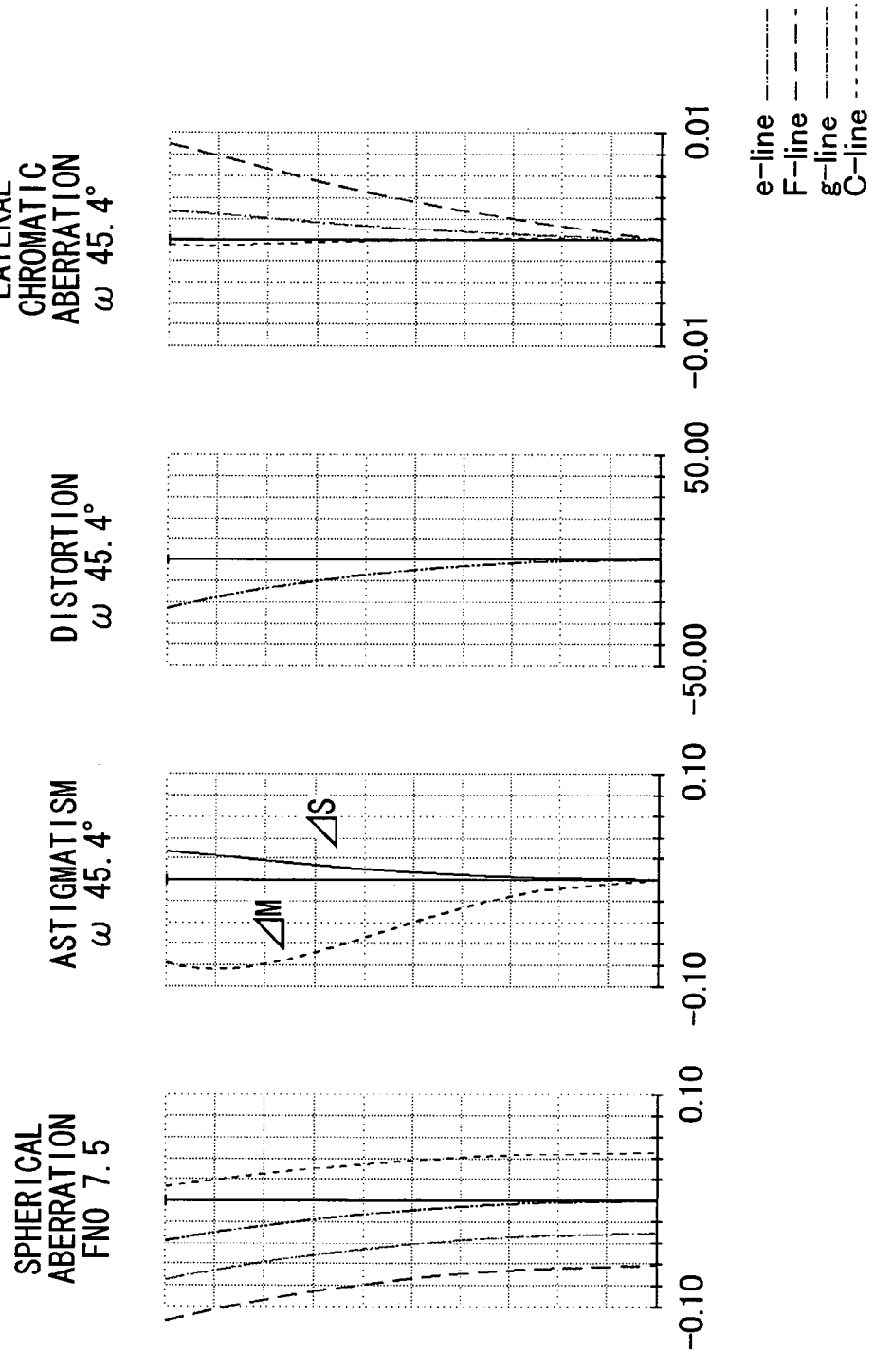
FIG. 7 is an aberration diagram of the image-acquisition optical system in FIG. 5.
Figure 8:
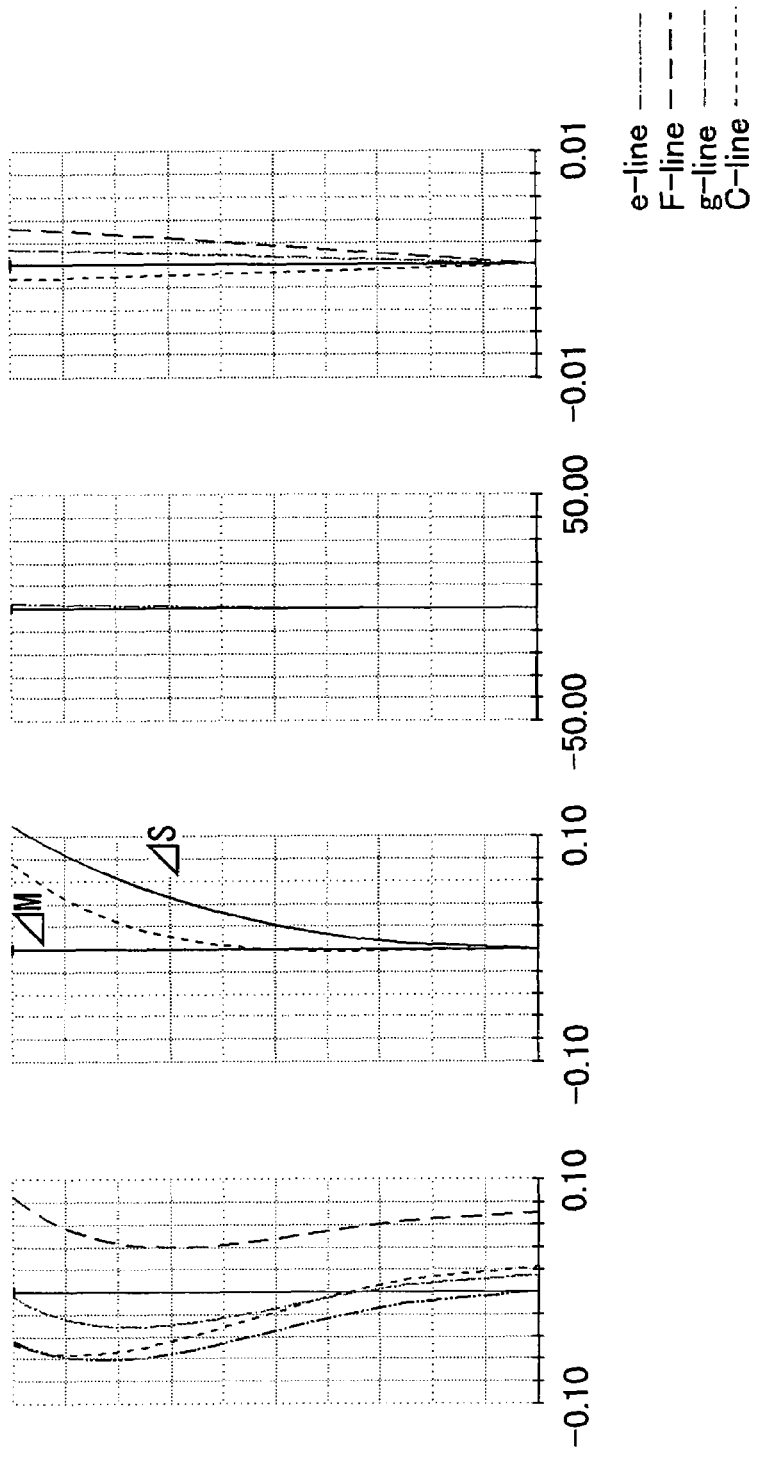
FIG. 8 is an aberration diagram of the image-acquisition optical system in FIG. 5.

The configuration of a magnifying endoscope objective lens according to this Example is shown in FIG. 5. The design data of the magnifying endoscope objective lens of this Example is shown in Table 4, and the values of variable parameters of the magnifying endoscope objective lens according to this Example in each state, that is, the normal observation state (wide-angle end), the intermediate state, and the close-up magnified observation state (telephoto end), are shown in Table 5. FIGS. 6, 7, and 8 respectively show aberration curves of the magnifying endoscope objective lens according to this Example in the normal observation state (wide-angle end), the intermediate state, and the close-up magnified-observation state (telephoto end). The configurations of the magnifying endoscope objective lens according to this Example in the normal observation state (wide-angle end), the intermediate state, and the close-up magnified-observation state (telephoto end) are shown in FIG. 5, in this order from the top.

TABLE 4

| SURFACE NUMBER | RADIUS OF CURVATURE | SURFACE SEPARATION | INDEX OF REFRACTION Nd | ABBE CONSTANT Vd |
| --- | --- | --- | --- | --- |
| 1 | ∞ | 0.300 | 1.88814 | 40.78 |
| 2 | 0.9665 | 0.568 | | |
| 3 | ∞ | 0.480 | 1.51564 | 75.00 |
| 4 | ∞ | 0.214 | | |
| 5 | −5.9100 | 0.808 | 1.48915 | 70.23 |
| 6 | −1.3070 | 0.020 | | |
| 7 | −1.6595 | 0.880 | 1.48915 | 70.23 |
| 8 | −1.0864 | 0.269 | 1.85504 | 23.78 |
| 9 | −1.5285 | 0.016 | | |
| 10 | 4.2597 | 0.645 | 1.48915 | 70.23 |
| 11 | −1.4280 | 0.200 | 2.01169 | 28.27 |
| 12 | −2.1072 | 0.060 | | |
| 13 | DIAPHRAGM | D13 | | |
| 14 | −1.7184 | 0.160 | 1.60520 | 65.44 |
| 15 | 2.1085 | 0.768 | 1.59667 | 35.31 |
| 16 | −1.7891 | D16 | | |
| 17 | −10.6213 | 0.200 | 1.56606 | 60.67 |
| 18 | 2.1389 | D18 | | |
| 19 | 3.6629 | 1.003 | 1.49846 | 81.54 |
| 20 | −7.9650 | 0.047 | | |
| 21 | 3.4408 | 0.507 | 1.48915 | 70.23 |
| 22 | 7.1498 | 0.042 | | |
| 23 | 2.9775 | 1.209 | 1.48915 | 70.23 |
| 24 | −7.0513 | 0.199 | | |
| 25 | −4.0321 | 0.327 | 1.93429 | 18.90 |
| 26 | 5.1945 | 0.560 | | |
| 27 | ∞ | 0.310 | 1.52498 | 59.89 |
| 28 | ∞ | 0.781 | | |
| 29 | ∞ | 1.200 | 1.50801 | 60.00 |
| 30 | ∞ | D30 | | |

TABLE 5

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
| --- | --- | --- | --- |
| D0 | 15.00 | 1.33 | 0.02 |
| D13 | 0.23 | 0.23 | 3.19 |
| D16 | 0.05 | 0.92 | 0.22 |
| D18 | 3.35 | 2.49 | 0.22 |
| FOCAL LENGTH | 1.270 | 1.458 | 1.195 |
| Fno | 5.98 | 7.49 | 7.55 |
| MAGNIFICATION | −0.08 | −0.70 | −2.92 |

The image-acquisition optical system in this Example is formed of, in order from the object side, a first lens group G1 with positive refractive power, a second lens group G2 with positive refractive power, a third lens group G3 with negative refractive power, and a fourth lens group G4 with positive refractive power, as well as a lens driving device (not shown in the drawing) for moving the second lens group G2 and the third lens group G3 along the optical axis.

The first lens group G1 is formed of a negative lens, a positive lens, a compound lens formed of a positive lens and a negative lens, and a compound lens formed of a positive lens and a negative lens, arranged in this order from the object side. The second lens group G2 is formed of a compound lens formed of a negative lens and a positive lens. The third lens group G3 is formed of a negative lens. An aperture stop S is disposed between the first lens group G1 and the second lens group G2, and the aperture stop S is fixed behind the first lens group G1. The fourth lens group G4 is formed of a positive lens, a positive lens, a positive lens, and a negative lens, arranged in this order from the object side.

In observing from the normal observation state (wide-angle end) to the intermediate state, the image-acquisition optical system of this Example performs power varying and focusing by moving only the third lens group G3 with the lens driving device, and in observing from the intermediate state to the close-up magnified-observation state (telephoto end), performs power varying and focusing by moving both the second lens group G2 and the third lens group G3 with the lens driving device. The aperture stop S, which is constructed so that the opening diameter thereof can be adjusted, is set to have a larger opening diameter in the close-up magnified-observation state (telephoto end) than in the other observation states.

A parallel flat plate F1 in the first lens group G1 and a parallel flat plate F2 between the fourth lens group G4 and the image-acquisition device are filters for cutting light of specific wavelengths, for example, 1060-nm light from a YAG laser or 810-nm light from a semiconductor laser, or a wavelength range of infrared light.

The image-acquisition optical system in this Example uses an image-acquisition element satisfying conditional expression (3) as the image-acquisition element, to form an image-acquisition unit that can be installed in an endoscope. Therefore, it is possible to examine biological tissue at the cellular level to carry out diagnosis.

EXAMPLE 3

Figure 9:
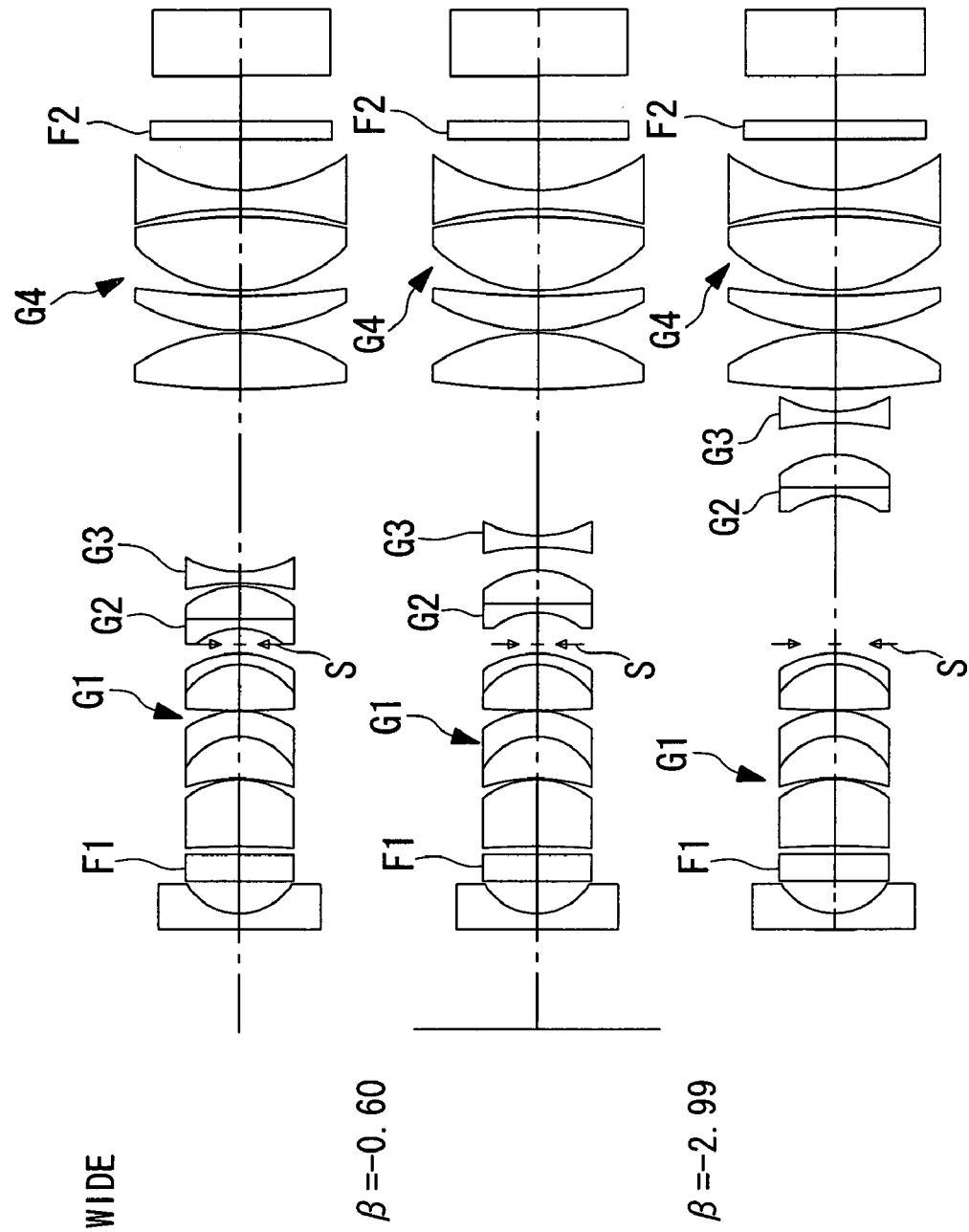
FIG. 9 is a sectional view showing Example 3 of the image-acquisition optical system according to an embodiment of the present invention.
Figure 10:
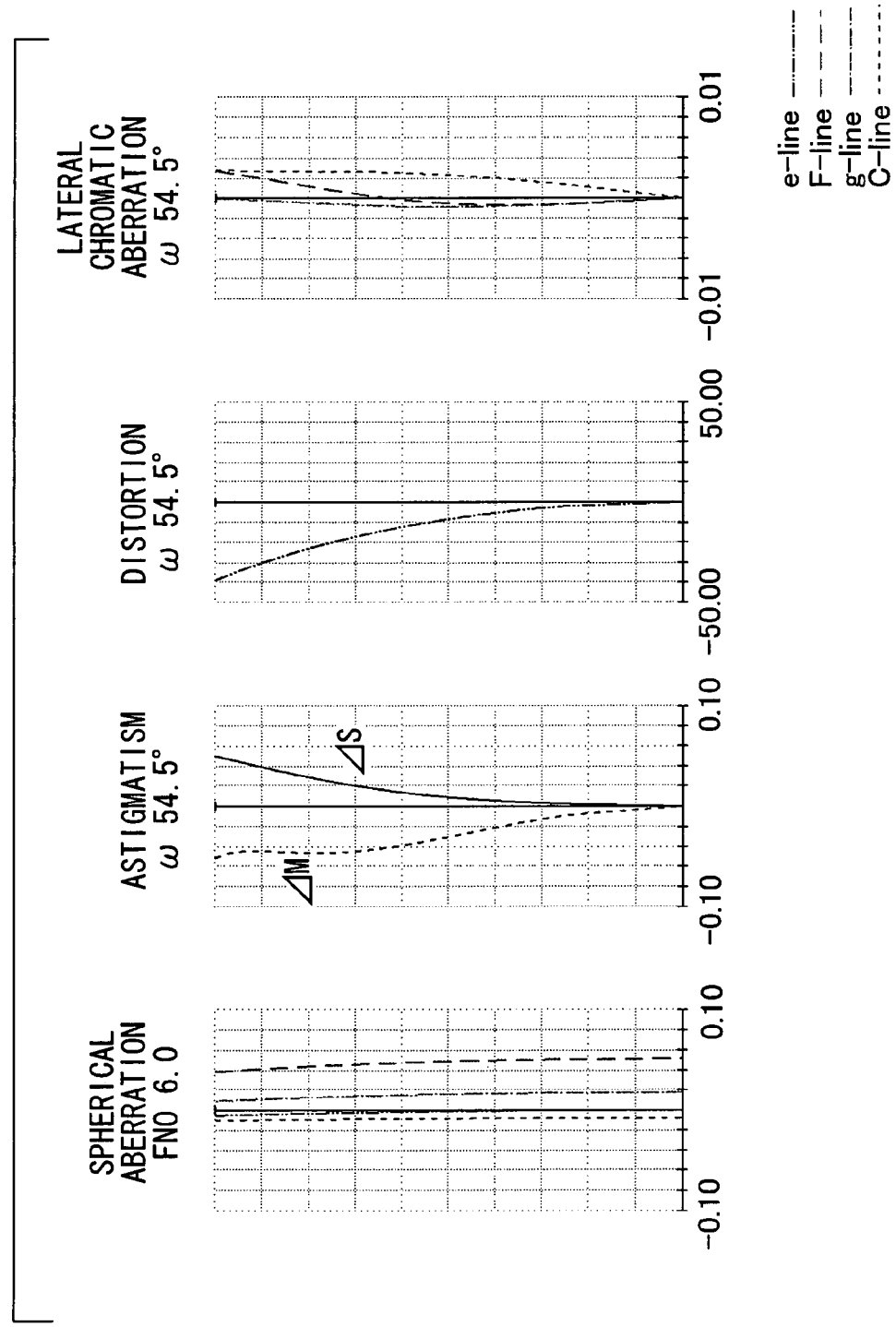
FIG. 10 is an aberration diagram of the image-acquisition optical system in FIG. 9.
Figure 11:
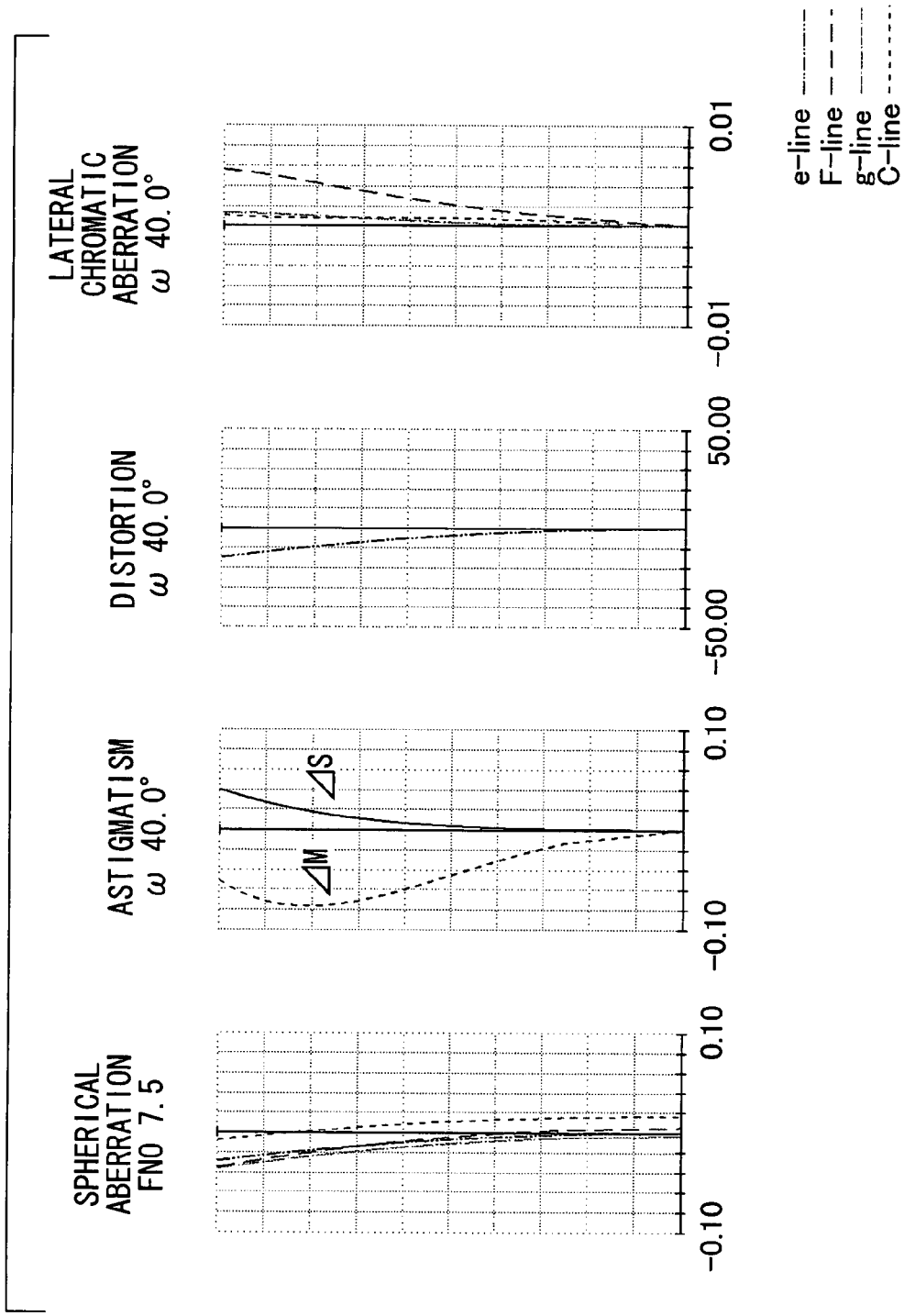
FIG. 11 is an aberration diagram of the image-acquisition optical system in FIG. 9.

The configuration of a magnifying endoscope objective lens according to this Example is shown in FIG. 9. The design data of the magnifying endoscope objective lens of this Example is shown in Table 6, and the values of variable parameters of the magnifying endoscope objective lens according to this Example in each state, that is, the normal observation state (wide-angle end), the intermediate state, and the close-up magnified observation state (telephoto end), are shown in Table 7. FIGS. 10, 11, and 12 respectively show aberration curves of the magnifying endoscope objective lens according to this Example in the normal observation state (wide-angle end), the intermediate state, and the close-up magnified-observation state (telephoto end). The configurations of the magnifying endoscope objective lens according to this Example in the normal observation state (wide-angle end), the intermediate state, and the close-up magnified-observation state (telephoto end) are shown in FIG. 9, in this order from the top.

TABLE 6

| SURFACE NUMBER | RADIUS OF CURVATURE | SURFACE SEPARATION | INDEX OF REFRACTION Nd | ABBE CONSTANT Vd |
|---|---|---|---|---|
| 1  | ∞        | 0.280 | 1.88814 | 40.78 |
| 2  | 1.1135   | 0.568 |         |       |
| 3  | ∞        | 0.482 | 1.51564 | 75.00 |
| 4  | ∞        | 0.164 |         |       |
| 5  | −11.5354 | 1.199 | 1.48915 | 70.23 |
| 6  | −1.5937  | 0.017 |         |       |
| 7  | −3.2477  | 0.735 | 1.48915 | 70.23 |
| 8  | −1.1248  | 0.446 | 1.85504 | 23.78 |
| 9  | −1.7087  | 0.016 |         |       |
| 10 | 17.6407  | 0.807 | 1.48915 | 70.23 |
| 11 | −1.2021  | 0.200 | 2.01169 | 28.27 |
| 12 | −1.7365  | 0.160 |         |       |
| 13 | DIAPHRAGM | D13  |         |       |
| 14 | −1.2990  | 0.160 | 1.60520 | 65.44 |
| 15 | 391.5031 | 0.589 | 1.70442 | 30.13 |
| 16 | −1.5298  | D16   |         |       |
| 17 | −4.2334  | 0.200 | 1.56606 | 60.67 |
| 18 | 2.0245   | D18   |         |       |
| 19 | 13.6209  | 1.000 | 1.49846 | 81.54 |
| 20 | −3.4492  | 0.047 |         |       |
| 21 | 3.7872   | 0.612 | 1.48915 | 70.23 |
| 22 | 12.6718  | 0.096 |         |       |
| 23 | 2.6412   | 1.325 | 1.48915 | 70.23 |
| 24 | −9.4908  | 0.144 |         |       |
| 25 | −6.8639  | 0.327 | 1.93429 | 18.90 |
| 26 | 3.2569   | 0.886 |         |       |
| 27 | ∞        | 0.311 | 1.52498 | 59.89 |
| 28 | ∞        | 0.789 |         |       |
| 29 | ∞        | 1.166 | 1.51825 | 64.14 |
| 30 | ∞        | D30   |         |       |

TABLE 7

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 15.55 | 1.76 | 0.02 |
| D13 | 0.28 | 0.56 | 2.62 |
| D16 | 0.05 | 0.42 | 0.56 |
| D18 | 3.25 | 2.60 | 0.40 |
| FOCAL LENGTH | 1.343 | 1.598 | 1.313 |
| Fno | 6.00 | 7.54 | 7.80 |
| MAGNIFICATION | −0.08 | −0.60 | −2.99 |

The image-acquisition optical system of this Example is formed of, in order from the object side, a first lens group G1 with positive refractive power, a second lens group G2 with positive refractive power, a third lens group G3 with negative refractive power, and a fourth lens group G4 with positive refractive power, as well as a lens driving device (not shown in the drawing) for moving the second lens group G2 and the third lens group G3 along the optical axis.

The first lens group G1 is formed of a negative lens, a positive lens, a compound lens formed of a positive lens and a negative lens, and a compound lens formed of a positive lens and a negative lens, arranged in this order from the object side. The second lens group G2 is formed of a compound lens formed of a negative lens and a positive lens. The third lens group G3 is formed of a negative lens. An aperture stop S is disposed between the first lens group G1 and the second lens group G2, and the aperture stop S is fixed behind the first lens group G1. The fourth lens group G4 is formed of a positive lens, a positive lens, a positive lens, and a negative lens, arranged in this order from the object side.

The image-acquisition optical system of this Example performs power varying and focusing from the normal observation state (wide-angle end) to the intermediate state by moving the second lens group G2 and the third lens group G3 independently of each other using the lens driving device, and from the intermediate state to the close-up magnified-observation state (telephoto end) by moving the second lens group G2 and the third lens group G3 independently of each other using the lens driving device. Thus, in the image-acquisition optical system of this Example, by performing power varying and focusing by always moving the second lens group G2 and the third lens group G3, it is possible to effectively correct axial chromatic aberration and off-axis chromatic aberration in any observation state, and it is therefore possible to acquire high-definition images. The aperture stop S, which is constructed so that the opening diameter thereof can be adjusted, is set to have a larger opening diameter in the close-up magnified-observation state (telephoto end) than in the other observation states.

A parallel flat plate F1 in the first lens group G1 and a parallel flat plate F2 between the fourth lens group G4 and the image-acquisition device are filters for cutting light of specific wavelengths, for example, 1060-nm light from a YAG laser or 810-nm light from a semiconductor laser, or a wavelength range of infrared light.

The image-acquisition optical system in this Example uses an image-acquisition element satisfying conditional expression (3) as the image-acquisition element, to form an image-acquisition unit that can be installed in an endoscope. Therefore, it is possible to examine biological tissue at the cellular level to carry out diagnosis.

EXAMPLE 4

Figure 13:
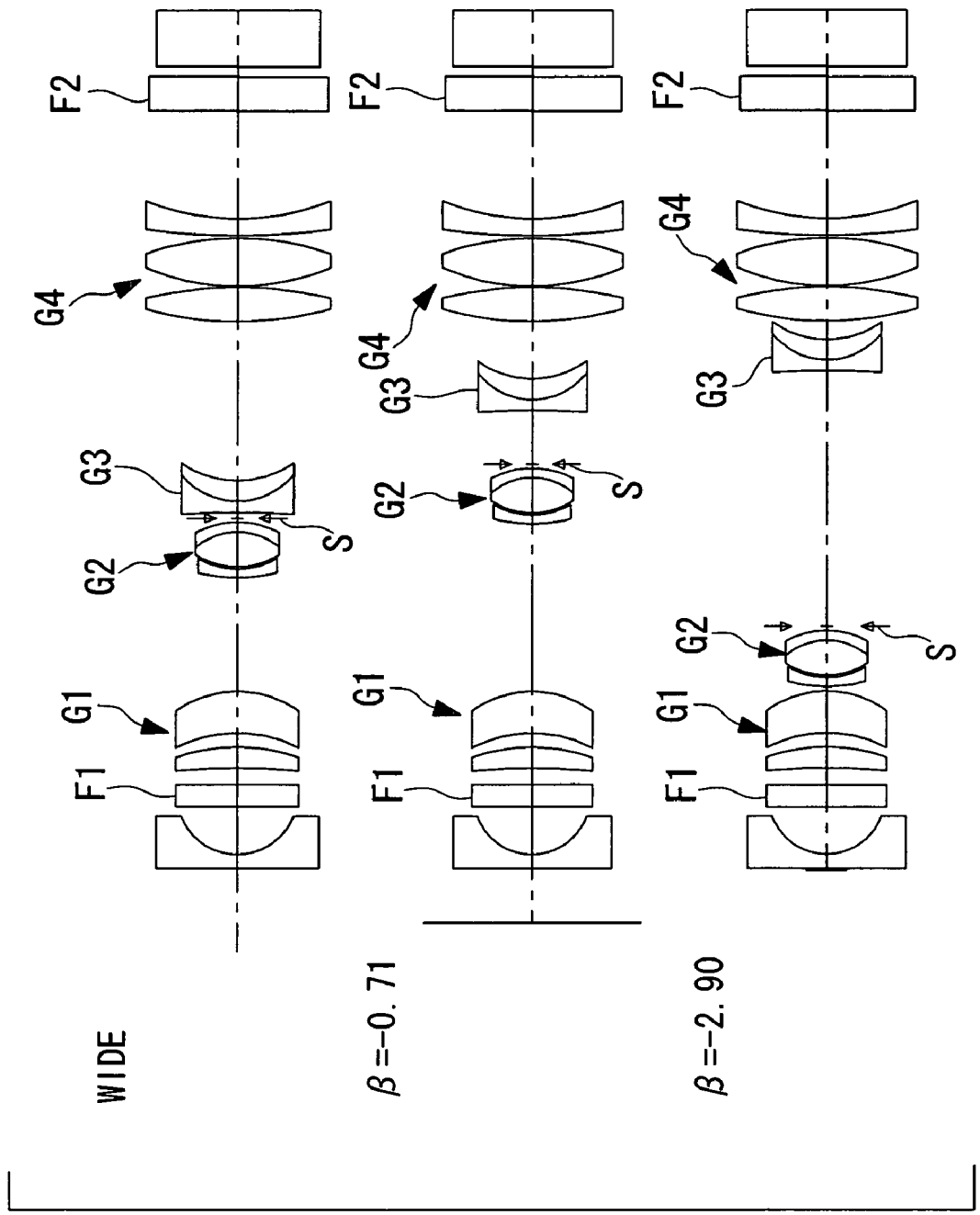
FIG. 13 is a sectional view showing Example 4 of the image-acquisition optical system according to an embodiment of the present invention.
Figure 14:
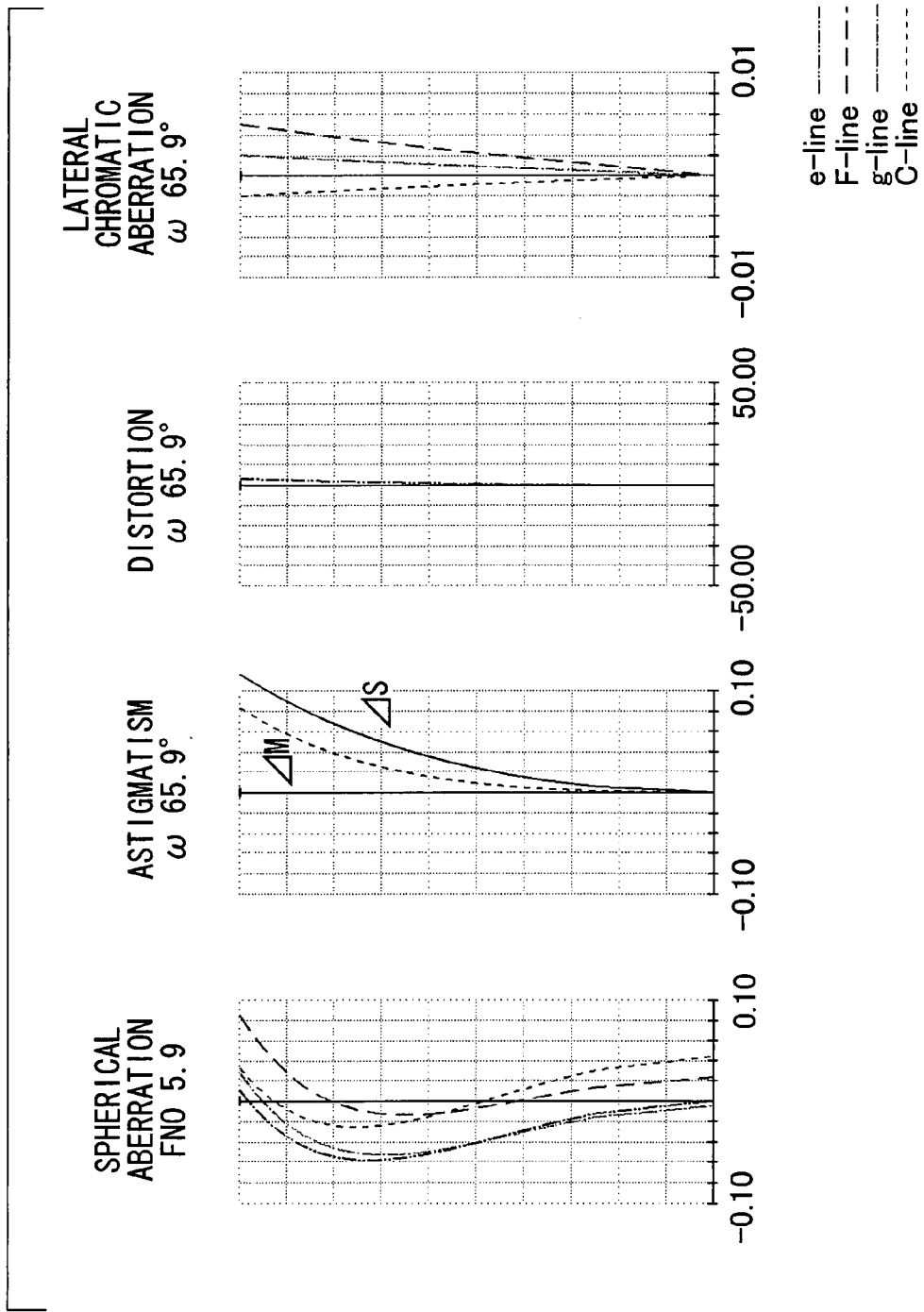
FIG. 14 is an aberration diagram of the image-acquisition optical system in FIG. 13.
Figure 15:
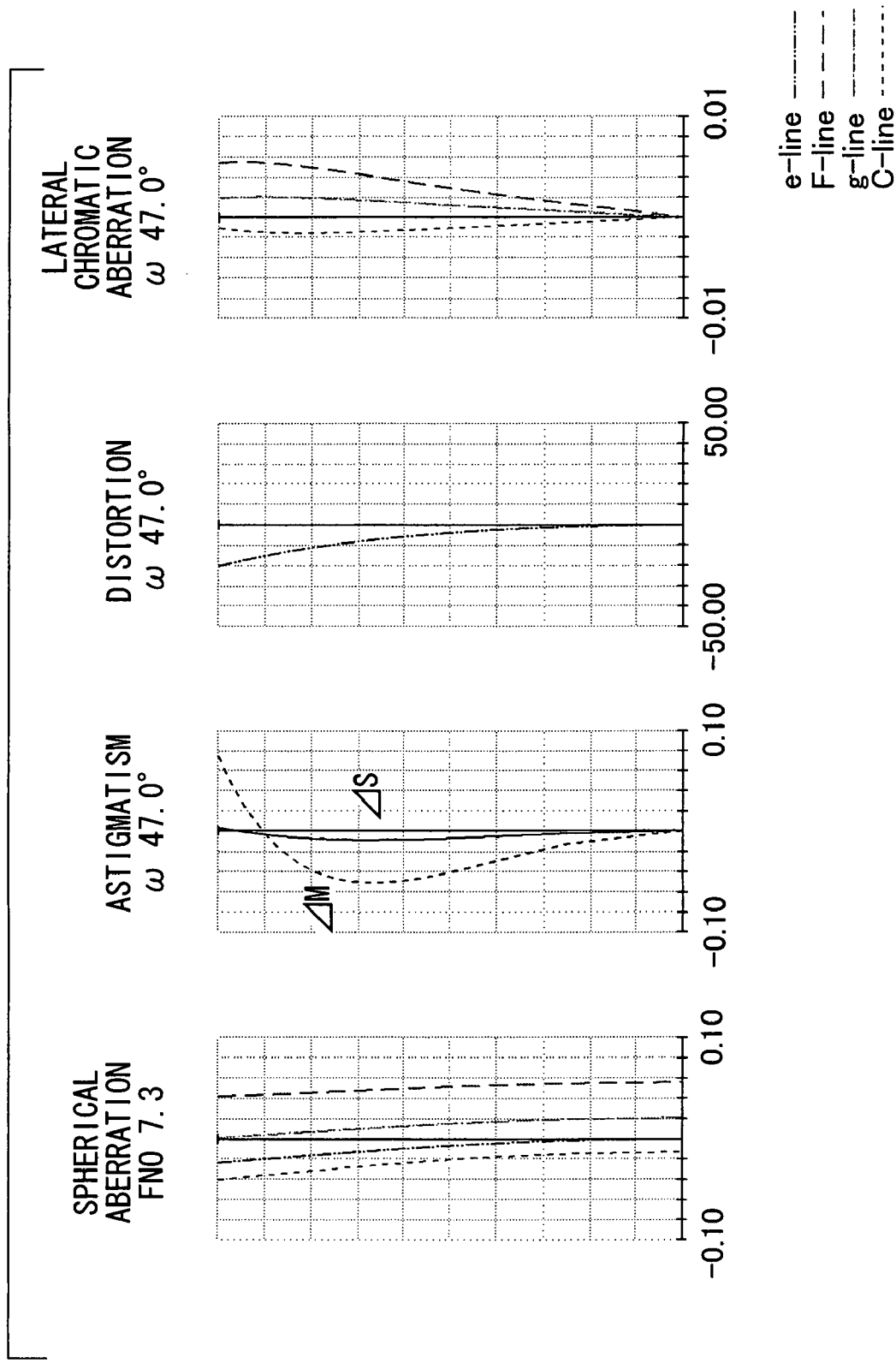
FIG. 15 is an aberration diagram of the image-acquisition optical system in FIG. 13.
Figure 16:
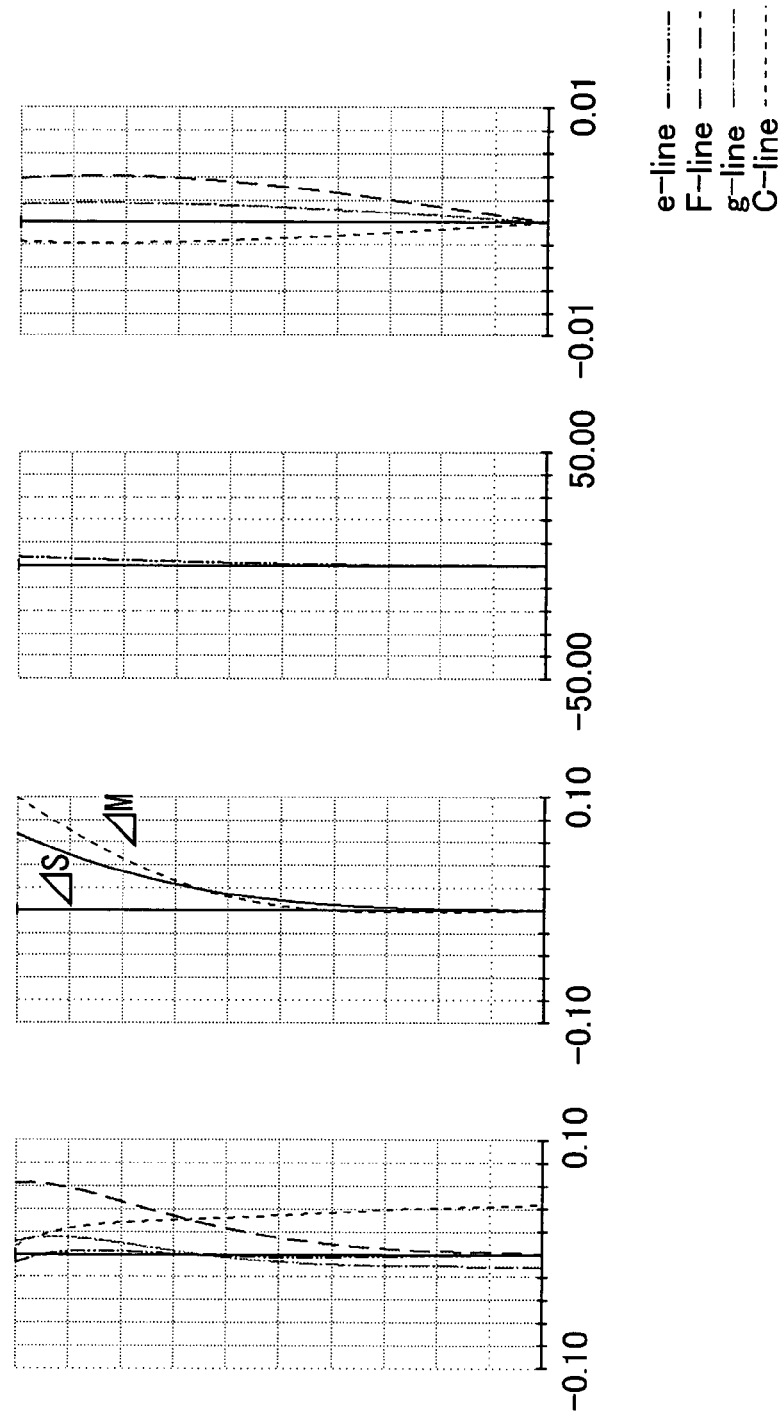
FIG. 16 is an aberration diagram of the image-acquisition optical system in FIG. 13.

The configuration of a magnifying endoscope objective lens according to this Example is shown in FIG. 13. The design data of the magnifying endoscope objective lens of this Example is shown in Table 8, and the values of variable parameters of the magnifying endoscope objective lens according to this Example in each state, that is, the normal observation state (wide-angle end), the intermediate state, and the close-up magnified-observation state (telephoto end), are shown in Table 9. FIGS. 14, 15, and 16 respectively show aberration curves of the magnifying endoscope objective lens according to this Example in the normal observation state (wide-angle end), the intermediate state, and the close-up magnified-observation state (telephoto end). The configurations of the magnifying endoscope objective lens according to this Example in the normal observation state (wide-angle end), the intermediate state, and the close-up magnified-observation state (telephoto end) are shown in FIG. 13, in this order from the top.

TABLE 8

| SURFACE NUMBER | RADIUS OF CURVATURE | SURFACE SEPARATION | INDEX OF REFRACTION Nd | ABBE CONSTANT Vd |
|---|---|---|---|---|
| 1 | ∞ | 0.260 | 1.88814 | 40.78 |
| 2 | 1.0783 | 0.840 | | |
| 3 | ∞ | 0.400 | 1.51564 | 75.00 |
| 4 | ∞ | 0.300 | | |
| 5 | −12.9582 | 0.378 | 1.59143 | 61.14 |
| 6 | −3.3390 | 0.244 | | |
| 7 | −2.4574 | 0.752 | 1.59911 | 39.24 |
| 8 | −1.8586 | D8 | | |
| 9 | 2.7326 | 0.160 | 1.88815 | 40.76 |
| 10 | 1.4033 | 0.040 | | |
| 11 | 1.3935 | 0.628 | 1.48915 | 70.23 |
| 12 | −1.1556 | 0.172 | 2.01169 | 28.27 |
| 13 | −1.5950 | 0.072 | | |
| 14 | DIAPHRAGM | D14 | | |
| 15 | −17.0817 | 0.200 | 1.48915 | 70.23 |
| 16 | 1.2784 | 0.372 | 1.69417 | 31.07 |
| 17 | 1.7155 | D17 | | |
| 18 | 6.0465 | 0.625 | 1.49846 | 81.54 |
| 19 | −6.142 ASP | 0.014 | | |
| 20 | 4.3161 | 0.858 | 1.49846 | 81.54 |
| 21 | −5.0355 | 0.040 | | |
| 22 | 12.2602 | 0.300 | 1.93429 | 18.90 |
| 23 | 4.4444 | 1.932 | | |
| 24 | ∞ | 0.600 | 1.52498 | 59.89 |
| 25 | ∞ | 0.180 | | |
| 26 | ∞ | 1.000 | 1.51825 | 64.14 |
| 27 | ∞ | D27 | | |

TABLE 9

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 24.00 | 0.97 | 0.02 |
| D8 | 2.04 | 3.01 | 0.08 |
| D14 | 0.10 | 0.97 | 4.61 |
| D17 | 2.88 | 1.04 | 0.34 |
| FOCAL LENGTH | 1.347 | 1.417 | 1.704 |
| Fno | 5.88 | 7.26 | 7.87 |
| MAGNIFICATION | −0.05 | −0.71 | −2.90 |

The image-acquisition optical system of this Example is formed of, in order from the object side, a first lens group G1 with negative refractive power, a second lens group G2 with positive refractive power, a third lens group G3 with negative refractive power, and a fourth lens group G4 with positive refractive power, as well as a lens driving device (not shown in the drawing) for moving the second lens group G2 and the third lens group G3 along the optical axis.

The first lens group G1 is formed of a negative lens, a positive lens, and a negative lens, arranged in this order from the object side. The second lens group G2 is formed of a negative lens and a compound lens formed of a negative lens and a positive lens. The third lens group G3 is formed of a compound lens formed of a negative lens and a positive lens. An aperture stop S is disposed between the second lens group G2 and the third lens group G3. The fourth lens group G4 is formed of a positive lens, a positive lens, and a negative lens, arranged in this order from the object side. The lens at the extreme object side of the fourth lens group G4 has one surface that is aspherical.

The aspherical surface of the lens at the extreme object side of the fourth lens group G4 is represented by the following expression, where x is the optical axis direction and y is a direction orthogonal to the optical axis:

$$x=(y^2/r)/[1+\{1-P(y^2/R^2)\}^{1/2}]+A4y^4+A6y^6+A8y^8+A10y^{10}$$

In this expression, r is the paraxial radius of curvature, P is a conical constant, and A4, A6, A8, and A10 are aspherical coefficients.

The image-acquisition optical system of this Example performs power varying and focusing from the normal observation state (wide-angle end) to the intermediate state by moving the second lens group G2 and the third lens group G3 independently of each other with the lens driving device, and from the intermediate state to the close-up magnified-observation state (telephoto-end) by moving the second lens group G2 and the third lens group G3 independently of each other using the lens driving device. Also, in the image-acquisition optical system of this Example, the aperture stop S is constructed so as to move together with the second lens group G2 as the second lens group G2 moves. The aperture stop S, which is constructed so that the opening diameter thereof can be adjusted, is set to have a larger opening diameter in the close-up magnified-observation state (telephoto end) than in the other observation states.

A parallel flat plate F1 in the first lens group G1 and a parallel flat plate F2 between the fourth lens group G4 and the image-acquisition device are filters for cutting light of specific wavelengths, for example, 1060-nm light from a YAG laser or 810-nm light from a semiconductor laser, or a wavelength range of infrared light.

The image-acquisition optical system in this Example uses an image-acquisition element satisfying conditional expression (3) as the image-acquisition element, forming an image-acquisition unit that can be installed in an endoscope. Therefore, it is possible to examine biological tissue at the cellular level to carry out diagnosis.

The aspherical coefficients for representing the aspherical surface at surface 19 are as shown in Table 10.

TABLE 10

| SURFACE NUMBER | R | k | A4 | A6 | A8 | A10 |
|---|---|---|---|---|---|---|
| 19 | −6.142 | 0.000 | $1.33120 \times 10^{-3}$ | $2.30926 \times 10^{-3}$ | $-1.21392 \times 10^{-3}$ | $2.68075 \times 10^{-4}$ |

EXAMPLE 5

Figure 17:
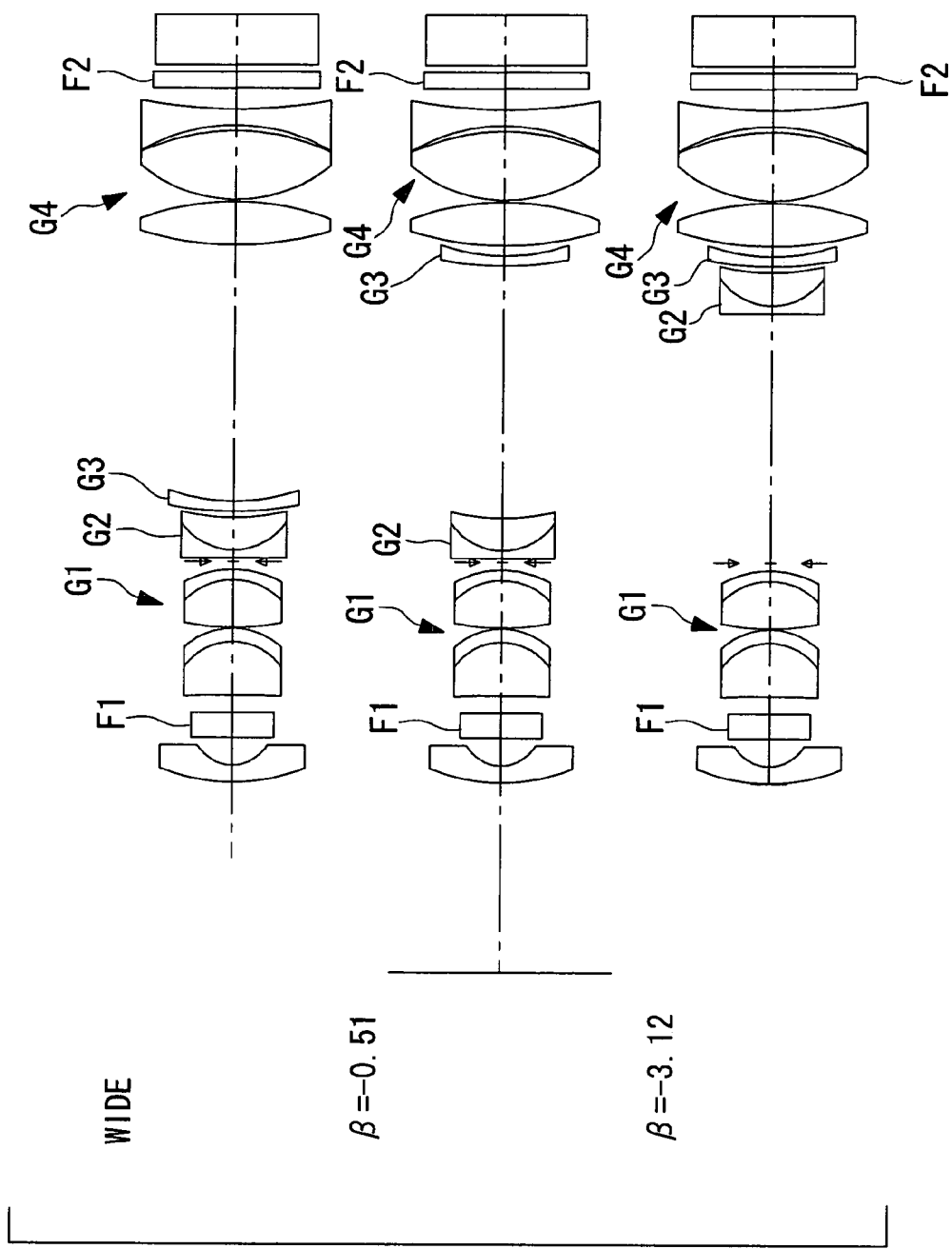
FIG. 17 is a sectional view showing Example 5 of the image-acquisition optical system according to an embodiment of the present invention.
Figure 18:
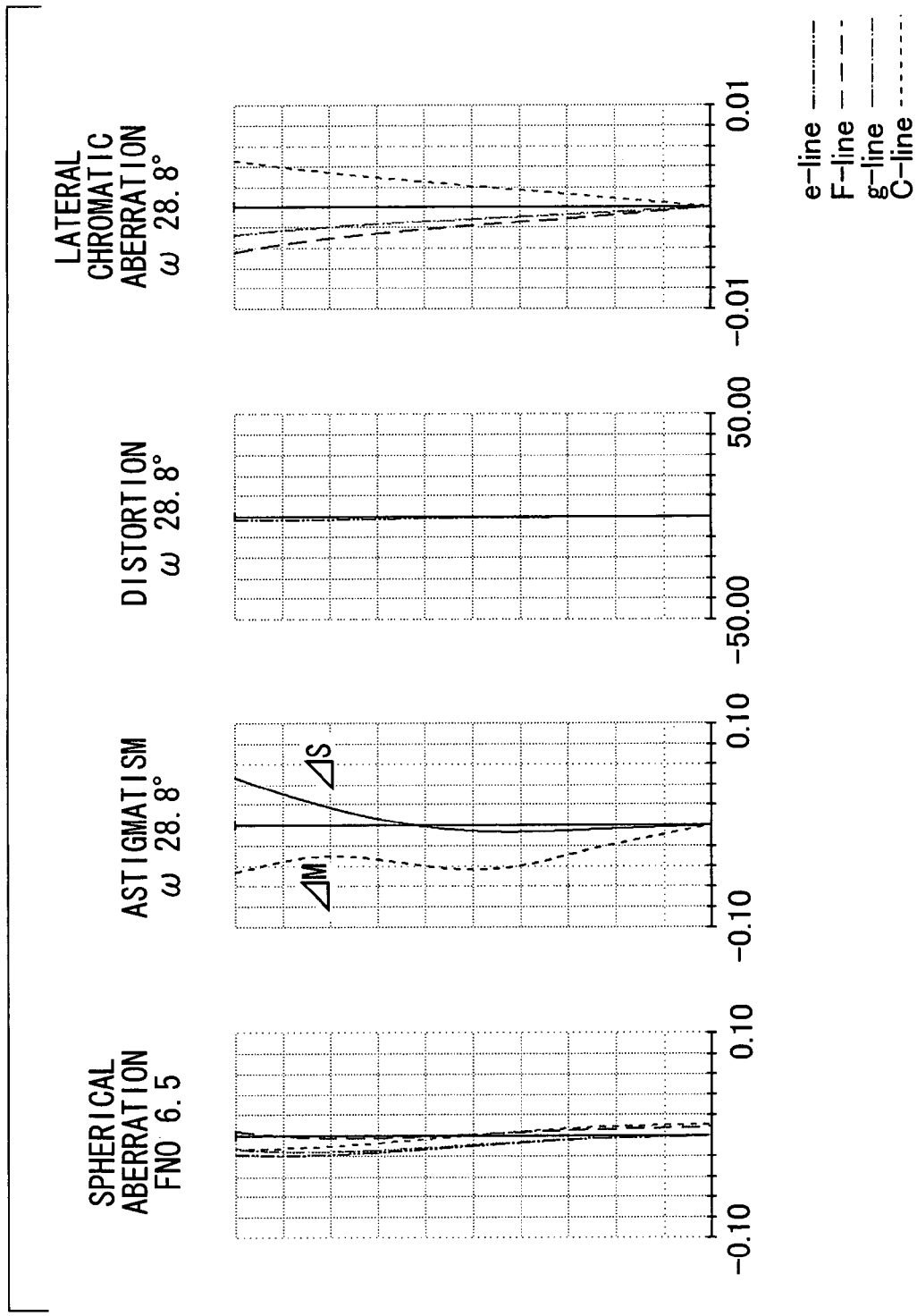
FIG. 18 is an aberration diagram of the image-acquisition optical system in FIG. 17.
Figure 19:
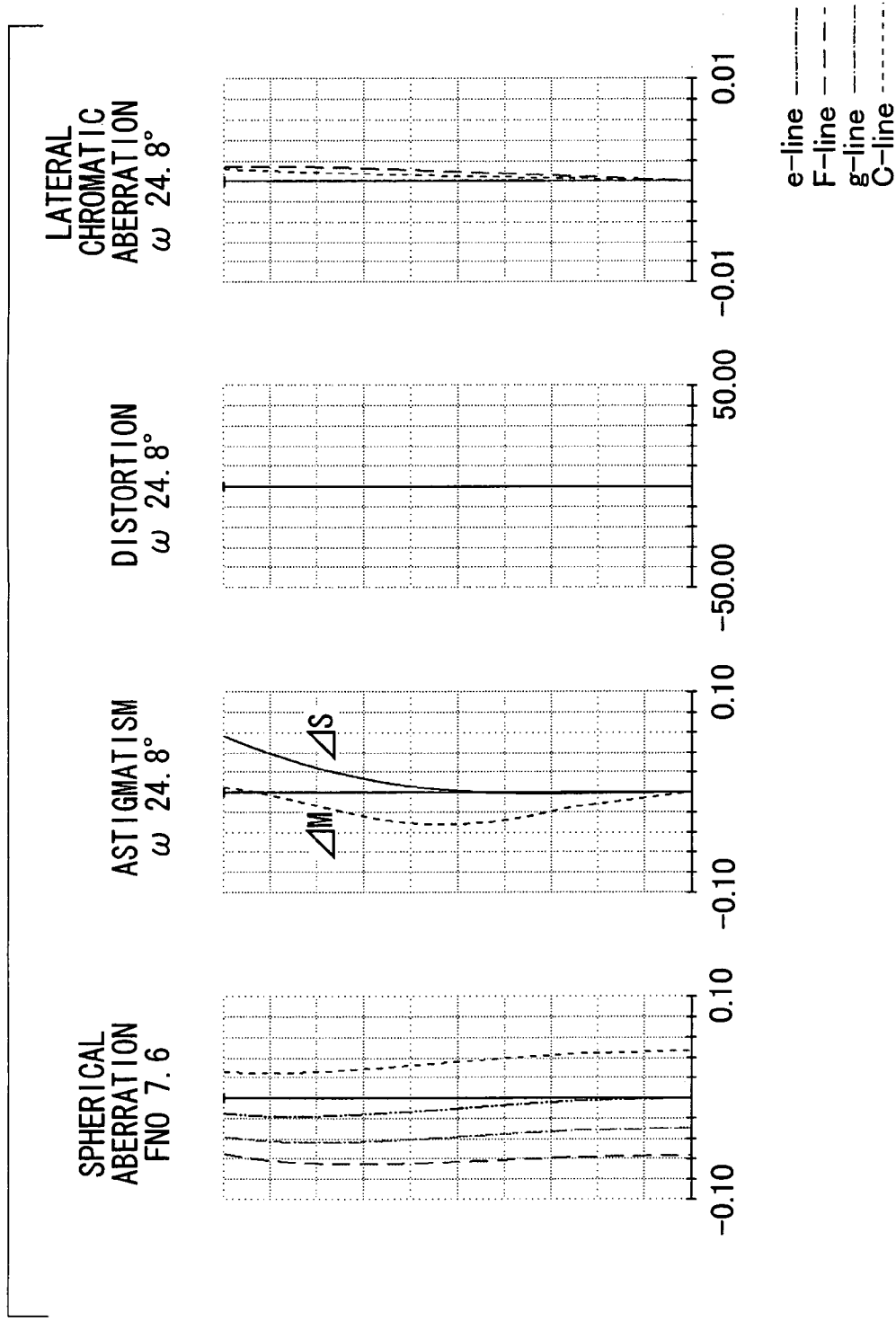
FIG. 19 is an aberration diagram of the image-acquisition optical system in FIG. 17.
Figure 20:
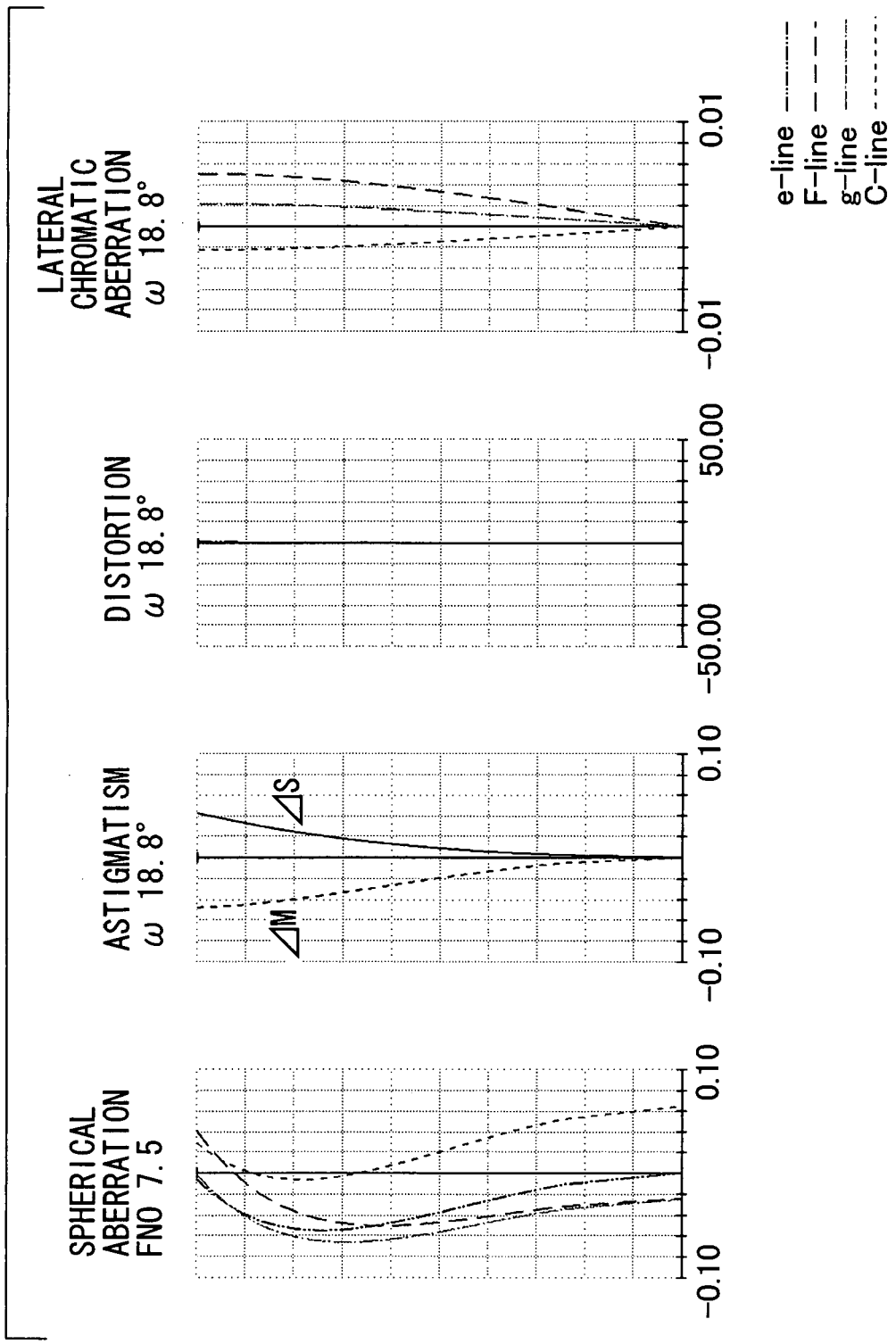
FIG. 20 is an aberration diagram of the image-acquisition optical system in FIG. 17.

A magnifying endoscope objective lens according to this Example is shown in FIG. 17. Design data of the magnifying endoscope objective lens of this Example is shown in Table 11, and the values of variable parameters of the magnifying endoscope objective lens according to this Example in each state, that is, the normal observation state (wide-angle end), the intermediate state, and the close-up magnified observation state (telephoto end), are shown in Table 12. FIGS. 18, 19, and 20 respectively show aberration curves of the magnifying endoscope objective lens according to this Example in the normal observation state (wide-angle end), the intermediate state, and the close-up magnified-observation state (telephoto end). Configurations of the magnifying endoscope objective lens according to this Example in the normal observation state (wide-angle end), the intermediate state, and the close-up magnified-observation state (telephoto end) are shown in FIG. 17, in this order from the top.

TABLE 11

| SURFACE NUMBER | RADIUS OF CURVATURE | SURFACE SEPARATION | INDEX OF REFRACTION Nd | ABBE CONSTANT Vd |
|---|---|---|---|---|
| 1 | 3.7989 | 0.330 | 1.88814 | 40.78 |
| 2 | 0.726 ASP | 0.568 | | |
| 3 | ∞ | 0.500 | 1.51564 | 75.00 |
| 4 | ∞ | 0.337 | | |
| 5 | −36.0718 | 1.060 | 1.48915 | 70.23 |
| 6 | −1.1626 | 0.269 | 1.85504 | 23.78 |
| 7 | −1.4134 | 0.016 | | |
| 8 | 4.6694 | 0.955 | 1.48915 | 70.23 |
| 9 | −1.3002 | 0.200 | 2.01169 | 28.27 |
| 10 | −2.0147 | 0.160 | | |
| 11 | DIAPHRAGM | D11 | | |
| 12 | −164.6544 | 0.160 | 1.60520 | 65.44 |
| 13 | 1.2497 | 0.648 | 1.59667 | 35.31 |
| 14 | 4.3451 | D14 | | |
| 15 | 6.7639 | 0.200 | 1.56606 | 60.67 |
| 16 | 3.8773 | D16 | | |

TABLE 11-continued

| SURFACE NUMBER | RADIUS OF CURVATURE | SURFACE SEPARATION | INDEX OF REFRACTION Nd | ABBE CONSTANT Vd |
|---|---|---|---|---|
| 17 | 6.5091 | 0.852 | 1.49846 | 81.54 |
| 18 | −5.4683 | 0.040 | | |
| 19 | 2.9449 | 1.340 | 1.48915 | 70.23 |
| 20 | −4.5431 | 0.110 | | |
| 21 | −3.8082 | 0.327 | 1.93429 | 18.90 |
| 22 | 9.8379 | 0.425 | | |
| 23 | ∞ | 0.311 | 1.52498 | 59.89 |
| 24 | ∞ | 0.147 | | |
| 25 | ∞ | 1.000 | 1.51825 | 64.14 |
| 26 | ∞ | D26 | | |

TABLE 12

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 500.00 | 3.74 | 0.01 |
| D11 | 0.08 | 0.08 | 4.92 |
| D14 | 0.12 | 4.96 | 0.12 |
| D16 | 5.04 | 0.20 | 0.20 |
| FOCAL LENGTH | 2.073 | 2.187 | 1.246 |
| Fno | 6.54 | 7.64 | 7.49 |
| MAGNIFICATION | −0.00 | −0.51 | −3.13 |

The image-acquisition optical system of this Example is formed of, in order from the object side, a first lens group G1 with positive refractive power, a second lens group G2 with negative refractive power, a third lens group G3 with negative refractive power, a fourth lens group G4 with positive refractive power, and a lens driving device (not shown in the drawing) for moving the second lens group G2 and the third lens group G3 along the optical axis.

This Example is a low-distortion lens; therefore, it is best suited for use as an image-acquisition optical system of a digital camera, a compact camera for a mobile telephone, or the like.

The first lens group G1 is formed of a negative lens, a compound lens formed of a positive lens and a negative lens, and a compound lens formed of a positive lens and a negative lens, arranged in this order from the object side. The lens at the extreme object side of the first lens group G1 has one surface formed as an aspherical surface. The second lens group G2 is formed of a compound lens formed of a negative lens and a positive lens. The third lens group G3 is formed of a negative lens. An aperture stop S is disposed between the first lens group G1 and the second lens group G2, and the aperture stop S is fixed behind the first lens group G1. The fourth lens group G4 is formed of a positive lens, a positive lens, and a negative lens, arranged in this order from the object side. The aspherical surface of the lens at the extreme object side of the first lens group G1 is represented by the following expression, where x is the optical axis direction and y is a direction orthogonal to the optical axis.

$$x = (y^2/r)/[1 + \{1 - P(y^2/R^2)\}^{1/2}] + A4y^4 + A6y^6 + A8y^8 + A10y^{10}$$

In this expression, r is the paraxial radius of curvature, P is a conical coefficient, and A4, A6, A8, and A10 are aspherical coefficients.

Power varying and focusing are performed from the normal observation state (wide-angle end) to the intermediate state by moving the third lens group G3, and power varying and focusing are performed from the intermediate state to the close-up magnified-observation state (telephoto-end) by moving the second lens group G2. Thus, the power varying and focusing functions are shared between the second lens group G2 and the third lens group G3, and by moving a single lens group on each side of the intermediate state, it is possible to simplify the mechanism for moving the lenses. In order to effectively share the power varying and focusing functions between the second lens group G2 and the third lens group G3, the optical system is constructed so as to move the second lens group G2 when satisfying conditional expression (11) below:

$$\beta' < -1.0 \quad (11)$$

where β' is the observation magnification in the intermediate state.

The aperture stop S, which is constructed so that the opening diameter thereof can be adjusted, is set to have a larger opening diameter in the close-up magnified-observation state (telephoto end) than in the other observation states.

A parallel flat plate F1 in the first lens group G1 and a parallel flat plate F2 between the fourth lens group G4 and the image-acquisition device are filters or low-pass filters for cutting light of specific wavelengths, for example, 1060-nm light from a YAG laser or 810-nm light from a semiconductor laser, or a wide wavelength range of infrared light.

The aspherical coefficients for representing the aspherical surface in the lens at the second surface (the aspherical surface in the lens at the extreme object side of the first lens group G1) of the magnifying endoscope objective lens in this Example are as shown in Table 13.

TABLE 13

| SURFACE NUMBER | R | k | A4 | A6 | A8 | A10 |
|---|---|---|---|---|---|---|
| 2 | 0.726 | 0.000 | $-1.76972 \times 10^{-1}$ | $1.75754 \times 10^{-1}$ | $-1.55218$ | $8.27607 \times 10^{-1}$ |

EXAMPLE 6

Figure 21:
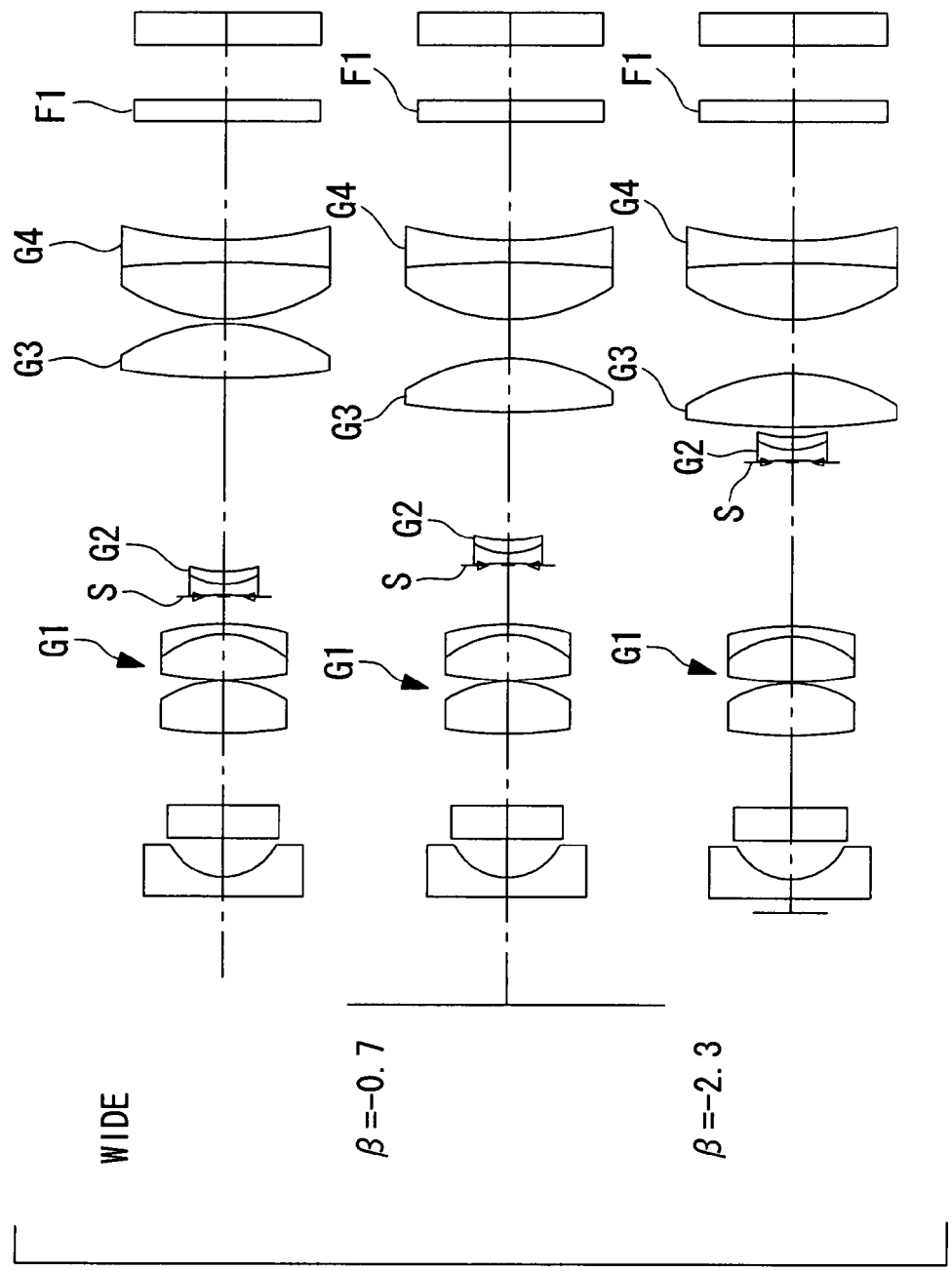
FIG. 21 is a sectional view showing Example 6 of the image-acquisition optical system according to an embodiment of the present invention.
Figure 23:
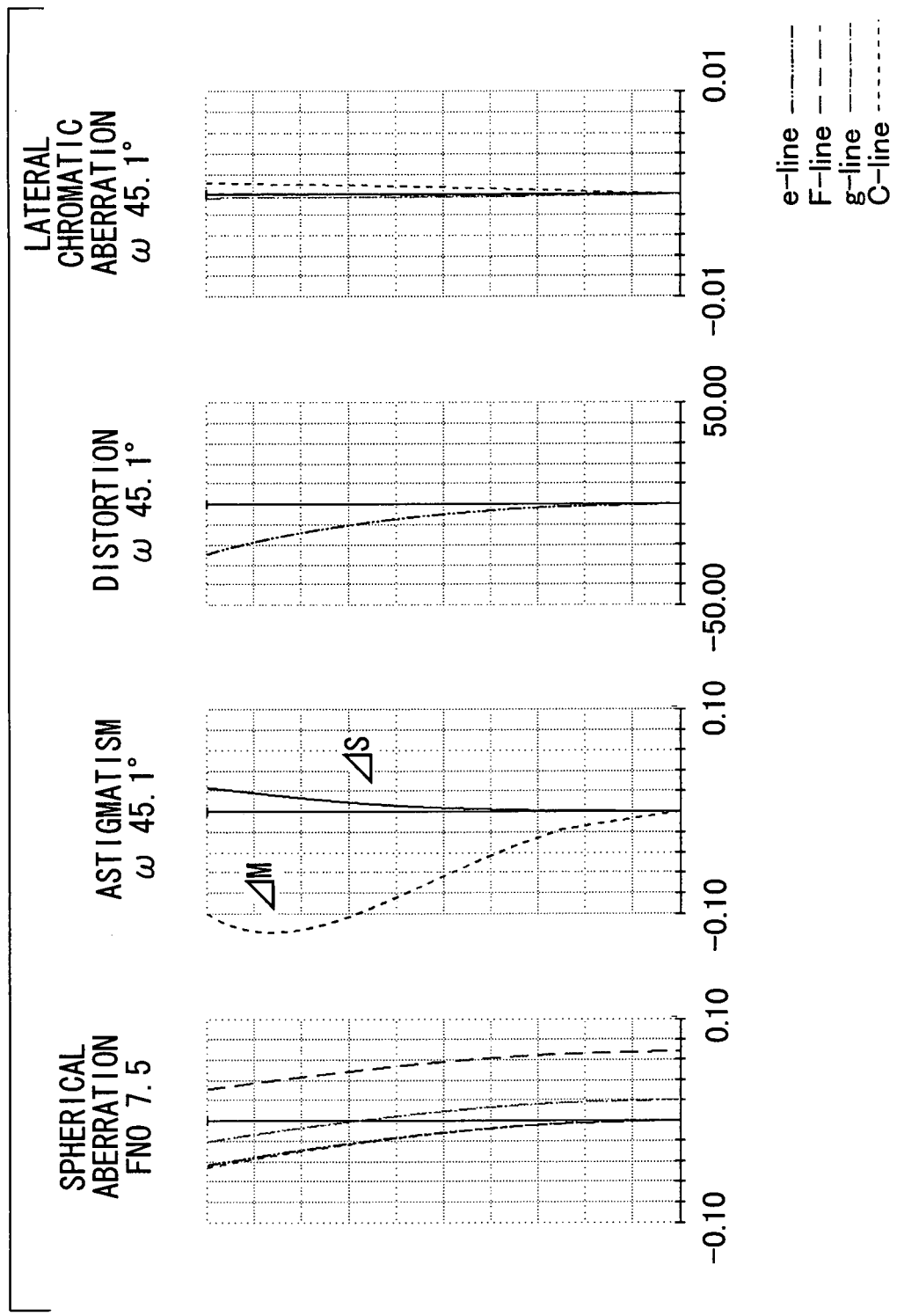
FIG. 23 is an aberration diagram of the image-acquisition optical system in FIG. 21.
Figure 24:
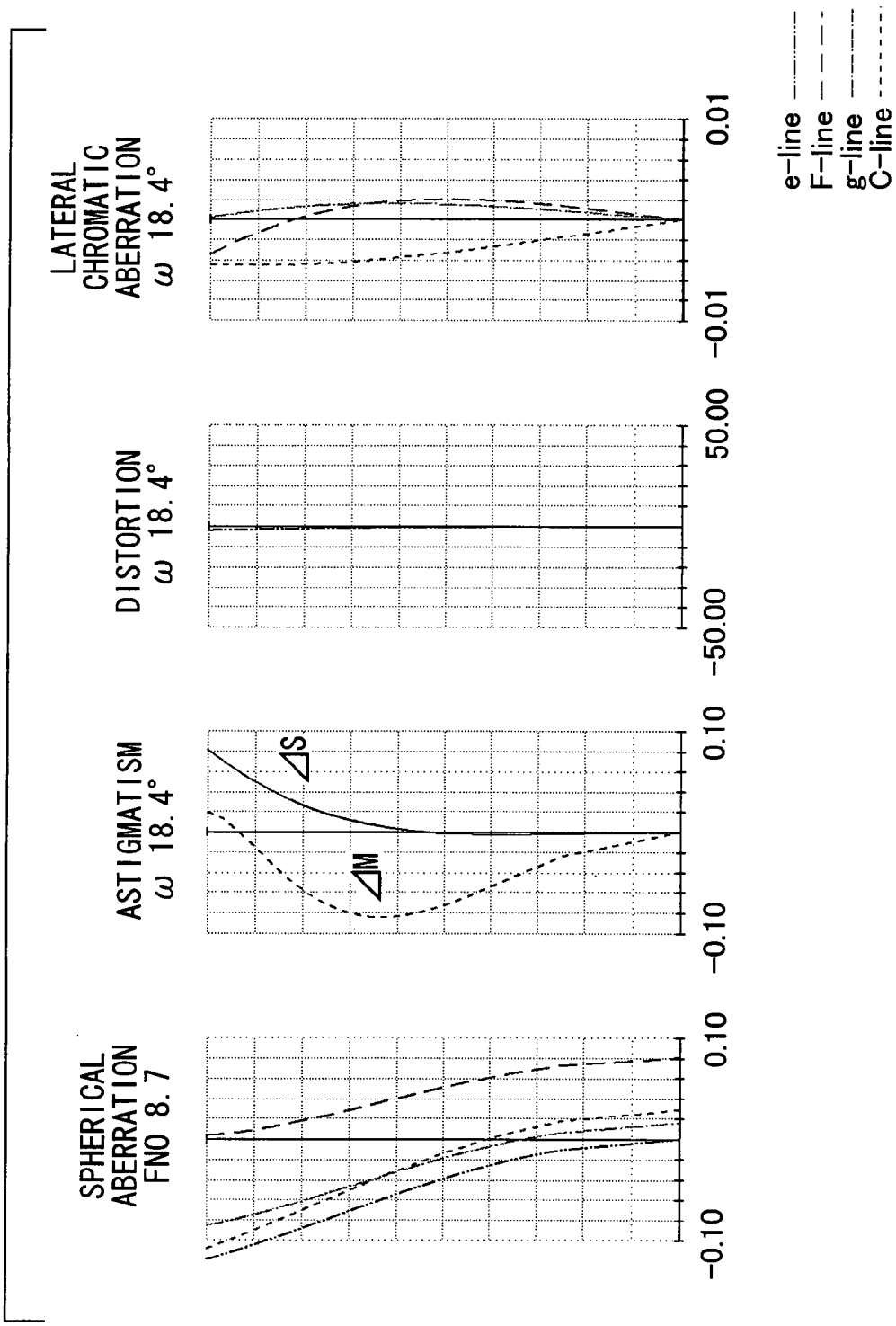
FIG. 24 is an aberration diagram of the image-acquisition optical system in FIG. 21.

The configuration of a magnifying endoscope objective lens according to this Example is shown in FIG. 21. The design data of the magnifying endoscope objective lens of this Example is shown in Table 14, and the values of variable parameters of the magnifying endoscope objective lens according to this Example in each state, that is, the normal observation state (wide-angle end), the intermediate state, and the close-up magnified observation state (telephoto end), are shown in Table 15. FIGS. 22, 23, and 24 respectively show aberration curves of the magnifying endoscope objective lens according to this Example in the normal observation state (wide-angle end), the intermediate state, and the close-up magnified-observation state (telephoto end).

TABLE 14

| SURFACE NUMBER | RADIUS OF CURVATURE | SURFACE SEPARATION | INDEX OF REFRACTION Nd | ABBE CONSTANT Vd |
|---|---|---|---|---|
| 1 | ∞ | 0.360 | 1.88814 | 40.78 |
| 2 | 1.1268 | 0.730 | | |
| 3 | ∞ | 0.620 | 1.51564 | 75.00 |
| 4 | ∞ | 1.379 | | |
| 5 | 7.6809 | 0.991 | 1.48915 | 70.23 |
| 6 | −2.1650 | 0.020 | | |
| 7 | 6.4186 | 0.834 | 1.64254 | 60.08 |
| 8 | −1.8148 | 0.200 | 2.01169 | 28.27 |
| 9 | −4.2665 | D9 | | |
| 10 | DIAPHRAGM | 0.030 | | |
| 11 | −24.8289 | 0.200 | 1.60520 | 65.44 |
| 12 | 1.3187 | 0.237 | 1.69417 | 31.07 |
| 13 | 2.3305 | D13 | | |
| 14 | 13.1694 | 0.996 | 1.48915 | 70.23 |
| 15 | −3.5702 | D15 | | |
| 16 | 3.4634 | 1.058 | 1.49846 | 81.54 |
| 17 | −20.8439 | 0.420 | 1.93429 | 18.90 |
| 18 | 7.6387 | 2.220 | | |
| 19 | ∞ | 0.400 | 1.52498 | 59.89 |
| 20 | ∞ | 1.000 | | |
| 21 | ∞ | 0.600 | 1.50801 | 60.00 |
| 22 | ∞ | | | |

TABLE 15

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 20.000 | 2.000 | 0.250 |
| D9 | 0.500 | 1.091 | 3.044 |
| D13 | 3.602 | 2.384 | 0.184 |
| D15 | 0.100 | 0.727 | 0.998 |
| FOCAL LENGTH | 1.847 | 2.030 | 1.820 |
| Fno | 6.95 | 7.52 | 8.46 |
| MAGNIFICATION | −0.09 | −0.70 | −2.32 |

The image-acquisition optical system of this Example is formed of, in order from the object side, a first lens group G1 with positive refractive power, a second lens group G2 with negative refractive power, a third lens group G3 with positive refractive power, and a fourth lens group G4 with positive refractive power, as well as a lens driving device (not shown in the drawing) for moving the second lens group G2 and the third lens group G3 along the optical axis.

The first lens group G1 is formed of a negative lens, a positive lens, and a compound lens formed of a positive lens and a negative lens, arranged in this order from the object side. The second lens group G2 is formed of a compound lens formed of a negative lens and a positive lens. The third lens group G3 is formed of a positive lens. The fourth lens group G4 is formed of a compound lens formed of a positive lens and a negative lens. An aperture stop S is disposed between the first lens group G1 and the second lens group G2, and the aperture stop S is constructed so as to move together with the second lens group G2.

The image-acquisition optical system of this Example performs power varying and focusing from the normal observation state (wide-angle end) to the intermediate state by independently moving the second lens group G2 and the third lens group G3, and from the intermediate state to the close-up magnified observation state (telephoto end) by independently moving the second lens group G2 and the third lens group G3. Regarding the aperture stop S, which is constructed so that the opening diameter thereof can be adjusted, the size of the opening diameter is switched in the intermediate state, and the opening diameter from the normal observation state (wide-angle end) to the intermediate state and the opening diameter from the intermediate state to the close-up magnified-observation state (telephoto end) are both kept constant.

A parallel flat plate F1 in the first lens group G1 and a parallel flat plate F2 between the fourth lens group G4 and the image-acquisition device are filters for cutting light of specific wavelengths, for example, 1060-nm light from a YAG laser or 810-nm light from a semiconductor laser, or a wavelength range of infrared light.

An image-acquisition device satisfying conditional expression (3) above is used as the image-acquisition device, forming an image-acquisition unit that can be installed in an endoscope. Therefore, it is possible to examine biological tissue at the cellular level to carry out diagnosis.

EXAMPLE 7

Figure 25:
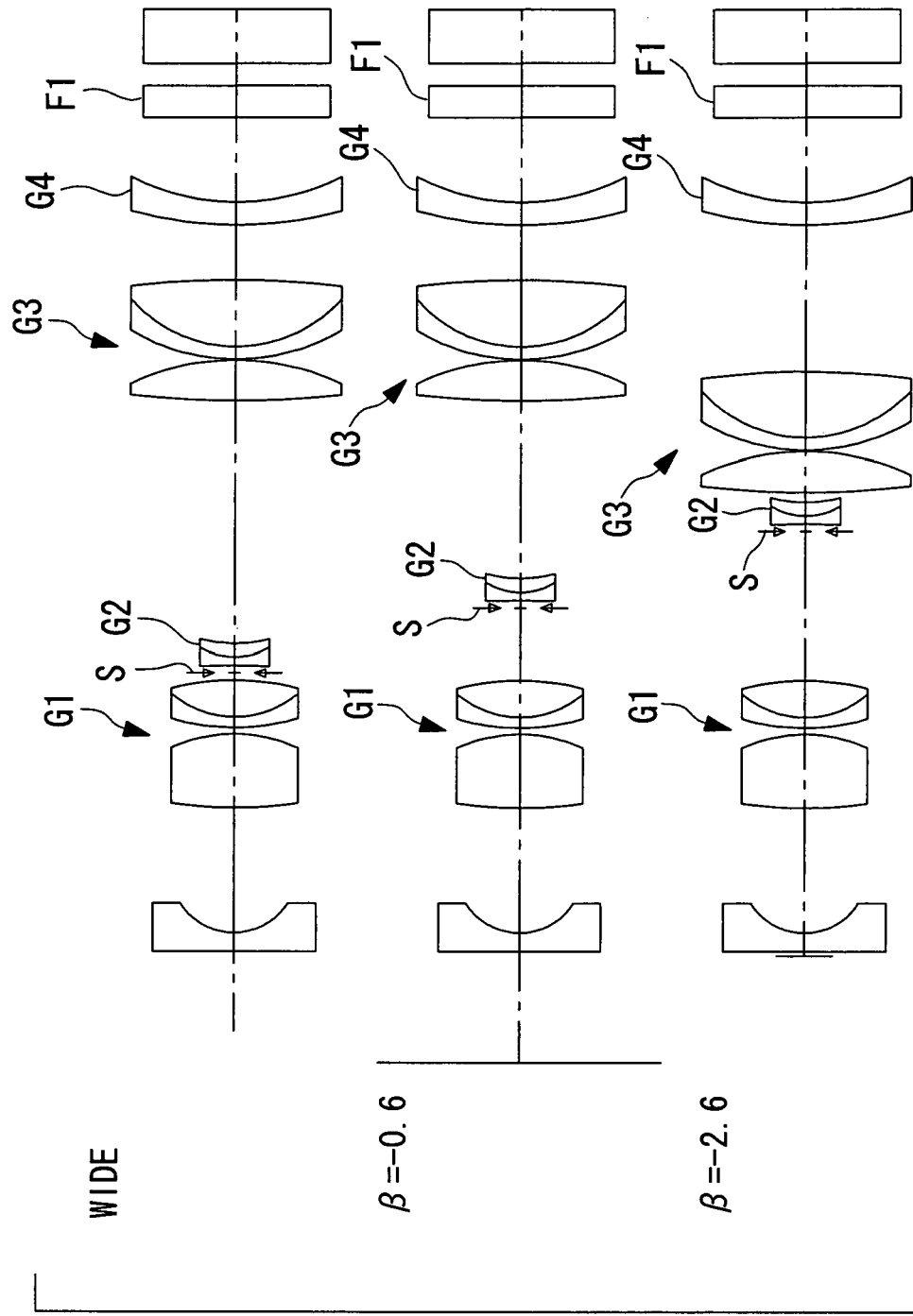
FIG. 25 is a sectional view showing Example 7 of the image-acquisition optical system according to an embodiment of the present invention.
Figure 26:
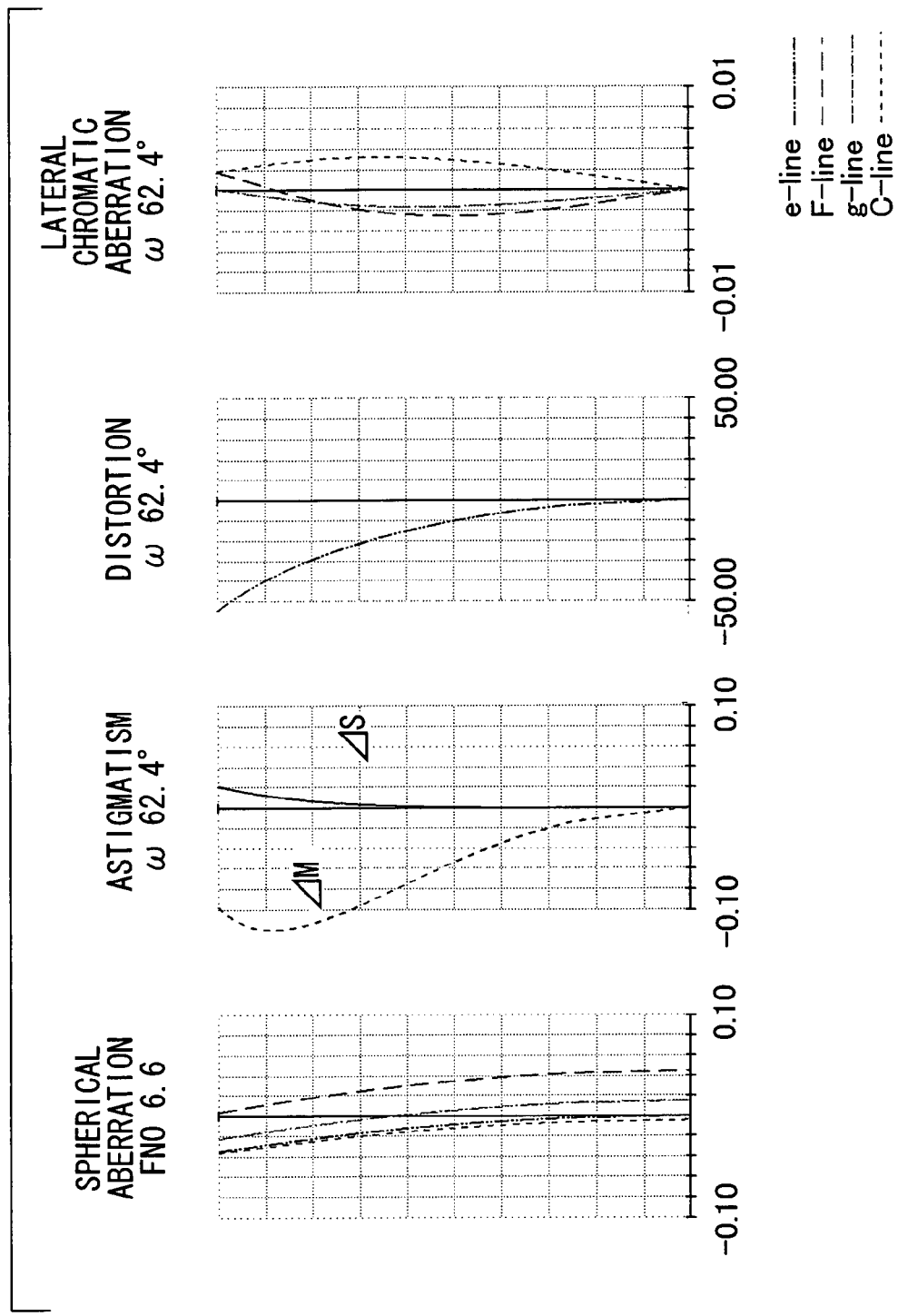
FIG. 26 is an aberration diagram of the image-acquisition optical system in FIG. 25.
Figure 27:
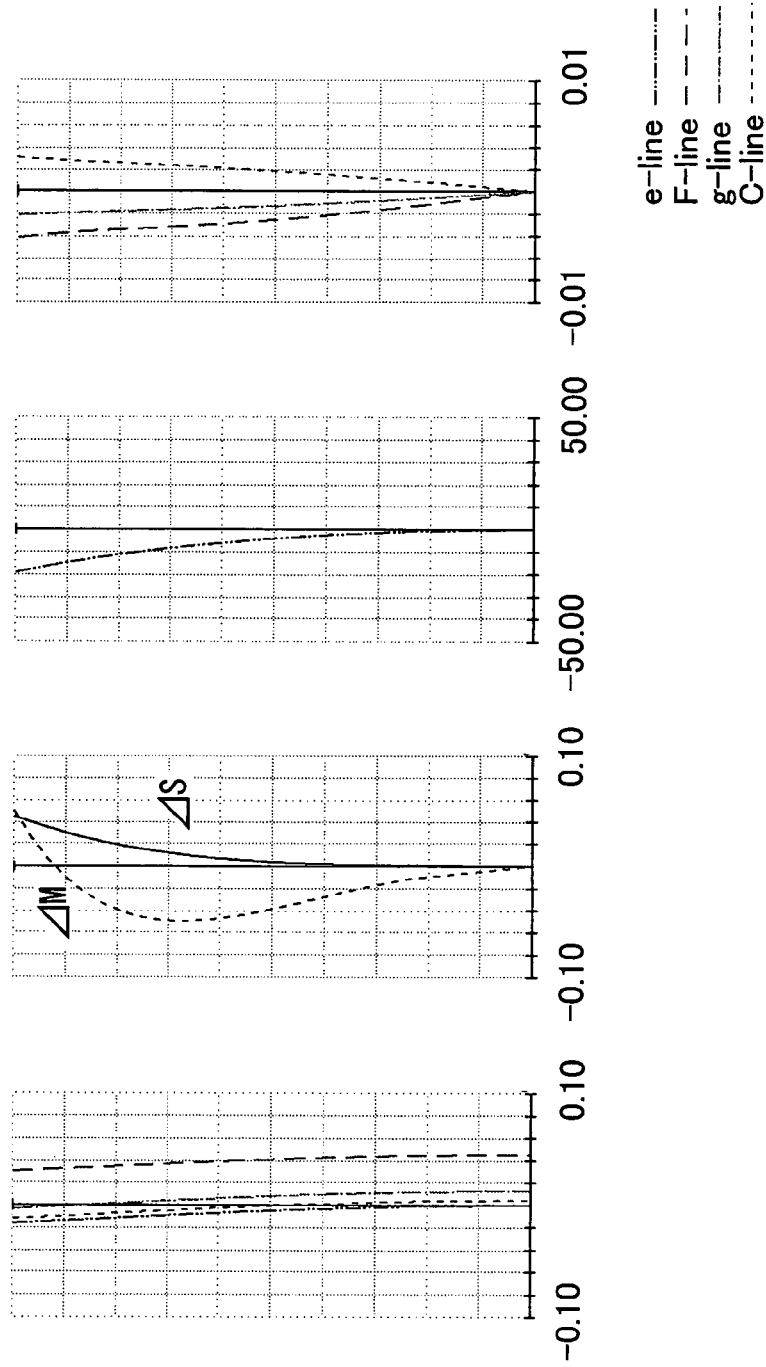
FIG. 27 is an aberration diagram of the image-acquisition optical system in FIG. 25.
Figure 28:
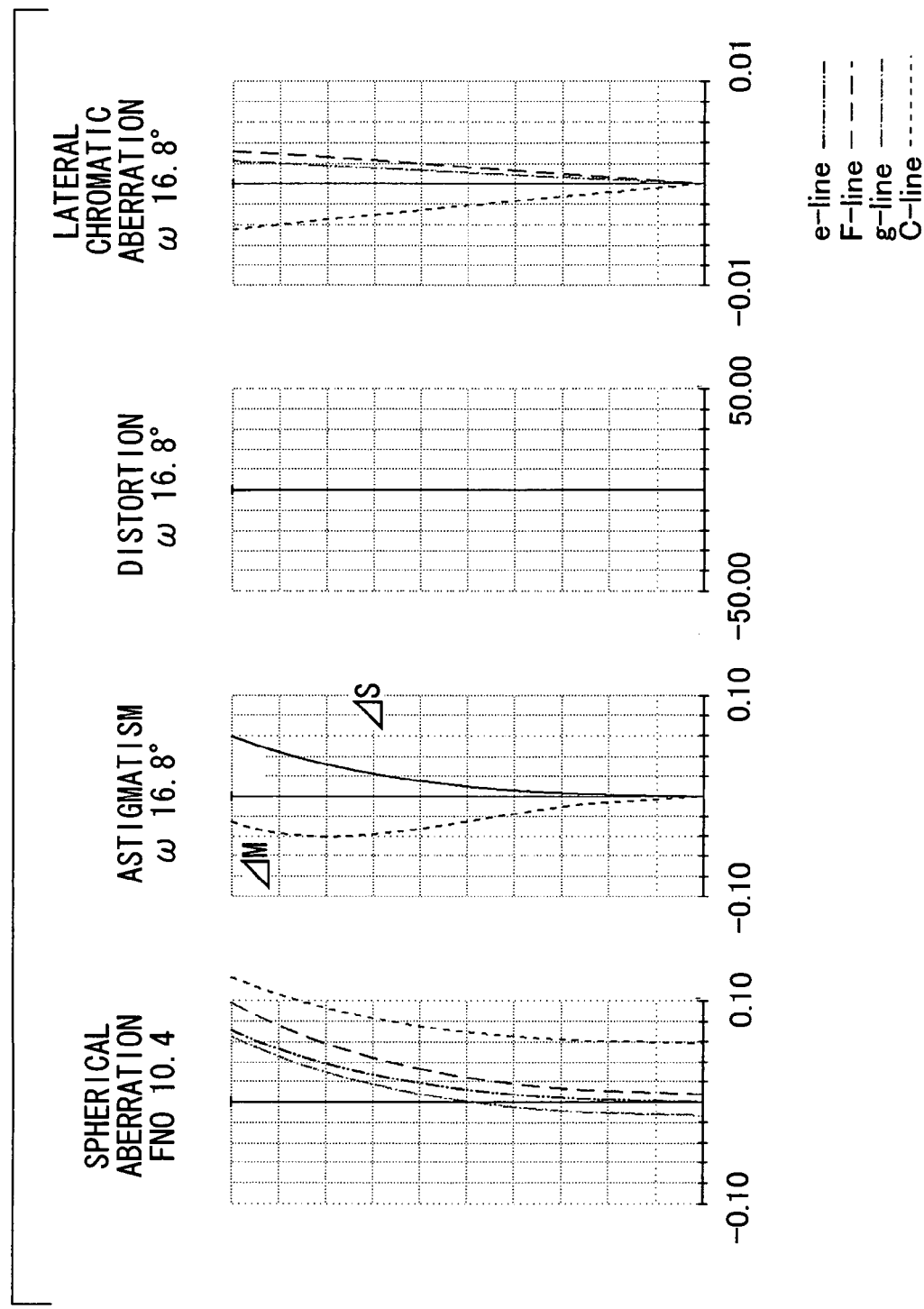
FIG. 28 is an aberration diagram of the image-acquisition optical system in FIG. 25.

The configuration of a magnifying endoscope objective lens according to this Example is shown in FIG. 25. Design data of the magnifying endoscope objective lens of this Example is shown in Table 16, and the values of variable parameters of the magnifying endoscope objective lens according to this Example in each state, that is, the normal observation state (wide-angle end), the intermediate state, and the close-up magnified-observation state (telephoto end), are shown in Table 17. FIGS. 26, 27, and 28 respectively show aberration curves of the magnifying endoscope objective lens according to this Example in the normal observation state (wide-angle end), the intermediate state, and the close-up magnified-observation state (telephoto end). Configurations of the magnifying endoscope objective lens according to this Example in the normal observation state (wide-angle end), the intermediate state, and the close-up magnified-observation state (telephoto end) are shown in FIG. 25, in this order from the top.

TABLE 16

| SURFACE NUMBER | RADIUS OF CURVATURE | SURFACE SEPARATION | INDEX OF REFRACTION Nd | ABBE CONSTANT Vd |
|---|---|---|---|---|
| 1 | ∞ | 0.360 | 1.88814 | 40.78 |
| 2 | 1.1827 | 2.328 | | |
| 3 | 8.5962 | 1.380 | 1.48915 | 70.23 |
| 4 | −2.8362 | 0.120 | | |
| 5 | 4.1544 | 0.200 | 2.01169 | 28.27 |
| 6 | 1.8190 | 0.680 | 1.64254 | 60.08 |
| 7 | −4.9515 | D7 | | |
| 8 | DIAPHRAGM | 0.140 | | |
| 9 | −20.3306 | 0.155 | 1.60520 | 65.44 |
| 10 | 1.2270 | 0.258 | 1.69417 | 31.07 |
| 11 | 2.5050 | D11 | | |
| 12 | 16.1532 | 0.771 | 1.48915 | 70.23 |
| 13 | −4.5944 | 0.020 | | |
| 14 | 3.8109 | 0.240 | 1.85504 | 23.78 |
| 15 | 2.6212 | 1.240 | 1.49846 | 81.54 |
| 16 | −15.5195 | D16 | | |
| 17 | 7.5027 | 0.420 | 1.93429 | 18.90 |
| 18 | 4.3063 | 1.570 | | |
| 19 | ∞ | 0.600 | 1.52498 | 59.89 |
| 20 | ∞ | 0.400 | | |
| 21 | ∞ | 1.000 | 1.51825 | 64.14 |
| 22 | ∞ | | | |

TABLE 17

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 20.000 | 2.080 | 0.077 |
| D7 | 0.140 | 1.360 | 2.786 |
| D11 | 4.546 | 3.326 | 0.184 |
| D16 | 1.011 | 1.011 | 2.727 |
| FOCAL LENGTH | 1.603 | 2.003 | 1.638 |
| Fno | 6.55 | 6.99 | 10.35 |
| MAGNIFICATION | −0.08 | −0.63 | −2.59 |

The image-acquisition optical system of this Example is formed of, in order from the object side, a first lens group G1 with positive refractive power, a second lens group G2 with negative refractive power, a third lens group G3 with positive refractive power, and a fourth lens group G4 with negative refractive power, as well as a lens driving device (not shown in the drawing) for moving the second lens group G2 and the third lens group G3 along the optical axis.

The first lens group G1 is formed of a negative lens, a positive lens, and a compound lens formed of a negative lens and a positive lens, arranged in this order from the object side. The second lens group G2 is formed of a compound lens formed of a negative lens and a positive lens. The third lens group G3 is formed of a positive lens and a compound lens formed of a negative lens and a positive lens. The fourth lens group G4 is formed of a negative lens. An aperture stop S is disposed between the first lens group G1 and the second lens group G2, and the aperture stop is constructed so as to move together with the second lens group G2.

The image-acquisition optical system of this Example performs power varying and focusing from the normal observation state (wide-angle end) to the intermediate state by moving only the second lens group G2 using the lens driving device, and performs power varying and focusing from the intermediate state to the close-up magnified observation state (telephoto end) by moving both the lens group G2 and the lens group G3 using the lens driving device. Regarding the aperture stop S, which is constructed so that the opening diameter thereof can be adjusted, the size of the opening diameter is switched in the intermediate state, and the opening diameter from the normal observation state (wide-angle end) to the intermediate state and the opening diameter from the intermediate state to the close-up magnified-observation state (telephoto end) are both kept constant.

A parallel flat plate F1 between the fourth lens group G4 and the image-acquisition device is a filter for cutting light of specific wavelengths, for example, 1060-nm light from a YAG laser or 810-nm light from a semiconductor laser, or a wavelength range of infrared light.

An image-acquisition device satisfying conditional expression (3) is used as the image-acquisition device, forming an image-acquisition unit that can be installed in an endoscope. Therefore, it is possible to examine biological tissue at the cellular level to carry out diagnosis.

EXAMPLE 8

Figure 29:
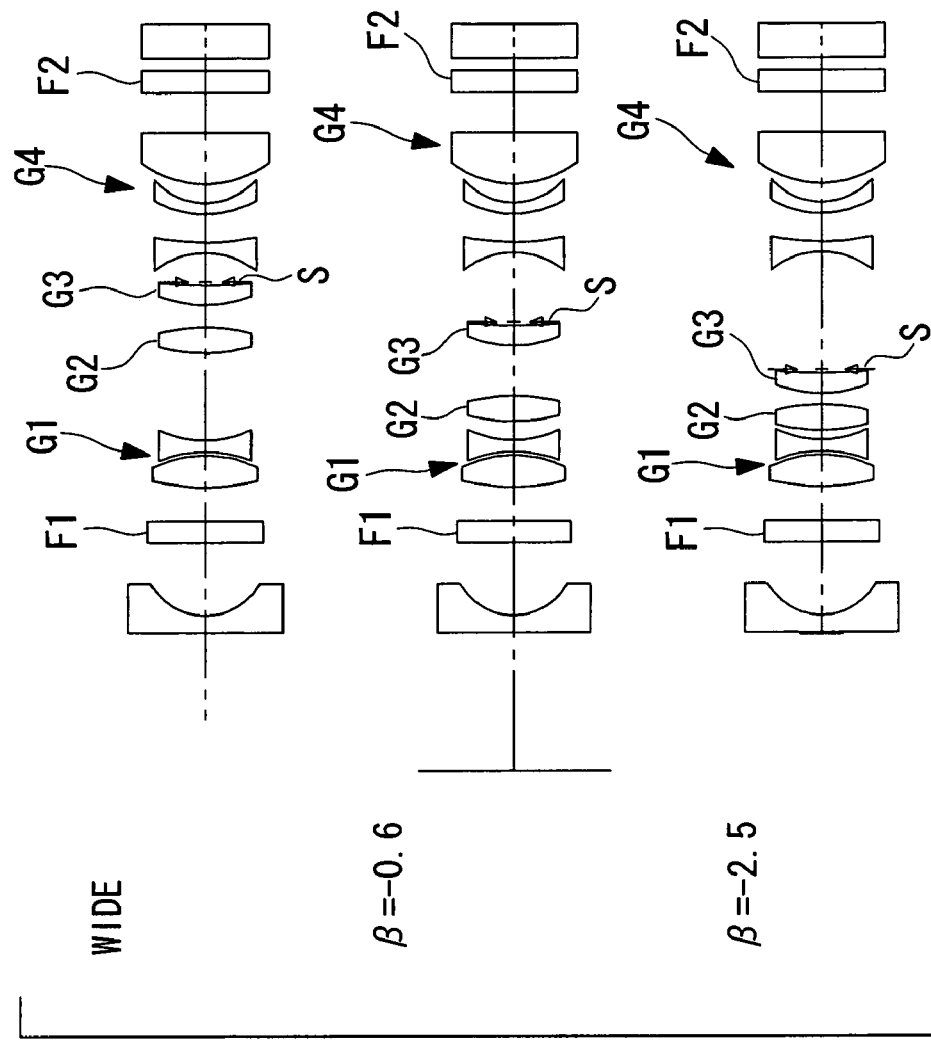
FIG. 29 is a sectional view showing Example 8 of the image-acquisition optical system according to an embodiment of the present invention.
Figure 30:
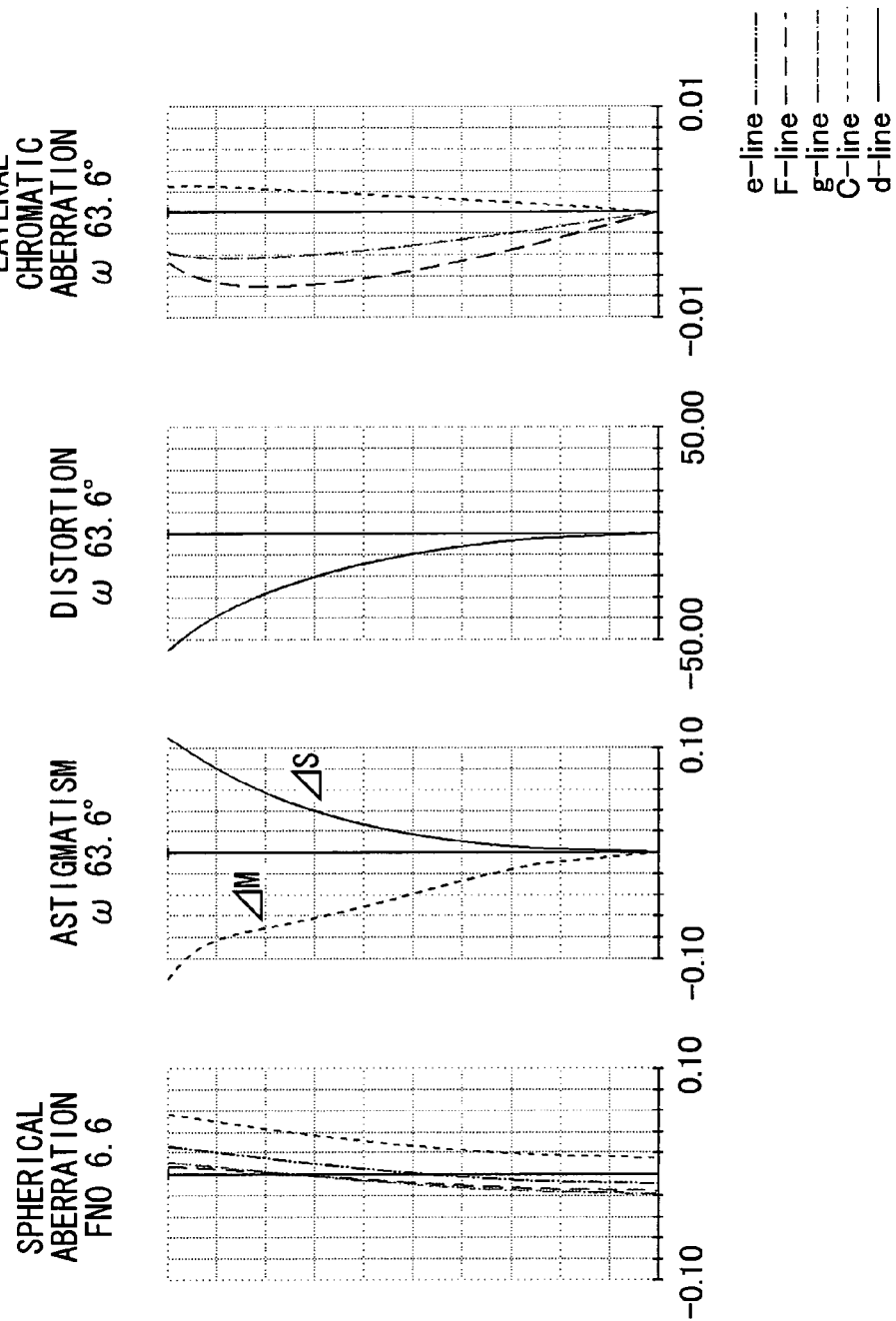
FIG. 30 is an aberration diagram of the image-acquisition optical system in FIG. 29.
Figure 31:
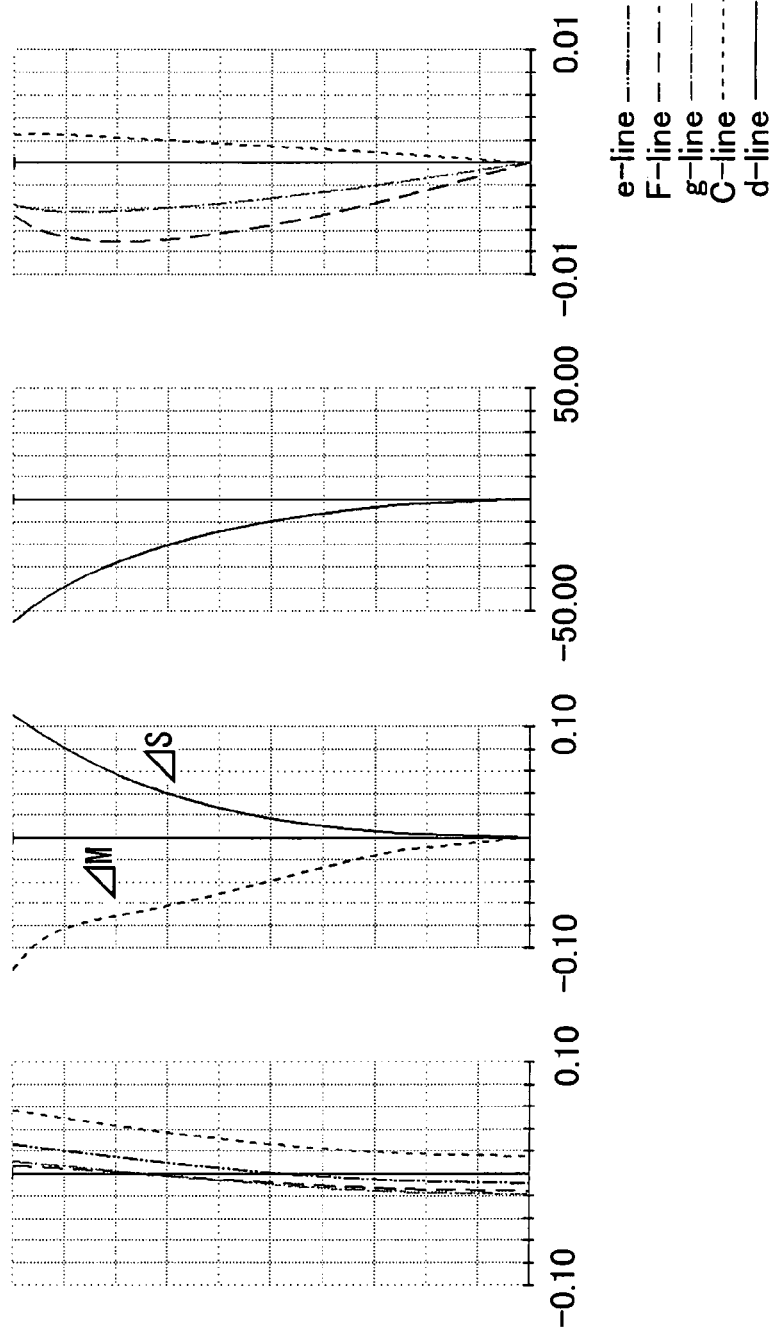
FIG. 31 is an aberration diagram of the image-acquisition optical system in FIG. 29.
Figure 32:
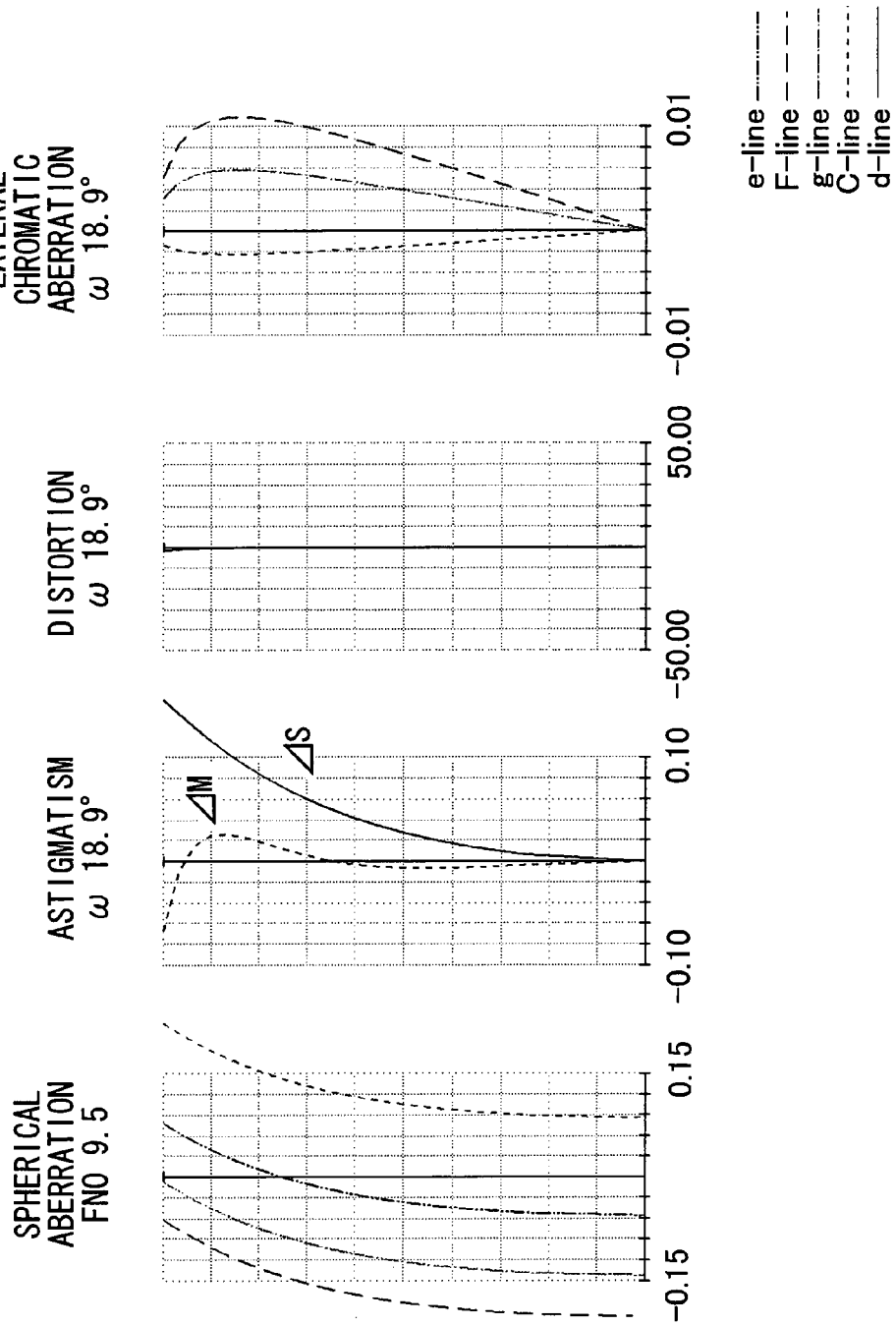
FIG. 32 is an aberration diagram of the image-acquisition optical system in FIG. 29.

The configuration of a magnifying endoscope objective lens according to this Example is shown in FIG. 29. Design data of the magnifying endoscope objective lens of this Example is shown in Table 18, and the values of variable parameters of the magnifying endoscope objective lens of this Example in each state, that is, the normal observation state (wide-angle end), the intermediate state, and the close-up magnified-observation state (telephoto end), are shown in Table 19. FIGS. 30, 31, and 32 respectively show aberration curves of the magnifying endoscope objective lens according to this Example in the normal observation state (wide-angle state), the intermediate state, and the close-up magnified-observation state (telephoto end). Configurations of the magnifying endoscope objective lens according to this Example in the normal observation state (wide-angle end), the intermediate state, and the close-up magnified-observation state (telephoto end) are shown in FIG. 29, in this order from the top.

TABLE 18

| SURFACE NUMBER | RADIUS OF CURVATURE | SURFACE SEPARATION | INDEX OF REFRACTION Nd | ABBE CONSTANT Vd |
|---|---|---|---|---|
| 1 | ∞ | 0.300 | 1.88300 | 40.78 |
| 2 | 1.0723 | 1.276 | | |
| 3 | ∞ | 0.380 | 1.52287 | 59.89 |

TABLE 18-continued

| SURFACE NUMBER | RADIUS OF CURVATURE | SURFACE SEPARATION | INDEX OF REFRACTION Nd | ABBE CONSTANT Vd |
|---|---|---|---|---|
| 4 | ∞ | 0.591 | | |
| 5 | 3.6296 | 0.550 | 1.72916 | 54.68 |
| 6 | −2.1059 | 0.058 | | |
| 7 | −2.2092 | 0.200 | 1.69895 | 30.13 |
| 8 | 1.8163 | D8 | | |
| 9 | 3.0143 | 0.449 | 1.77250 | 49.60 |
| 10 | −3.2808 | D10 | | |
| 11 | 2.1665 | 0.350 | 1.88300 | 40.76 |
| 12 | 8.4246 | 0.060 | | |
| 13 | DIAPHRAGM | D13 | | |
| 14 | −1.3735 | 0.180 | 1.84666 | 23.78 |
| 15 | 4.4844 | 0.495 | | |
| 16 | 1.7886 | 0.193 | 1.92286 | 18.90 |
| 17 | 1.1613 | 0.328 | | |
| 18 | 1.8490 | 0.880 | 1.88300 | 40.76 |
| 19 | ∞ | 0.683 | | |
| 20 | ∞ | 0.400 | 1.51400 | 75.00 |
| 21 | ∞ | 0.200 | | |
| 22 | ∞ | 0.600 | 1.51633 | 64.14 |
| 23 | ∞ | D23 | | |

TABLE 19

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 15.200 | 2.400 | 0.030 |
| D8 | 1.519 | 0.325 | 0.163 |
| D10 | 0.387 | 0.869 | 0.191 |
| D13 | 0.514 | 1.226 | 2.066 |
| FOCAL LENGTH | 1.039 | 1.699 | 1.228 |
| Fno | 6.56 | 9.53 | 9.45 |
| MAGNIFICATION | −0.06 | −0.60 | −2.55 |

The image-acquisition optical system of this Example is formed of, in order from the object side, a first lens group G1 having negative refractive power, a second lens group G2 having positive refractive power, a third lens group G3 having positive refractive power, and a fourth lens group G4 having negative refractive power, as well as a lens driving device (not shown in the drawing) for moving the second lens group G2 and the third lens group G3 along the optical axis.

The first lens group G1 is formed of a negative lens, a positive lens, a positive lens, and a negative lens, arranged in this order from the object side. The second lens group G2 is formed of a positive lens. The third lens group G3 is formed of a positive lens. The fourth lens group G4 is formed of a negative lens, a negative lens, and a positive lens, arranged in this order from the object side. An aperture stop S is disposed between the third lens group G3 and the fourth lens group G4, and the aperture stop S moves together with the third lens group G3.

The image-acquisition optical system of this Example performs power varying and focusing from the normal observation state (wide-angle end) to the intermediate state by independently moving the second lens group G2 and the third lens group G3 using the lens driving device, and from the intermediate state to the close-up magnified-observation state (telephoto end) by independently moving the second lens group G2 and the third lens group G3 using the lens driving device. Regarding the aperture stop S, which is constructed so that the opening diameter thereof can be adjusted, the size of the opening diameter is switched in the intermediate state, and the opening diameter from the normal observation state (wide-angle end) to the intermediate state and the opening diameter from the intermediate state to the close-up magnified-observation state (telephoto end) are both kept constant.

A parallel flat plate F1 in the first lens group G1 and a parallel flat plate F2 between the fourth lens group G4 and the image-acquisition device are filters for cutting light of specific wavelengths, for example, 1060-nm light from a YAG laser or 810-nm light from a semiconductor laser, or a wavelength range of infrared light.

An image-acquisition device satisfying conditional expression (3) is used as the image-acquisition device, forming an image-acquisition unit that can be installed in an endoscope. Therefore, it is possible to examine biological tissue at the cellular level to carry out diagnosis.

EXAMPLE 9

Figure 33:
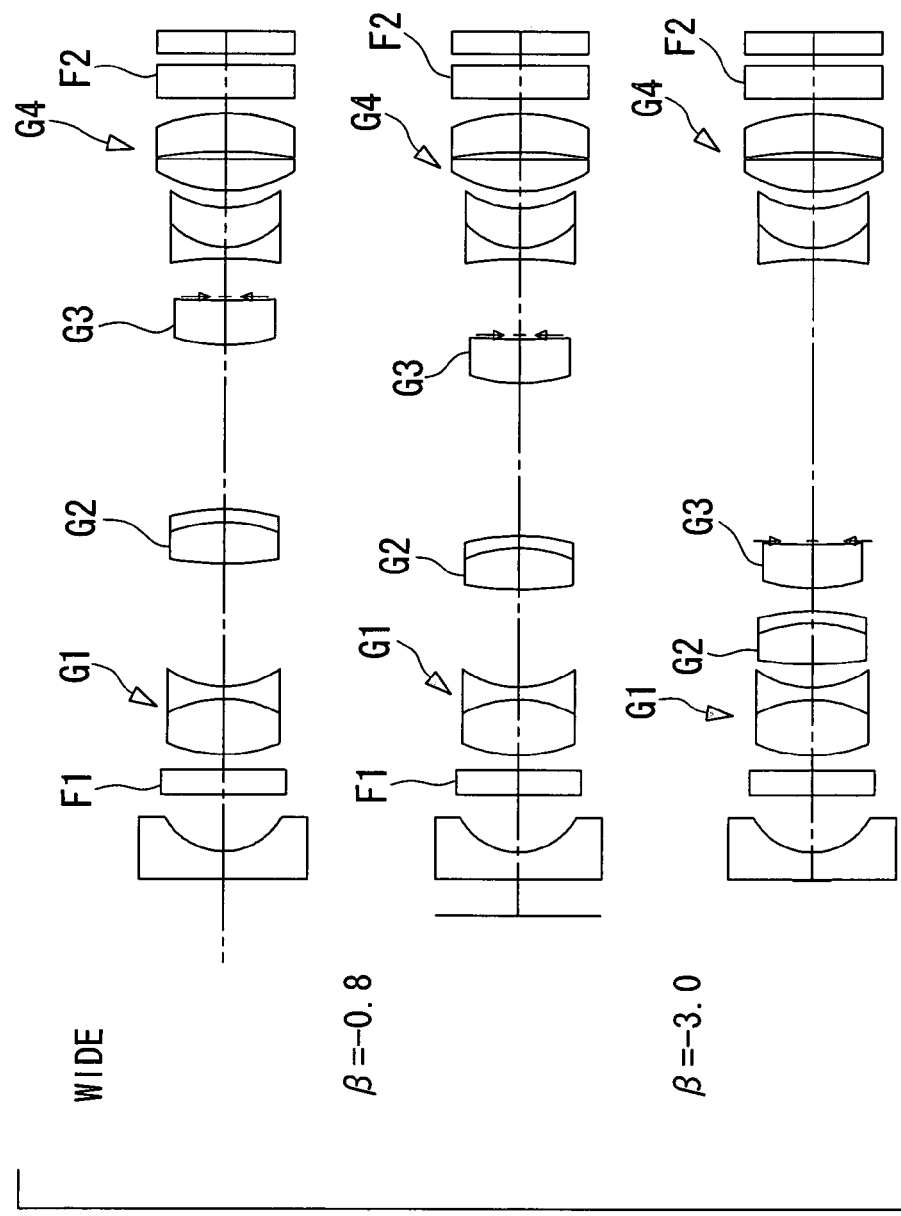
FIG. 33 is a sectional view showing Example 9 of the image-acquisition optical system according to an embodiment of the present invention.
Figure 34:
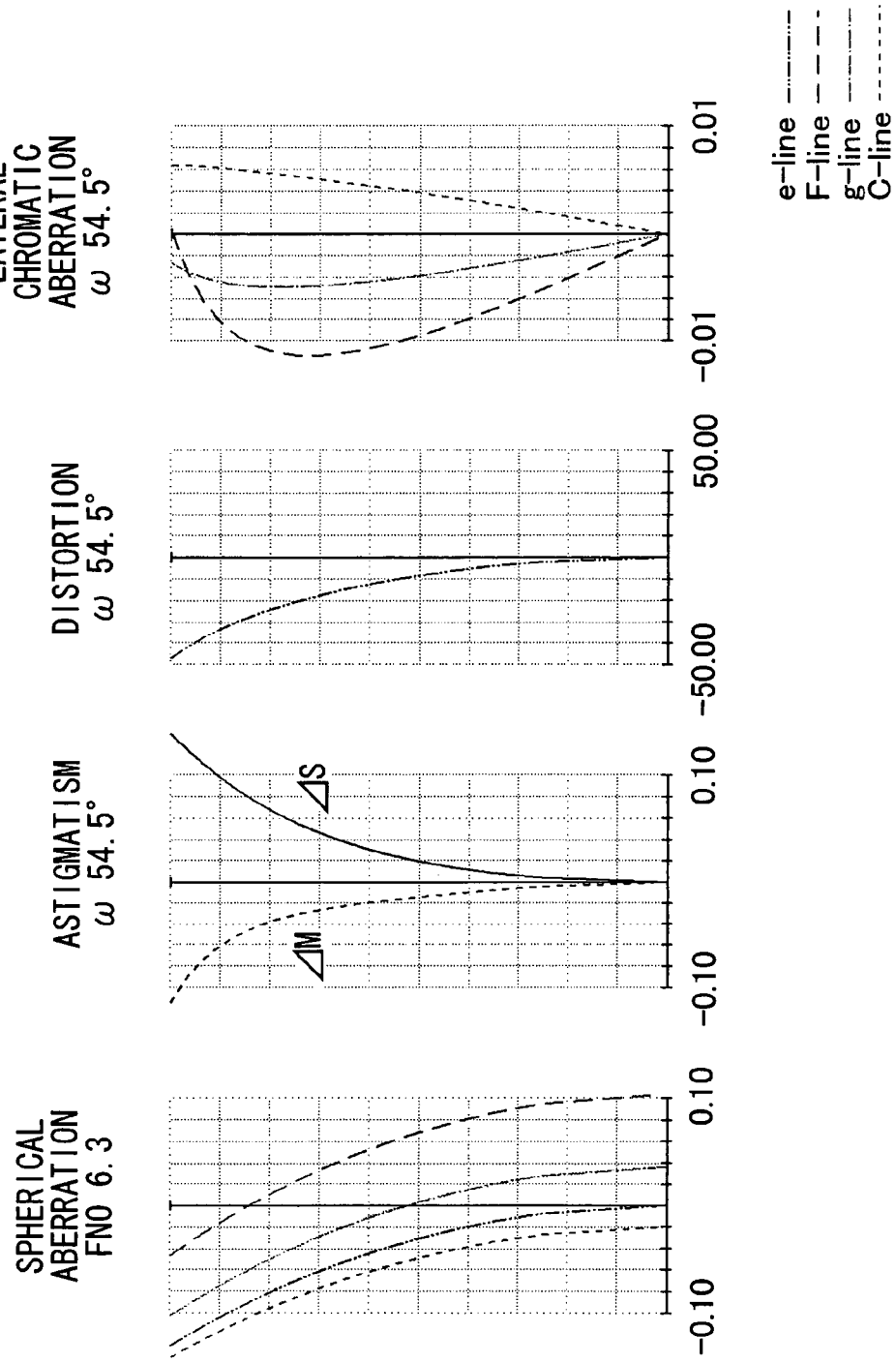
FIG. 34 is an aberration diagram of the image-acquisition optical system in FIG. 33.
Figure 35:
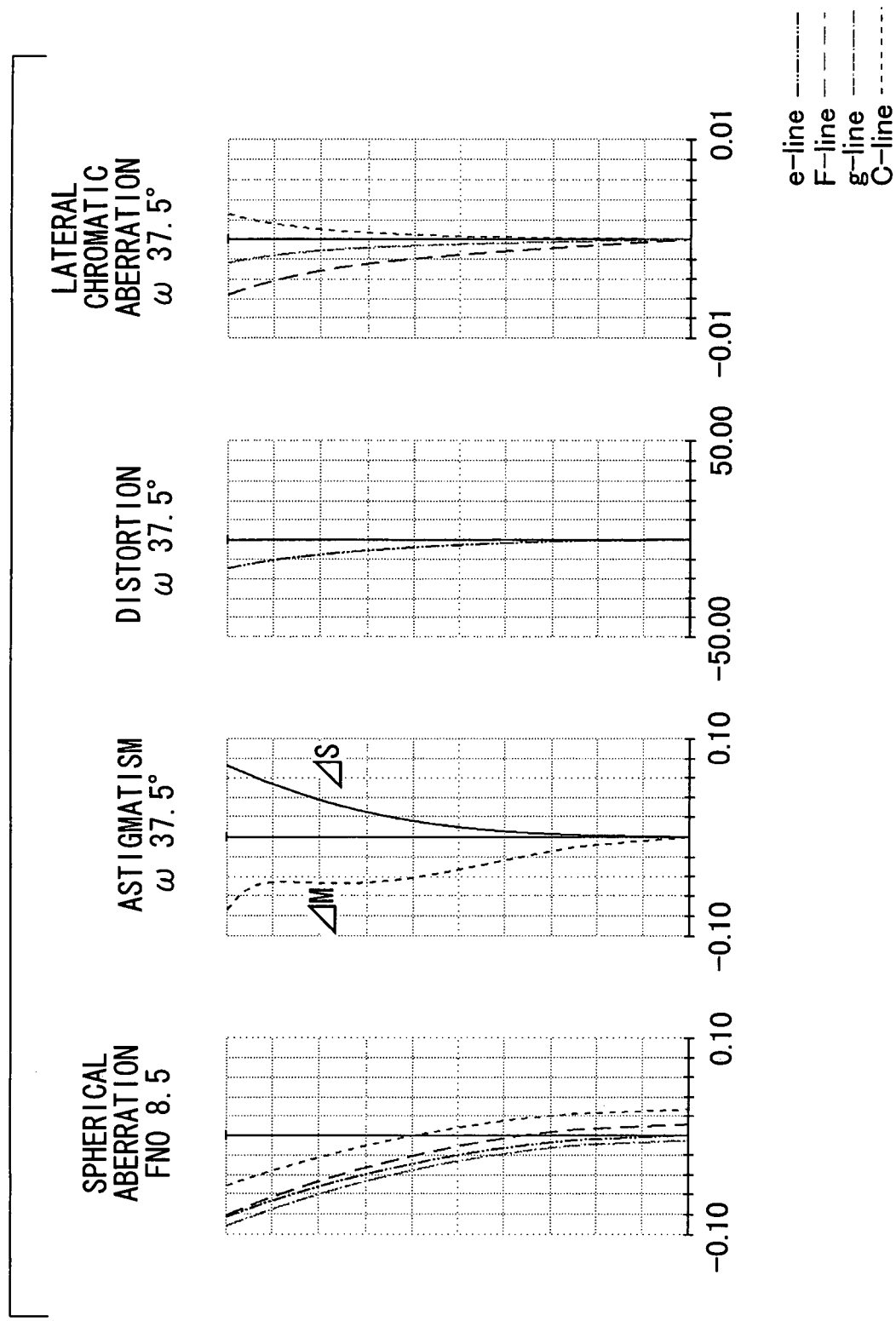
FIG. 35 is an aberration diagram of the image-acquisition optical system in FIG. 33.
Figure 36:
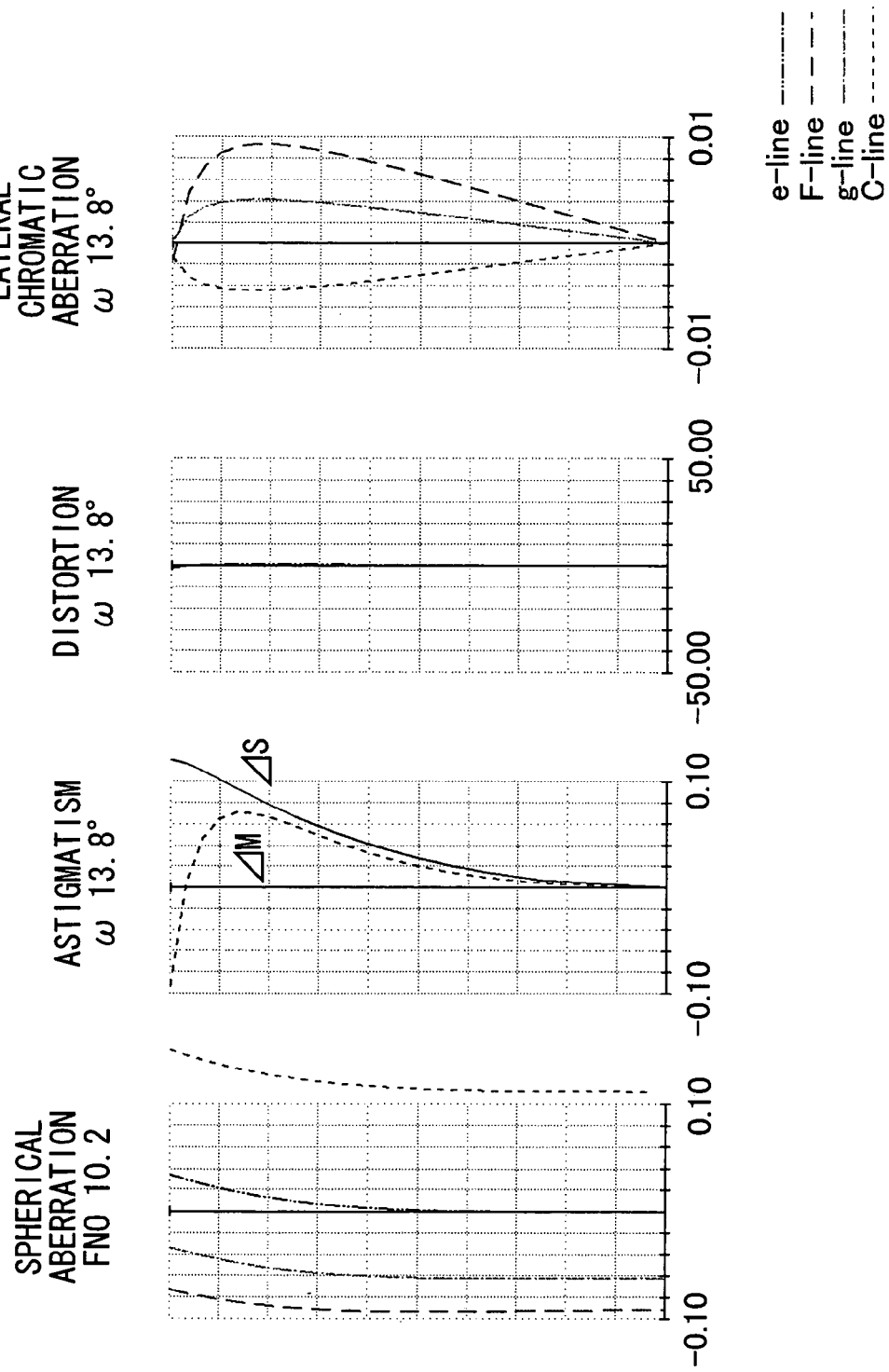
FIG. 36 is an aberration diagram of the image-acquisition optical system in FIG. 33.

The configuration of a magnifying endoscope objective lens according to this Example is shown in FIG. 33. Design data of the magnifying endoscope objective lens of this Example is shown in Table 20, and the values of variable parameters of the magnifying endoscope objective lens of this Example in each state, that is, the normal observation state (wide-angle end), the intermediate state, and the close-up magnified-observation state (telephoto end), are shown in Table 21. FIGS. 34, 35, and 36 respectively show aberration curves of the magnifying endoscope objective lens according to this Example in the normal observation state (wide-angle end), the intermediate state, and the close-up magnified-observation state (telephoto end). Configurations of the magnifying endoscope objective lens according to this Example in the normal observation state (wide-angle end), the intermediate state, and the close-up magnified-observation state (telephoto end) are shown in FIG. 33, in this order from the top.

TABLE 20

| SURFACE NUMBER | RADIUS OF CURVATURE | SURFACE SEPARATION | INDEX OF REFRACTION Nd | ABBE CONSTANT Vd |
|---|---|---|---|---|
| 1 | ∞ | 0.480 | 1.88814 | 40.78 |
| 2 | 1.2121 | 1.042 | | |
| 3 | ∞ | 0.430 | 1.52498 | 59.89 |
| 4 | ∞ | 0.282 | | |
| 5 | 2.6508 | 0.995 | 1.73234 | 54.68 |
| 6 | −2.1247 | 0.226 | 1.70442 | 30.13 |
| 7 | 1.8097 | D7 | | |
| 8 | 6.0358 | 0.746 | 1.77621 | 49.60 |
| 9 | −2.6191 | 0.226 | 1.85504 | 23.78 |
| 10 | −3.8066 | D10 | | |
| 11 | 3.1410 | 0.791 | 1.88815 | 40.76 |
| 12 | 18.8883 | 0.068 | | |
| 13 | DIAPHRAGM | D13 | | |
| 14 | −6.2159 | 0.204 | 1.93430 | 18.90 |
| 15 | 1.3555 | 0.696 | 1.48915 | 70.23 |
| 16 | 1.7117 | 0.313 | | |
| 17 | 2.4076 | 0.562 | 1.88815 | 40.76 |
| 18 | 461.5298 | 0.145 | | |
| 19 | −7.4063 | 0.678 | 1.85504 | 23.78 |
| 20 | −3.1809 | 0.271 | | |
| 21 | ∞ | 0.600 | 1.51564 | 75.00 |
| 22 | ∞ | 0.200 | | |
| 23 | ∞ | 0.400 | 1.51825 | 64.14 |
| 24 | ∞ | D24 | | |

TABLE 21

| PARAMETER | THE NORMAL OBSERVATION STATE (WIDE-ANGLE END) | THE INTERMEDIATE OBSERVATION STATE | THE CLOSE-UP MAGNIFIED OBSERVTION STATE (TELEPHOTO END) |
|---|---|---|---|
| D0 | 17.522 | 0.650 | 0.020 |
| D7 | 2.245 | 1.781 | 0.419 |
| D10 | 2.936 | 2.730 | 0.418 |
| D13 | 0.689 | 1.359 | 5.033 |
| FOCAL LENGTH | 1.384 | 1.546 | 2.718 |
| Fno | 6.30 | 8.50 | 10.23 |
| MAGNIFICATION | −0.07 | −0.79 | −3.05 |

The image-acquisition optical system of this Example is formed of, in order from the object side, a first lens group G1 having negative refractive power, a second lens group G2 having positive refractive power, a third lens group G3 having positive refractive power, and a fourth lens group G4 having positive refractive power, as well as a lens driving device (not shown in the drawing) for moving the second lens group G2 and the third lens group G3 along the optical axis.

The first lens group G1 is formed of a negative lens and a compound lens formed of a positive lens and a negative lens, arranged in this order from the object side. The second lens group G2 is formed of a compound lens formed of a positive lens and a negative lens. The third lens group G3 is formed of a positive lens. The fourth lens group is formed of a compound lens formed of a negative lens and a positive lens, a positive lens, and a positive lens, arranged in this order from the object side. An aperture stop S is disposed between the third lens group G3 and the fourth lens group G4, and the aperture stop S moves together with the third lens group G3.

The image-acquisition optical system of this Example performs power varying and focusing from the normal observation state (wide-angle end) to the intermediate state by independently moving the second lens group G2 and the third lens group G3 using the lens driving device, and from the intermediate state to the close-up magnified-observation state (telephoto end) by independently moving the second lens group G2 and the third lens group G3 using the lens driving device. Regarding the aperture stop S, which is constructed so that the opening diameter thereof can be adjusted, the size of the opening diameter is changed at the intermediate state, and the opening diameter from the normal observation state (wide-angle end) to the intermediate state and the opening diameter from the intermediate state to the close-up magnified-observation state (telephoto end) are both kept constant.

A parallel flat plate F1 in the first lens group G1 and a parallel flat plate F2 between the fourth lens group G4 and the image-acquisition device are filters for cutting light of specific wavelengths, for example, 1060-nm light from a YAG laser or 810-nm light from a semiconductor laser, or a wavelength range of infrared light.

An image-acquisition device satisfying conditional expression (3) above is used as the image-acquisition device, forming an image-acquisition unit that can be installed in an endoscope. Therefore, it is possible to examine biological tissue at the cellular level to carry out diagnosis.

Additional Items

Aspects of the invention having the following configurations can be derived from the embodiment described above.

1. An image-acquisition optical system formed of a plurality of lens groups, wherein by moving at least one of the plurality of lens groups on the optical axis, it is possible to change a state from a normal-observation state (wide-angle end) to a close-up magnified-observation state (telephoto end), and wherein conditional expression (1) below is satisfied:

$$\beta_{TELE} < -2.0 \quad (1)$$

where $\beta_{TELE}$ is the magnification of the image-acquisition optical system at the telephoto end.

2. An image-acquisition optical system according to Additional Item 1, wherein the image-acquisition optical system is formed of four groups; counting from an object side, a third group has negative refractive power and a fourth group has positive refractive power; and a second group and the third group move on the optical axis to perform power varying and focusing.

3. An image-acquisition optical system according to Additional Item 1 or Additional Item 2, wherein the image-acquisition optical system includes an aperture stop, the aperture stop being constructed so that an opening diameter thereof can be adjusted; and the following conditional expression (9) is satisfied:

$$D_{TELE} > D_{WIDE} \quad (9)$$

where $D_{TELE}$ is the opening diameter of the aperture stop at the telephoto end, and $D_{WIDE}$ is the opening diameter of the aperture stop at the wide-angle end.

4. An image-acquisition optical system which is formed a plurality of lens groups and which can carry out observation at least three magnifications, that is, a normal-observation magnification $\beta_{WIDE}$, a close-up magnified-observation magnification $\beta_{TELE}$, and a magnification $\beta$ between the normal-observation magnification $\beta_{WIDE}$ and the close-up magnified-observation magnification $\beta_{TELE}$; wherein by moving one lens group of the plurality of lens groups, power varying and focusing from $\beta_{WIDE}$ to $\beta$ are carried out; and in power varying and focusing from $\beta$ to $\beta_{TELE}$, at least one lens group other than the lens group that moves when performing power varying and focusing from $\beta_{WIDE}$ to $\beta$ moves.

5. An image-acquisition optical system according to Additional Item 4, wherein when the magnification $\beta$ between the normal-observation magnification $\beta_{WIDE}$ and the close-up magnified-observation magnification $\beta_{TELE}$ is in the range of the following conditional expression (2), power varying and focusing are performed by moving two lens groups of the plurality of lens groups:

$$\beta < -1.0 \quad (2)$$

6. An image-acquisition optical system according to Additional Item 4 or Additional Item 5, wherein the image-acquisition optical system is formed of four groups; counting from an object side, the third lens group has negative refractive power and the fourth lens group has positive refractive power; power varying and focusing from $\beta_{WIDE}$ to $\beta$ are performed by moving only the third lens group; and in power varying and focusing from $\beta$ to $\beta_{TELE}$, the second lens group moves, in addition to the third lens group.

7. An image-acquisition optical system according to Additional Item 4 or Additional Item 5, wherein the image-acquisition optical system is formed of four groups; counting from an object side, a third lens group has negative refractive power and a fourth lens group has positive refractive power; when performing power varying and focusing from $\beta_{WIDE}$ to $\beta$, only the third lens group moves; and when performing power varying and focusing from $\beta$ to $\beta_{TELE}$ only the second lens group moves.

8. An image-acquisition optical system according to one of Additional Items 4 to 7, wherein the close-up magnified-observation magnification $\beta_{TELE}$ satisfies the following conditional expression (1):

$$\beta_{TELE} < -2.0 \quad (1)$$

9. An image-acquisition optical system according to Additional Item 2, Additional Item 6, or Additional Item 7, wherein the first lens group has positive refractive power, and the second lens group has positive refractive power.

10. An image-acquisition optical system according to Additional Item 2, wherein the first lens group has negative refractive power, and the second lens group has positive refractive power.

11. An image-acquisition optical system according to Additional Item 6 or Additional Item 7, wherein the first lens group has positive refractive power, and the second lens group has negative refractive power.

12. An image-acquisition optical system according to Additional Item 1, which is formed of, in order from an object side, at least a positive first lens group, a negative second lens group, and a positive third lens group and which performs power varying and focusing by moving the second lens group and the third lens group.

13. An image-acquisition optical system according to Additional Item 1, which is formed of, in order from an object side, at least a negative first lens group, a positive second lens group, and a positive third lens group and which performs power varying and focusing by moving the second lens group and the third lens group.

14. An image-acquisition optical system according to one of Additional Items 1 to 3, Additional Item 12, and Additional Item 13, wherein the magnification $\beta_{TELE}$ of the image-acquisition optical system at the telephoto end further satisfies conditional expression (4) below:

$$\beta TELE < -2.5 \quad (4)$$

15. An image-acquisition optical system according to Additional Item 4 or Additional Item 5, formed of, in order from an object side, at least a positive first lens group, a negative second lens group, and a positive third lens group, wherein when performing power varying and focusing from $\beta_{WIDE}$ to $\beta$, only the second lens group moves, and when performing power varying and focusing from $\beta$ to $\beta_{TELE}$, the second lens group and the third lens group move.

16. An image-acquisition unit for a magnifying endoscope, comprising an image-acquisition optical system which is formed of a plurality of lens groups and which is capable of changing a state from a normal-observation state (wide-angle end) to a close-up magnified-observation state (telephoto end) by moving at least one of the plurality of lens groups on the optical axis; and an image-acquisition device which is disposed in the vicinity of an image-forming plane of the image-acquisition optical system, wherein conditional expressions (1) and (3) bellow are satisfied:

$$\beta_{TELE} < -2.0 \quad (1)$$

$$0.2 < IH/P \times 1000 < 0.7 \quad (3)$$

where $\beta_{TELE}$ is the magnification of the image-acquisition optical system at the telephoto end, IH is the maximum image height (mm) at an image-acquisition plane of the image-acquisition device, and P is the pixel pitch (mm) of the image-acquisition device.

17. An image-acquisition unit for a magnifying endoscope according to Additional Item 16, wherein the image-acquisition optical system is formed of four lens groups; counting from an object side, the third group has negative refractive power and the fourth group has positive refractive power; and the second group and the third group move on the optical axis to perform power varying and focusing.

18. An image-acquisition unit for a magnifying endoscope according to Additional Item 16 or Additional Item 17, wherein the image-acquisition optical system includes an aperture stop, the aperture stop being constructed so that an opening diameter thereof can be adjusted; and conditional expression (9) below is satisfied:

$$D_{TELE} > D_{WIDE} \quad (9)$$

where $D_{TELE}$ is the opening diameter of the aperture stop at the telephoto end, and $D_{WIDE}$ is the opening diameter of the aperture stop at the wide-angle end.

19. An image-acquisition unit for a magnifying endoscope, comprising: an image-acquisition optical system which is formed of a plurality of lens groups and which is capable of observing at least three magnifications, that is, a normal-observation magnification $\beta_{WIDE}$, a close-up magnified-observation magnification $\beta_{TELE}$, and an observation magnification $\beta$ between the normal-observation magnification WIDE and the close-up magnified-observation magnification $\beta_{TELE}$; and an image-acquisition device disposed in the vicinity of an image-forming plane of the image-acquisition optical system, wherein power varying and focusing from $\beta_{WIDE}$ to $\beta$ are performed by moving one lens group of the plurality of lens groups, in power varying and focusing from $\beta$ to $\beta_{TELE}$, at least one lens group different from the lens group that is moved when performing power varying and focusing from $\beta_{WIDE}$ to $\beta$ moves, and conditional expression (3) below is satisfied:

$$0.2 < IH/P \times 1000 < 0.7 \quad (3)$$

where IH is the maximum image height (mm) at an image-acquisition plane of the image-acquisition device, and P is the pixel pitch (mm) of the image-acquisition device.

20. An image-acquisition unit for a magnifying endoscope according to Additional Item 19, wherein when the observation magnification $\beta$ between the normal-observation magnification $\beta_{WIDE}$ and the close-up magnified-observation magnification $\beta_{TELE}$ satisfies conditional expression (2) below, power varying and focusing are performed by moving two lens groups of the plurality of lens groups:

$$\beta < -1.0 \quad (2)$$

21. An image-acquisition unit for a magnifying endoscope according to Additional Item 19 or Additional Item 20, wherein the image-acquisition optical system is formed of four lens groups; counting from the object side, the third lens group has negative refractive power and the fourth lens group has positive refractive power; power varying and focusing from $\beta_{WIDE}$ to $\beta$ are performed by moving only the third lens group; and in power varying and focusing from $\beta$ to $\beta_{TELE}$, the second lens group moves, in addition to the third lens group.

22. An image-acquisition unit for a magnifying endoscope according to Additional Item 19 or Additional Item 20, wherein the image-acquisition optical system is formed of four lens groups; counting from the object side, the third lens group has negative refractive power and the fourth lens group has positive refractive power; when performing power varying and focusing from $\beta_{WIDE}$ to $\beta$, only the third lens group moves; and when performing power varying and focusing from $\beta$ to $\beta_{TELE}$, only the second lens group moves.

23. An image-acquisition unit for a magnifying endoscope according to one of Additional Items 19 to 22, wherein the close-up magnified-observation magnification $\beta_{TELE}$ satisfies conditional expression (1) below:

$$\beta_{TELE} < -2.0 \quad (1)$$

24. An image-acquisition unit for a magnifying endoscope according to Additional Item 23, wherein the close-up magnified-observation magnification $\beta_{TELE}$ further satisfies conditional expression (4) below:

$$\beta_{TELE} < -2.5 \quad (4)$$

25. An image-acquisition unit for a magnifying endoscope according to Additional Item 17, Additional Item 21, or Additional Item 22, wherein the first lens group has positive refractive power and the second lens group has positive refractive power.

26. An image-acquisition unit for a magnifying endoscope according to Additional Item 17, wherein the first lens group has negative refractive power and the second lens group has positive refractive power.

27. An image-acquisition unit for a magnifying endoscope according to Additional Item 21 or Additional Item 22, wherein the first lens group has positive refractive power and the second lens group has negative refractive power.

28. An image-acquisition unit for a magnifying endoscope according to Additional Item 16, which is formed of, in order from an object side, at least a positive first lens group, a negative second lens group, and a positive third lens group and which performs power varying and focusing by moving the second lens group and the third lens group.

29. An image-acquisition unit for a magnifying endoscope according to Additional Item 16, which is formed of, in order from an object side, at least a negative first lens group, a positive second lens group, and a positive third lens group and which performs power varying and focusing by moving the second lens group and the third lens group.

30. An image-acquisition unit for a magnifying endoscope according to one of Additional Items 16 to 18, Additional Item 28, and Additional Item 29, wherein the magnification $\beta_{TELE}$ of the image-acquisition optical system at the telephoto end further satisfies conditional expression (4) below:

$$\beta_{TELE} < -2.5 \quad (4)$$

31. An image-acquisition unit for a magnifying endoscope according to Additional Item 19 or Additional Item 20, formed of, in order from an object side, at least a positive first lens group, a negative second lens group, and a positive third lens group; wherein only the second lens group moves when performing power varying and focusing from $\beta_{WIDE}$ to $\beta$; and the second lens group and the third lens group move when performing power varying and focusing from $\beta$ to $\beta_{TELE}$.

What is claimed is:

1. An image-acquisition optical system formed of a plurality of lens groups, wherein by moving at least one of the plurality of lens groups on the optical axis, it is possible to change a state from a normal observation state (wide-angle end) to a close-up magnified-observation state (telephoto end), wherein a distance between an object side surface in the lens at an extreme object side and an observation point of an object is less than or equal to 0.25 mm in the close-up magnified-observation state, and wherein the following conditional expression is satisfied:

$$\beta_{TELE} < -2.0$$

where $\beta_{TELE}$ is the magnification of the image-acquisition optical system at the telephoto end.

2. An image-acquisition optical system formed of a plurality of lens groups, wherein by moving at least one of the plurality of lens groups on the optical axis, it is possible to change a state from a normal observation state (wide-angle end) to a close-up magnified-observation state (telephoto end), wherein the following conditional expression is satisfied:

$$\beta_{TELE} < -2.0$$

where $\beta_{TELE}$ is the magnification of the image-acquisition optical system at the telephoto end, and wherein the image-acquisition optical system is formed of four groups; counting from an object side, the third group has negative refractive power and the fourth group has positive refractive power; and the second group and the third group move on the optical axis to perform power varying and focusing.

3. An image-acquisition optical system formed of a plurality of lens groups, wherein by moving at least one of the plurality of lens groups on the optical axis, it is possible to change a state from a normal observation state (wide-angle end) to a close-up magnified-observation state (telephoto end), wherein the following conditional expression is satisfied:

$$\beta_{TELE} < -2.0$$

where $\beta_{TELE}$ is the magnification of the image-acquisition optical system at the telephoto end, and wherein the image-acquisition optical system includes an aperture stop, the aperture stop being constructed so that an opening diameter thereof can be adjusted; and the following conditional expression is satisfied:

$$D_{TELE} > D_{WIDE}$$

where $D_{TELE}$ is the opening diameter of the aperture stop at the telephoto end, and $D_{WIDE}$ is the opening diameter of the aperture stop at the wide-angle end.

4. An image-acquisition optical system which is formed of a plurality of lens groups and which can carry out observation at at least three magnifications, that is, a normal-observation magnification $\beta_{WIDE}$, a close-up magnified-observation magnification $\beta_{TELE}$, and a magnification $\beta$ between the normal-observation magnification $\beta_{WIDE}$ and the close-up magnified-observation magnification $\beta_{TELE}$;

wherein by moving one lens group of the plurality of lens groups, power varying and focusing from $\beta_{WIDE}$ to $\beta$ are carried out, and in power varying and focusing from $\beta$ to $\beta_{TELE}$, at least one lens group other than the lens group that moves when performing power varying and focusing from $\beta_{WIDE}$ to $\beta$ moves.

5. An image-acquisition optical system according to claim 4, wherein when the magnification $\beta$ between the normal-observation magnification $\beta_{WIDE}$ and the close-up magnified-observation magnification $\beta_{TELE}$ is in the range of the following conditional expression, power varying and focusing are performed by moving two lens groups of the plurality of lens groups:

$$\beta < -1.0$$

6. An image-acquisition optical system according to claim 4, wherein the image-acquisition optical system is formed of four groups; counting from an object side, the third lens group has negative refractive power, and the fourth lens group has positive refractive power; power varying and focusing from $\beta_{WIDE}$ to $\beta$ are performed by moving only the third lens group; and in power varying and focusing from $\beta$ to $\beta_{TELE}$, the second lens group moves, in addition to the third lens group.

7. An image-acquisition optical system according to claim 4, wherein the image-acquisition optical system is formed of four groups; counting from an object side, the third lens group has negative refractive power and the fourth lens group has positive refractive power; when performing power varying and focusing from $\beta_{WIDE}$ to $\beta$, only the third lens group moves; and when performing power varying and focusing from $\beta$ to $\beta_{TELE}$, only the second lens group moves.

* * * * *